US012171218B2

(12) United States Patent
Fu et al.

(10) Patent No.: US 12,171,218 B2
(45) Date of Patent: *Dec. 24, 2024

(54) IDENTIFYING AND AVOIDING OBSTRUCTIONS USING DEPTH INFORMATION IN A SINGLE IMAGE

(71) Applicant: Blue River Technology Inc., Sunnyvale, CA (US)

(72) Inventors: Chia-Chun Fu, Sunnyvale, CA (US); Christopher Grant Padwick, Menlo Park, CA (US); James Patrick Ostrowski, Mountain View, CA (US)

(73) Assignee: DEERE & COMPANY, Moline, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/350,703

(22) Filed: Jul. 11, 2023

(65) Prior Publication Data
US 2023/0345928 A1 Nov. 2, 2023

Related U.S. Application Data

(63) Continuation of application No. 17/314,218, filed on May 7, 2021, now Pat. No. 11,771,077, which is a
(Continued)

(51) Int. Cl.
*G06T 7/50* (2017.01)
*A01C 23/00* (2006.01)
(Continued)

(52) U.S. Cl.
CPC ......... *A01M 7/0089* (2013.01); *A01C 23/007* (2013.01); *A01C 23/02* (2013.01);
(Continued)

(58) Field of Classification Search
CPC .... G06V 10/762; G06V 10/82; G06V 20/188; G06V 30/248; G06V 30/2528;
(Continued)

(56) References Cited

U.S. PATENT DOCUMENTS 5,253,302 A 10/1993 Massen
10,219,449 B2 3/2019 Redden
(Continued)

FOREIGN PATENT DOCUMENTS

CN 109063575 A * 12/2018 ........... A01D 34/006
CN 211787203 U 10/2020
(Continued)

OTHER PUBLICATIONS

Ali, Wajid, Fredrik Georgsson, and Thomas Hellstrom. "Visual tree detection for autonomous navigation in forest environment." 2008 IEEE Intelligent Vehicles Symposium. IEEE, 2008. (Year: 2008).*
(Continued)

*Primary Examiner* — Vu Le
*Assistant Examiner* — Tracy Mangialaschi
(74) *Attorney, Agent, or Firm* — Fenwick & West LLP

(57) ABSTRACT

A farming machine includes one or more image sensors for capturing an image as the farming machine moves through the field. A control system accesses an image captured by the one or more sensors and identifies a distance value associated with each pixel of the image. The distance value corresponds to a distance between a point and an object that the pixel represents. The control system classifies pixels in the image as crop, plant, ground, etc. based on depth information in in the pixels. The control system generates a labelled point cloud using the labels and depth information, and identifies features about the crops, plants, ground, etc. in the point cloud. The control system generates treatment actions based on any of the depth information, visual infor-
(Continued)

mation, point cloud, and feature values. The control system actuates a treatment mechanism based on the classified pixels.

19 Claims, 24 Drawing Sheets

Related U.S. Application Data continuation of application No. 17/033,263, filed on Sep. 25, 2020, now Pat. No. 11,367,207.

(60) Provisional application No. 62/905,935, filed on Sep. 25, 2019.

(51) Int. Cl.
| | |
|---|---|
| *A01C 23/02* | (2006.01) |
| *A01G 25/09* | (2006.01) |
| *A01G 25/16* | (2006.01) |
| *A01M 7/00* | (2006.01) |
| *A01M 21/04* | (2006.01) |
| *G06V 10/762* | (2022.01) |
| *G06V 10/82* | (2022.01) |
| *G06V 20/10* | (2022.01) |
| *G06V 30/24* | (2022.01) |

(52) U.S. Cl.
CPC ............. *A01G 25/09* (2013.01); *A01G 25/16* (2013.01); *A01M 7/0042* (2013.01); *A01M 21/043* (2013.01); *G06T 7/50* (2017.01); *G06V 10/762* (2022.01); *G06V 10/82* (2022.01); *G06V 20/188* (2022.01); *G06V 30/248* (2022.01); *G06T 2207/10028* (2013.01); *G06T 2207/20081* (2013.01); *G06T 2207/20084* (2013.01); *G06T 2207/30188* (2013.01); *G06V 30/2528* (2022.01)

(58) Field of Classification Search
CPC . G06F 18/23; G06T 7/50; G06T 2207/20084; G06T 2207/10028; G06T 2207/30188; G06T 2207/20081; A01C 23/007; A01C 23/02; A01G 25/09; A01G 25/16; A01M 7/0089; A01M 7/0042; A01M 21/046; A01M 21/02; A01M 21/043
See application file for complete search history.

(56) References Cited

U.S. PATENT DOCUMENTS

| | | | |
|---|---|---|---|
| 10,524,402 B2 | 1/2020 | Redden | |
| 10,713,484 B2 | 7/2020 | Polzounov et al. | |
| 11,244,398 B2 | 2/2022 | Greenberg et al. | |
| 2013/0238201 A1 | 9/2013 | Redden | |
| 2014/0021267 A1 | 1/2014 | Sudduth et al. | |
| 2014/0180549 A1 | 6/2014 | Siemens et al. | |
| 2014/0338258 A1 | 11/2014 | Fischer et al. | |
| 2015/0027040 A1 | 1/2015 | Redden | |
| 2015/0254499 A1 | 9/2015 | Pang et al. | |
| 2016/0334276 A1 | 11/2016 | Pluvinage | |
| 2016/0350930 A1 | 12/2016 | Lin et al. | |
| 2017/0206415 A1 | 7/2017 | Redden | |
| 2017/0219711 A1 | 8/2017 | Redden et al. | |
| 2017/0316285 A1 | 11/2017 | Ahmed et al. | |
| 2017/0343675 A1 | 11/2017 | Oggier et al. | |
| 2018/0220589 A1 | 8/2018 | Burden | |
| 2020/0007847 A1 | 1/2020 | Redden | |
| 2020/0073389 A1 | 3/2020 | Flajolet et al. | |
| 2020/0090359 A1* | 3/2020 | Pillai | G06V 10/82 |
| 2020/0160033 A1* | 5/2020 | Kehl | G06T 7/73 |
| 2020/0349722 A1 | 11/2020 | Schmid et al. | |
| 2021/0103728 A1 | 4/2021 | Young | |
| 2021/0136993 A1 | 5/2021 | Revelli | |
| 2021/0158041 A1 | 5/2021 | Chowdhary et al. | |
| 2021/0286998 A1 | 9/2021 | Wilson et al. | |
| 2022/0174934 A1 | 6/2022 | Germain | |

FOREIGN PATENT DOCUMENTS

| | | |
|---|---|---|
| WO | WO 2009/153304 A1 | 12/2009 |
| WO | WO 2014/094056 A1 | 6/2014 |

OTHER PUBLICATIONS

Andert, Franz, et al. "Autonomous vision-based helicopter flights through obstacle gates." Journal of Intelligent and Robotic Systems 57 (2010): 259-280. (Year: 2010).*

European Patent Office, Extended European Search Report and Written Opinion, European Patent Application No. 20869403.4, Oct. 23, 2023, 13 pages.

Fawakherji, M. et al. "Crop and weeds classification for precision agriculture using context-independent pixel-wise segmentation," IEEE International Conference on Robotic Computing, Feb. 25, 2019, pp. 146-152.

United States Office Action, U.S. Appl. No. 17/033,318, filed Aug. 30, 2023, 29 pages.

United States Office Action, U.S. Appl. No. 17/033,292, filed May 5, 2023, 19 pages.

Ali, W. et al. "Visual Tree Detection for Autonomous Navigation in Forest Environment," IEEE Intelligent Vehicles Symposium, Jun. 4, 2008, pp. 560-565.

Gordon, A. et al., "Depth from Videos in the Wild: Unsupervised Monocular Depth Learning from Unknown Cameras," arXiv:1904. 04998v1, Apr. 10, 2019, pp. 1-17.

Inoue, K. et al. "The Development of Autonomous Navigation and Obstacle Avoidance for a Robotic Mower Using Machine Vision Technique," IFAC-PapersOnLine, vol. 52, No. 30, Jan. 1, 2019, pp. 173-177.

Mancini, M. et al., "Fast robust monocular depth estimation for obstacle detection with fully convolutional networks." 2016 IEEE/ RSJ International Conference on Intelligent Robots and Systems (IROS), Oct. 2016, pp. 4296-4303.

PCT International Search Report and Written Opinion, PCT Application No. PCT/US2020/052852, Jan. 26, 2021, 11 pages.

United States Office Action, U.S. Appl. No. 17/033,263, filed Aug. 20, 2021, 21 pages.

United States Office Action, U.S. Appl. No. 17/033,292, filed Sep. 16, 2022, 19 pages.

Wang, P. et al. "Towards Unified Depth and Semantic Prediction from a Single Image," IEEE Conference on Computer Vision and Pattern Recognition, Jun. 7, 2015, pp. 2800-2809.

Zhou, C. et al., "Joint Object Detection and Depth Estimation in Multiplexed Image," IEEE Access, vol. 7, Aug. 19, 2019, pp. 123107-123115.

United States Office Action, U.S. Appl. No. 17/314,218, filed Nov. 28, 2022, 26 pages.

* cited by examiner

IDENTIFYING AND AVOIDING OBSTRUCTIONS USING DEPTH INFORMATION IN A SINGLE IMAGE

CROSS-REFERENCE TO RELATED APPLICATIONS

This application is a continuation of U.S. patent application Ser. No. 17/314,218 filed on May 7, 2021, now U.S. Pat. No. 11,771,077, which is a continuation of U.S. patent application Ser. No. 17/033,263 filed on Sep. 25, 2020, titled "Identifying and Treating Plants Using Depth Information in a Single Image," now U.S. Pat. No. 11,367,207, which claims the benefit of U.S. Patent Application No. 62/905,935 filed on Sep. 25, 2019, titled "Monocular Plant Height Identification," which is hereby incorporated by reference in its entirety. This application is also related to co-pending U.S. patent application Ser. No. 17/033,318 filed on Sep. 25, 2020 titled "Extracting Feature Values from Point Clouds to Generate Plant Treatments," and U.S. patent application Ser. No. 17/033,292, filed on Sep. 25, 2020, now abandoned, titled "Ground Plane Compensation in Identifying and Treating Plants."

BACKGROUND

Field of Disclosure

This disclosure relates to using depth information to identify and treat plants in a field and, more specifically, applying a model to a single monocular image to extract depth information associated with the image and treat plants based on the depth information.

Description of the Related Art

It is difficult to apply treatments to individual plants in a field rather than large areas of the field. To treat plants individually farmers can, for example, manually apply treatment to plants, but this proves labor-intensive and costly when performed at industrial scale. In some cases, farming systems use imaging technology to identify and treat plants in a field (e.g., satellite imaging, color imaging, thermal imaging, etc.). In some examples, these systems have proven robust in identifying individual plants using high quality imaging and identification techniques (e.g., real-time semantic segmentation), but many of these systems are limited in their ability to properly identify and treat individual plants (e.g., satellite imaging, color sensing, etc.).

Additionally, some farming systems use depth sensing technology to identify and treat crops in a field (e.g., range imaging, etc.), but these systems are also limited in their ability to properly identify and treat individual plants. In particular, existing depth sensing systems are not well suited to farming machines. For example, depth sensing systems are costly, difficult to calibrate, and may require controlled operating environments (e.g., lighting, orientation). Thus, farming machines relying on depth information to identify and treat plants at an individual plant level are often error prone. Further, farming machines employing both visual and depth sensors to identify plants suffer compounded problems when using both systems to identify plants. Thus, a farming machine with a single sensor, or multiple sensors, that allows for capturing high quality depth information in order to identify and treat individual plants would be beneficial.

SUMMARY

A farming machine includes one or more sensors for capturing an image as the farming machine moves through a field. The image includes visual information representing objects in the field. The farming machine includes a control system, and the control system applies a depth identification model to the image to extract depth information from the visual information representing the objects in the field. The depth information includes distance values for each pixel in the image representing the distance from the sensor to the object represented by the pixel. The depth identification model may be a convolutional neural network trained using previous images of the field labelled with depth information.

The control system can classify one or more pixels in the image as a plant based on the depth information. Further, the control system can determine a treatment action for the identified plant. In an example, the control system can actuate a treatment mechanism to apply a treatment to identified plants. In some cases, the control system modifies one or more parameters (e.g., operating, treatment, sensor) of the farming machine as part of the treatment actions. Operating parameters may include a speed of the farming machine, a height of the treatment mechanism relative to the ground, a position of the treatment mechanism, and/or a direction of the farming machine. Treatment parameters may include a height of the treatment mechanism, a position of a treatment area of the treatment mechanism, a type of treatment applied by the farming machine, a time the treatment mechanism is actuated, and/or a duration that the treatment mechanism is actuated.

In some examples, the control system implements the depth identification model as a convolutional neural network. The neural network may include a plurality of layers. The control system encodes the image into the first layer of the convolutional neural network and applies various functions to the encoded image to transform the image to a reduced image. The control system classifies latent features in the reduced image as distances for each pixel in the image. Here, distance indicates the distance between the camera lens and the pixel representing the object but could be different representations of distance as described herein. Once classified, the control system applies additional functions to the image to decode the image. The decoded image includes, for every pixel in the image, values representing the distance between the camera lens and the object represented by the pixel.

To train the model, a control system may access a plurality of single images representing views in a field. Each of the single images is from an image sensor attached to the farming machine as the farming machine moves through the field. Each of the images captured by the image sensor comprises one or more visual pixels representing objects in the field. Further, the control system may access a plurality of depth images of the field. Each of the depth images is from a depth sensor attached to the farming machine as the farming machine moves through the field. Each of the depth images captured by the depth sensor comprises one or more depth pixels representing depth values. The depth values are the distance from the depth sensor to the object in the field.

In an embodiment, the visual sensor and the depth sensor have the same field of view or a substantially similar field of view. As such, the control system can label the visual information in the images with the depth values from the depth images. The labelled images can then be used to train a depth identification model to identify depth values from a single image.

The decoded image may be used to generate a depth map. A depth map is an array of pixels representing a distance between the camera and the objects represented in the image. In some examples, values in the depth map may also represent a separation between a plant and a treatment mechanism of the farming machine (e.g., using known separations between the camera and treatment mechanism).

Additionally, the control system can compensate for ground planes in the image when identifying and treating plants. That is, an image (or images) includes pixels representing height (e.g., distance from the ground, distance from the treatment mechanism, distance from the sensor) and/or classes (e.g., crop, weed, plant, etc.). The control system applies a plant identification model to the image to classify the pixels, identify the ground plane, identify heights of pixels accounting for the ground plane, identify plants, and identify plants for treatment based on their height from the ground plane.

To do so, the control system classifies pixels in the image using image data of the accessed image. For example, the control system may classify pixels as plant pixels or ground pixels. The control system then determines a ground plane from the ground pixels, and there are several methods of determining a ground plane. For example, the control system may determine a slope of the ground pixels and a correction factor for the pixels based on the slope. Once determined, the control system may apply the correction factor to the pixels to "normalize" the image such that the ground plane is approximately flat. The correction factor may be applied to any or all of the pixels, classes of pixels, etc. In some cases, the correction factor is applied to subsequent images captured by the image sensor.

The control system then determines the height for each plant pixel based on the distance between the ground plane and the plant pixel. Further, because plants are usually represented by several plant pixels rather than one, the control system identifies plant pixel clusters as plants. Plant pixels clusters are clusters of pixels the control system determines are likely to represent a plant.

The control system assigns each plant pixel cluster a representative height above the ground plane. The representative height may be an average height, a median height, an uppermost height, a bottommost height, etc. of the plant pixels in the cluster. Further, the height dissimilarity may be quantified as a distance between a bottommost plant pixel of the plant pixel cluster and a topmost ground pixel, an average height between the plant pixel cluster and the ground pixels, and any other measure of proximity between the plant pixel cluster and the ground pixels.

In various examples, the height of the plant pixel cluster relative to the ground plane may indicate that a plant needs to be treated (e.g., it is too tall or too short). As such, the control system can identify a plant treatment based on the representative height of a plant cluster relative to the other plant clusters in the field. For example, if an identified plant pixel cluster is much shorter than the other plant pixel clusters in the field, the control system identifies that plant for treatment. The height dissimilarity may be based on various factors. For example, the factors can include a time period the farming machine is operating in the field, an amount of time since a planting of the field, an identified type of one or more of the plants in the field, and a weather history of the field. Once the plant is identified for treatment, the control system may actuate one or more plant treatment mechanisms to treat the plant.

In various embodiments, the control system is able to identify plants as crops or weeds rather than just plants. This allows for a higher fidelity in accurately treating plants with the plurality of plant treatment mechanisms.

Additionally, in some examples, the control system implements a plant identification model with a single encoder and two decoders. In this case, the control system encodes the accessed image to a first layer of a convolutional neural network. The neural network is configured with two decoders: a first for identifying heights, and a second for classifying pixels. That is, the first decoder generates an output vector giving heights in the accessed image, while the second decoder generates an output vector classifying pixels in the accessed image. The control system can then use the results of both decoders to identify and treat plants.

The control system can generate a point cloud using depth information and label information from images obtained by the farming machine. In various examples, the control system generates the point cloud using data from a single image sensor, multiple image sensors, or a combination of image and depth sensors. The point cloud includes an array of points labelled as plant (or weed, or crop) and associated with a three-dimensional coordinate. In aggregate, the points in the point cloud represent the field as imaged by the image sensor(s) and/or depth sensor(s). In some examples, the control system may access a point cloud.

The control system can extract various features from the point cloud to generate treatment actions. To do so, the control system applies one or more pre-processing functions to the point cloud. Some example pre-processing functions include determining characteristics for the scene in the field and/or modifying labels or three-dimensional coordinates of the points in the point cloud.

In one example, modifying a label of points in the point cloud includes identifying a first cluster of points surrounding a second cluster of points in the point cloud. The first cluster of points may have a different label than the second cluster of points, and the second cluster of points may have a size smaller than a threshold cluster size. In this case, the control system may change the label of the second cluster of points to that of the first cluster of points. In another example, modifying the label of points in the point cloud includes identifying a cluster of points in the point cloud having a size smaller than a threshold size and removing the labelled points in the cluster from the point cloud.

In another example, modifying the label of points in the point cloud includes identifying a plant cluster in the point cloud comprising a set of plant points and determining a plant height for the plant points in the plant cluster. Here, the plant height represents a distance of the plant points from a ground plane. The height may be the maximum height of the plant points in the plant cluster or the average height of the plant points in the cluster, etc. The control system then assigns a representative three-dimensional coordinate to the plant points in the plant cluster such that the representative three-dimensional coordinate is the distance of the plant points from the ground plane.

In another example, modifying the label of points in the point cloud includes identifying ground clusters in the point cloud each comprising a set of ground points. The control system determines a ground plane for the ground points in ground clusters which represents the average height of the ground points across the point cloud. The control system then determines, for each of the ground points, a relative distance between the ground point and the ground plane and assigns a representative three-dimensional coordinate to the ground points such that the ground points are approximately coincident with the ground plane.

When extracting characteristics of the field as part of pre-processing, the control system can employ other processes. For example, the control system may identify plant clusters in the point cloud and determine one or more row planes for the plants. Each row plane represents a crop row formed by identified plant clusters. In another example, the control system may determine a vector representing an orientation of the farming machine relative to the scene in the field.

After pre-processing, the control system identifies a cluster of points in the point cloud representing one or more plants based on the labels and three-dimensional coordinates. There are many methods of identifying clusters of points as plants. Some examples include adopting the label of the classified pixels used to generate the point cloud, using clustering methods, etc.

The control system then derives a feature value for the identified plants based on the extracted characteristics for those plants. Again, there are many different feature values that can be derived from the point cloud. For example, the control system can determine a height for the plant, the height a difference between a plane for a cluster of pixels representing the plant and a ground plane.

In another example, the control system may determine a size for the plant. In an example, the size is an area of the points in the cluster of pixels representing the plant projected onto a ground plane of the point cluster. Additionally, the control system may determine a row plane separation for the plant. In an example, the row plane separation is a difference between a location of the cluster of points representing the plant and a row plane of the point cluster.

In another example, the control system may determine a physiological value for the plant. The physiological value is a quantification of a plants physiological status based on the three-dimensional coordinates of the points representing the plant in the cloud. The physiological status may be a growth stage, a flowering stage, a measure of plant health, a quantification of plant phytochemistry, a quantification of chlorophyll levels, or a quantification of plant nutrition.

In another example, the control system may determine a canopy closure value for the one or more plants. A canopy closure value is a quantification of a degree to which foliage of the one or more plants has shaded the ground. Additionally, the control system may determine a stand count for the one or more plants. The stand count is a quantification of a number of plants in the field.

The control system can determine still other feature values useful for identifying plant treatments. For example, the control system can determine a relative size metric of the plant based on the point cloud. The relative size metric may be a relative size between the plant and a neighboring plant, a relative size between the plant and a statistical size of the plants in the field, a relative size between the plant and an expected weed size, a relative size between the plant and an expected plant size, a relative size between the plant and a historical size of a plant in a historical field, etc.

In another example, the control system can determine a risk value of the plant based on the point cloud. The risk value quantifies the risk value quantifying the risk of mistreating the plant in the field. The risk value can be based on a commodity price of a crop being grown in the field, a yield estimate of a crop being grown in a field, a species of the plant, etc.

In another example, the control system can determine an occlusion factor for the plant based on the point cloud. The occlusion factor a likelihood that the at least one plant is occluding a second plant behind the at least one plant. In response to the occlusion factor indicating that the plant is occluding a second plant, the control system can actuate a treatment mechanism to treat the second plant as the farming machine travels past second plant in the field.

In response to the feature value indicating the plants should be treated, the control system actuates a treatment mechanism to treat the plant as it travels past the plant in the field. There are many treatment actions as described herein. Those treatment actions may include actuating a treatment mechanism. Similarly, the control system may determine not to treat a plant based on a derived feature value. In this case, the control system generates treatment instructions such that the plurality of treatment mechanisms do not treat the plant as the farming machine travels past the at least one plant in the field. Other treatment examples include generating and acting on a treatment map, modifying treatment parameters, modifying operating parameters of the farming machine, modifying sensor parameters of image and/or depths sensors, and modifying a treatment schedule. Additionally, modifying treatment can include scheduling an additional pass of the farming machine past the plant, and actuating the treatment mechanism to further treat the plant on the additional pass.

In a particular example, in response to the derived feature value indicating that a scheduled treatment for the plant should be modified, the control system may modify those treatment instructions. One example of modifying treatment instructions includes modifying a scheduled chemical makeup for use in the treatment. The modified chemical makeup may comprise a selection of chemicals from two or more chemical sources, or a mixture of two or more chemicals. In another example, modifying treatment instructions includes modifying a scheduled flow rate of a chemical during treatment. The rescheduled flow rate may comprise an increased flow rate, an additional flow generated by at least another treatment mechanism, or a flow rate from a different configuration such that a volume per unit area resulting from the modified flow rate is different from original flow rate.

Figure 1A:
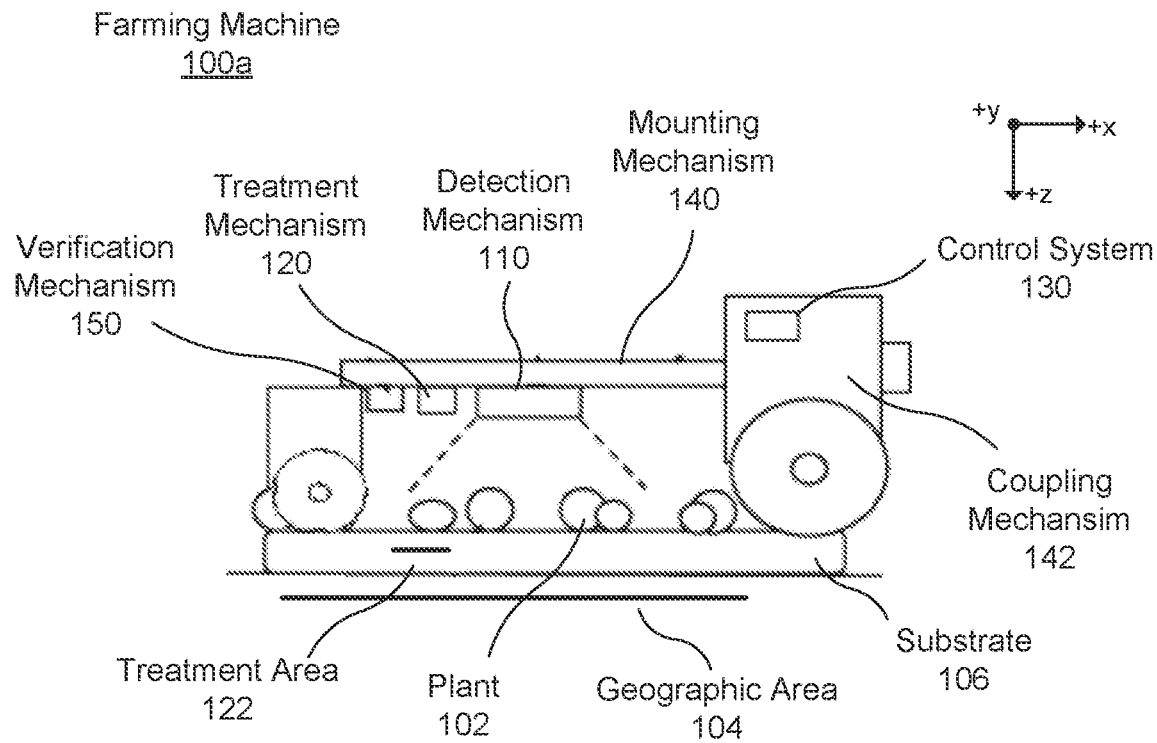
FIG. 1A illustrates a side view of a farming machine, in accordance with a first example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A farming machine includes one or more sensors capturing information about the surrounding environment (i.e., "scene") as the farming machine moves through a field. The scene can include various objects (i.e., plants, ground, obstructions, etc.) used to determine farming actions (e.g., actuating a treatment mechanism, changing a route, changing speed, etc.) for the farming machine to perform within the scene.

The farming machine includes a control system that processes the information obtained by the sensors to identify plants and other objects to generate the corresponding treatment actions. There are many examples of a farming machine processing visual information obtained by an image sensor coupled to the farming machine to identify and treat plants and identify and avoid obstructions. For example, similar to the farming machine as described in U.S. patent application Ser. No. 16/126,842 titled "Semantic Segmentation to Identify and Treat Plants in a Field and Verify the Plant Treatments," filed on Sep. 10, 2018, which is hereby incorporated by reference in its entirety.

In some cases, a farming machine may utilize depth information obtained by a depth sensor coupled to identify and treat plants. For example, a farming machine may employ a light detection and ranging system (LIDAR) to identify and treat plants that are too tall, too short, too close, etc. In another example, ultrasonic sensing techniques may be employed. Similarly, the farming machine may utilize depth information from a depth sensor to more accurately time treatment actions. That is, the depth information may be used to determine a time to perform a treatment action based on the identified plants distance from the camera. In another example, the farming machine may employ the depth information to generate a map including a three-dimensional representation of the underlying scene.

Traditionally, sensors employed by a farming machine are configured to obtain a particular type of information. Some example sensors include a camera to obtain visual information, a depth sensor to obtain depth information, a gyroscope to obtain stability information, etc. Unfortunately, many depth sensing techniques are not well suited for farming machines. Further, for sensors well suited for depth sensing on a farming machine, they do not offer a high enough resolution for plant by plant treatment. These issues stem in part from the chaotic environments of farming machines operating in a field can make it very difficult for traditional depth sensing techniques to accurately determine depth information. To illustrate, stereo image sensors are both complex and expensive to implement on a farming machine. That is, a stereo image depth sensor may be unable to accurately determine depth information because the stereo camera calibration is perturbed during machine operation (due to vibration or collision with external objects for example). This perturbation causes errors in the 3D reconstruction of the scene which can reduce the accuracy of the resulting 3D information. Computationally expensive online calibration techniques are generally required to deal with calibration "drift" in stereo camera setups. However, a single camera which is capable of estimating depth information does not suffer from this issue.

Described herein is a farming machine that identifies and treats plants using depth information extracted from the visual information of one or more image sensors. Visual information may include, for example, color information encoded as pixels in an image (e.g., three channels in an RGB image), or some other visual information. Depth information may include, for example, a distance between a point in an image and the image sensor, a distance between a point in the image and a location on or near the sensor, a distance between a point in the image and a known plane, a distance between two points in the image, or some other depth information.

The image sensors of the farming machine are configured to capture an image of plants and other objects in the scene. In an embodiment, each sensor is independent of one another and is not used to generate depth information using different viewpoints between the image sensors. A control system of the farming machine processes the visual information in the captured images with a depth identification module to determine depth information in the image. The farming machine determines the depth information by identifying latent features in the visual information corresponding to real-world depth information.

The control system can also process the depth information to generate a depth map representing the depth information extracted from the image. A depth map is an array of pixels with each pixel in the depth map representing a distance value extracted from the corresponding pixel in the image.

Furthermore, the control system can combine depth information in the depth map with a labelled image to generate a labelled point cloud. A labelled image is an image whose visual information representing a real-world object is labelled with data corresponding to that real-world object. A labelled point cloud is a three-dimensional representation of the scene including various points in three dimensions representing objects therein.

The control system can extract various feature information (e.g., a feature value) describing the scene from the depth information and/or the visual information. Some feature information can include, height of a sensor, tilt of a sensor, ground plane, ground plane orientation, plant row orientation, plant size, plant separation, plant type, plant species, plant physiology, etc. The control system can use the feature information to determine the presence of a plant and/or generate a farming action.

The control system can identify a plant (or some other object) using any of the extracted depth, visual, or feature information. The control system determines a treatment action for the identified plant based on the visual, depth, and feature information. Treatment actions may include actuating a treatment mechanism, modifying an operating parameter, modifying a treatment parameter, and/or modifying a sensor parameter. Other treatment actions are also possible. The farming machine performs the treatment action in the field. For example, the farming machine may actuate a treatment mechanism to treat the identified plant.

Thus, the control system employs the various models described herein to process depth, visual, and feature information to allow the farming machine to apply targeted treatments to one or more plants in the field. For example, depth information allows the farming machine to determine more accurate treatment actions for identified plants. That is, a typical control system may be able to identify a plant, but without depth information treating the identified plant accurately is challenging because its actual position remains unknown. In determining the depth information, the control system can determine the position of the plant relative to the sensor and correctly treat the plant.

II. Farming Machine

II.A Example Machine Configurations

Figure 1B:
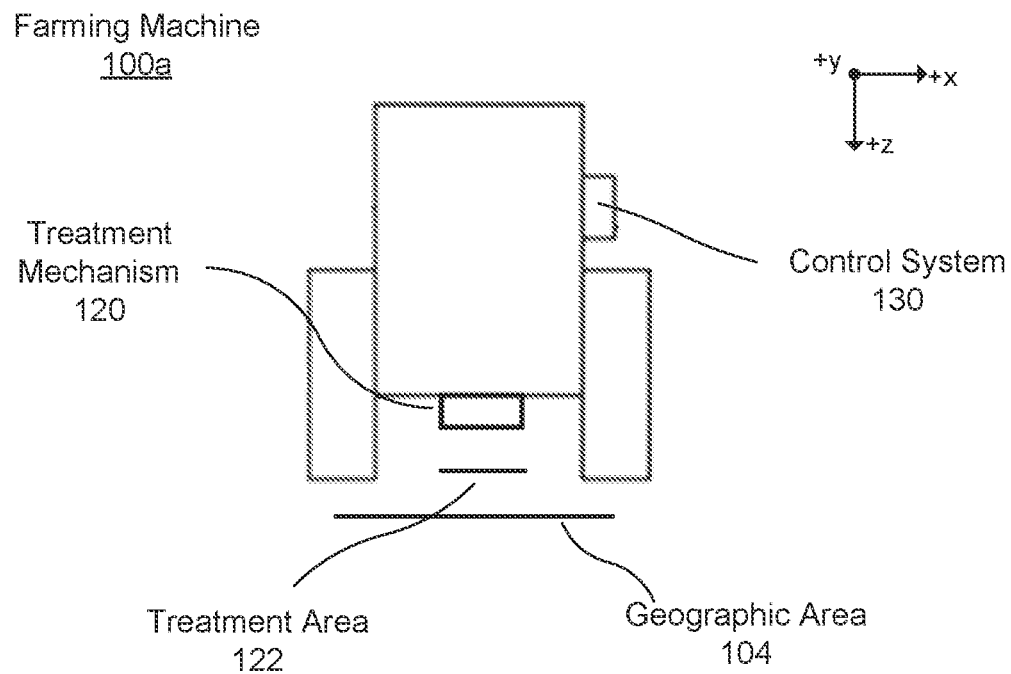
FIG. 1B illustrates a front view of a farming machine, in accordance with the first example embodiment.
Figure 1C:
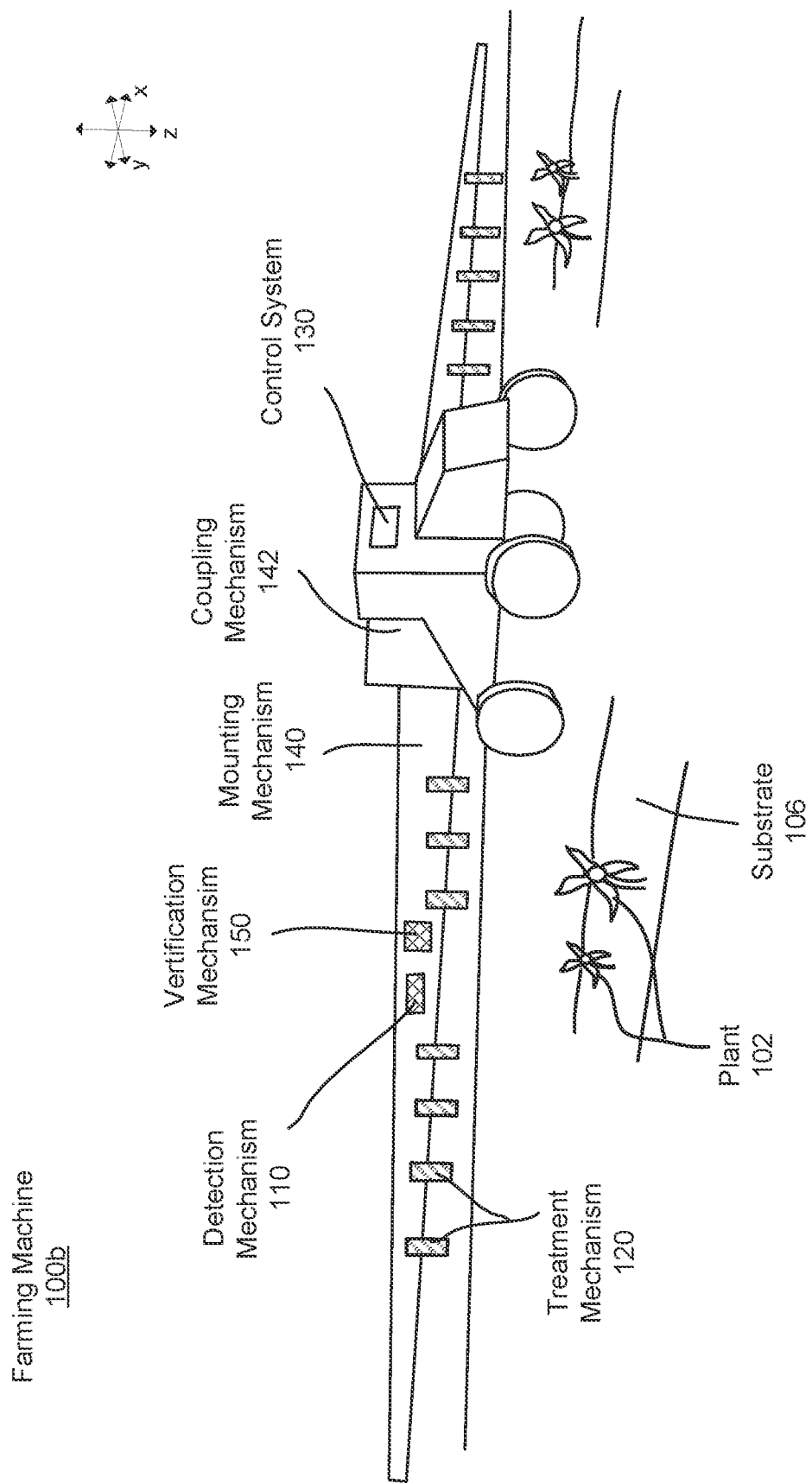
FIG. 1C illustrates an isometric view of a farming machine, in accordance with a second example embodiment.
Figure 1D:
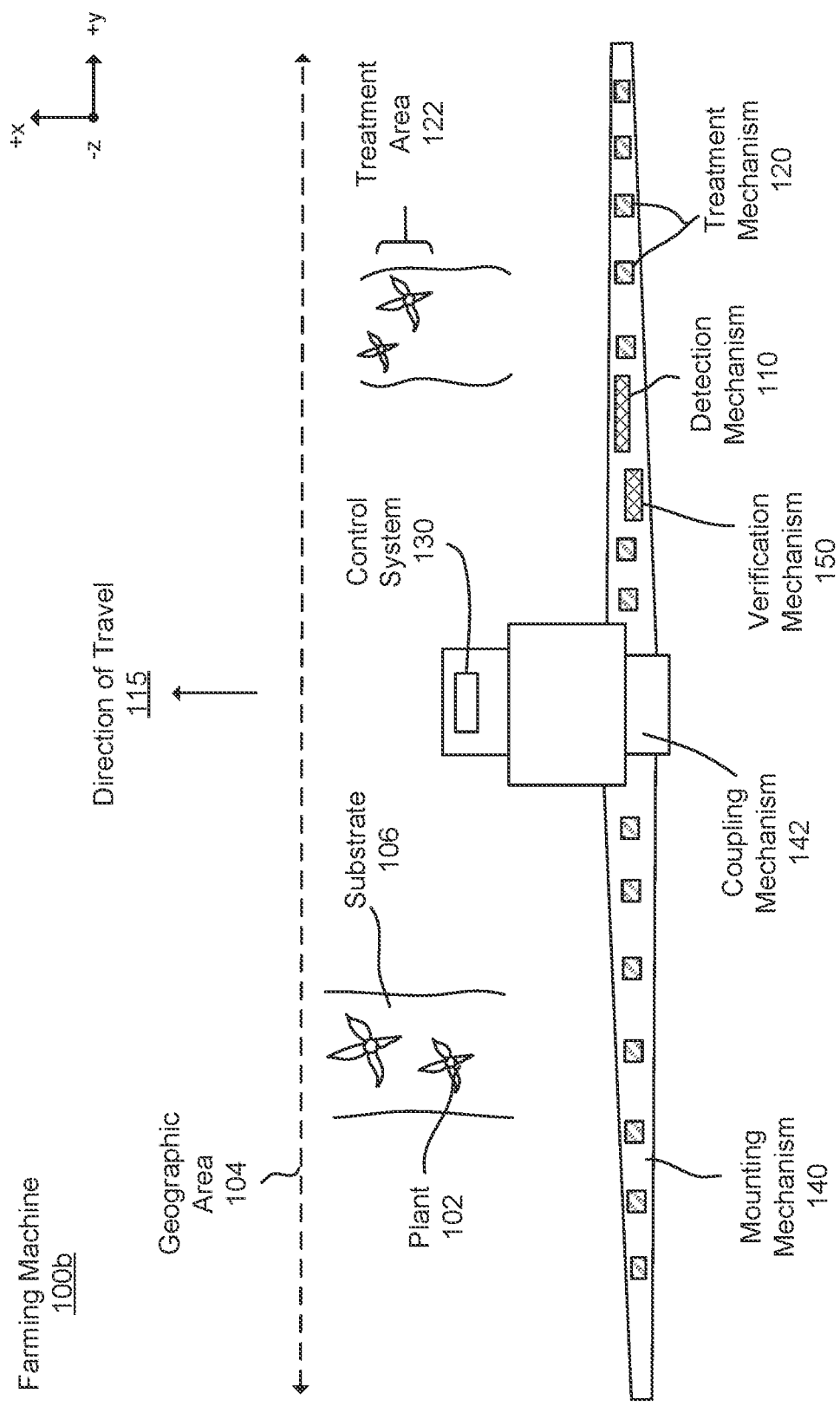
FIG. 1D illustrates a top view of a farming machine, in accordance with the second embodiment.
Figure 1E:
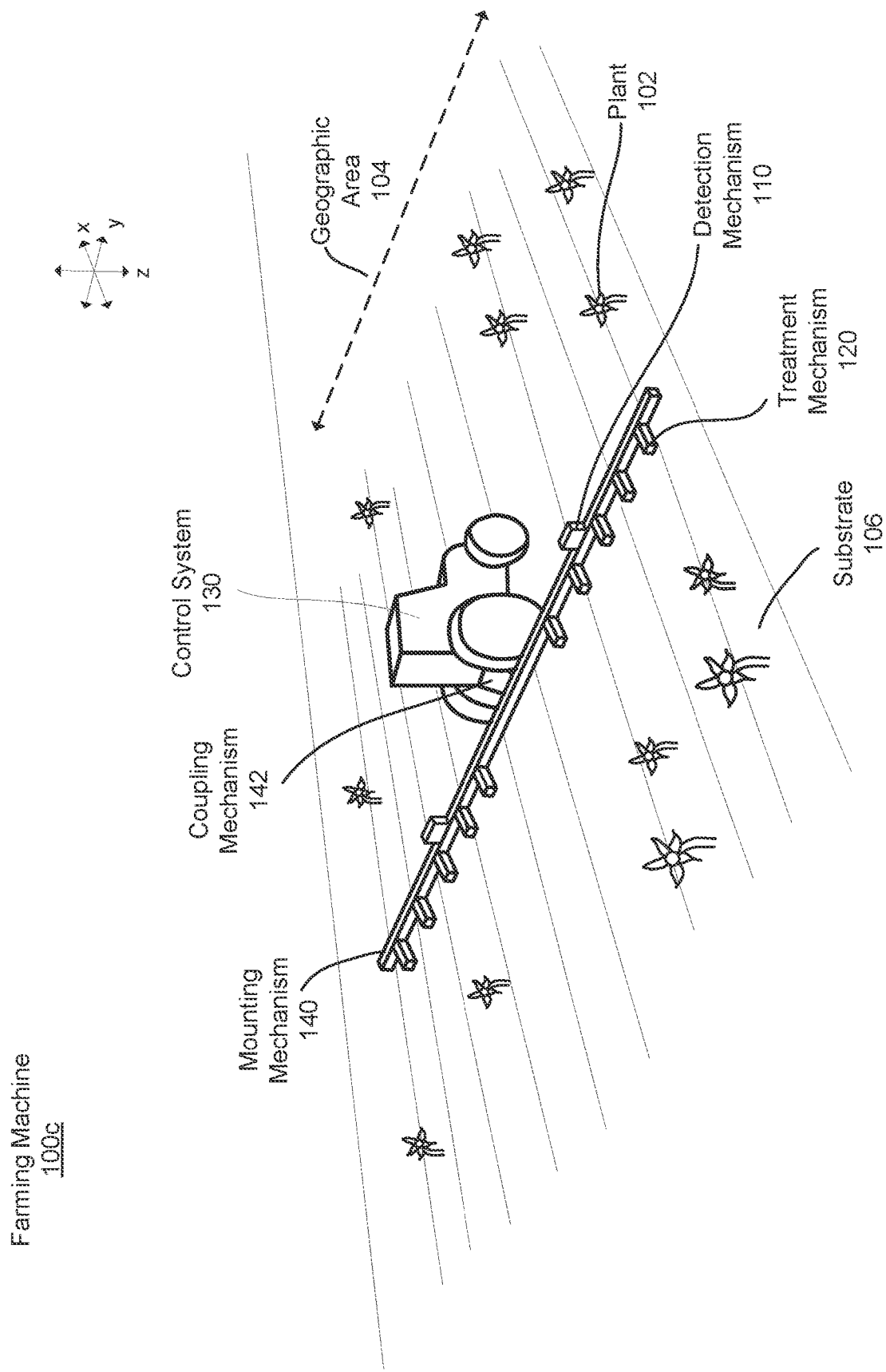
FIG. 1E illustrates an isometric view of a farming machine, in accordance with a third example embodiment.

A farming machine that identifies and treats plants may have a variety of configurations, some of which are described in greater detail below. For example, FIG. 1A is a side view of a first embodiment of a farming machine and FIG. 1B is a front view of the first embodiment of the farming machine of FIG. 1A. FIG. 1C is an isometric view of a second embodiment of a farming machine and FIG. 1D is a top view of the second embodiment of the farming machine of FIG. 1C. FIG. 1E is a third embodiment of a farming machine, in accordance with one embodiment. The farming machine 100, illustrated in FIGS. 1A-1E, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102, the ground, or the substrate 106 within a geographic area 104. Often, treatments function to regulate plant growth. The treatment is directly applied to a single plant 102, but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), both of which are to be treated. Each plant 102 can include a stem, arranged superior to (e.g., above) the substrate 106, which supports the branches, leaves, and fruits of the plant. Each plant can additionally include a root system joined to the stem, located inferior to the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, insecticide, some other pesticide, or water. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100a includes a single treatment mechanism, wherein the treatment mechanism 120 is actuated or the farming machine 100a moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation shown, such as in FIGS. 1C-1E, the farming machine (i.e., 100b, 100c) includes an array of treatment mechanisms 120, wherein the treatment mechanisms 120 are actuated or the farming machine (i.e., 100b, 100c) is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 16. The control system 130 can apply one or more models to identify one or more plants in the field. For example, the control system 130 applies a plant identification module that utilizes depth and label information to identify plants in the field, described in greater detail below. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In the embodiment of FIGS. 1C-1E, the mounting mechanism 140 extends outward from a body of the farming machine (i.e., 100b, 100c) in the positive and negative y-direction (in the illustrated orientation of FIGS. 1A-1E) such that the mounting mechanism 140 is approximately perpendicular to the direction of travel 115. The mounting mechanism 140 in FIGS. 1C-1E includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drivetrain coupled to the first and/or second set of wheels). In other example systems, the system may have any other means of traversing through the field.

In some configurations, the farming machine 100 additionally includes a verification mechanism 150 that functions to record a measurement of the ambient environment of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

II.B System Environment

Figure 2:
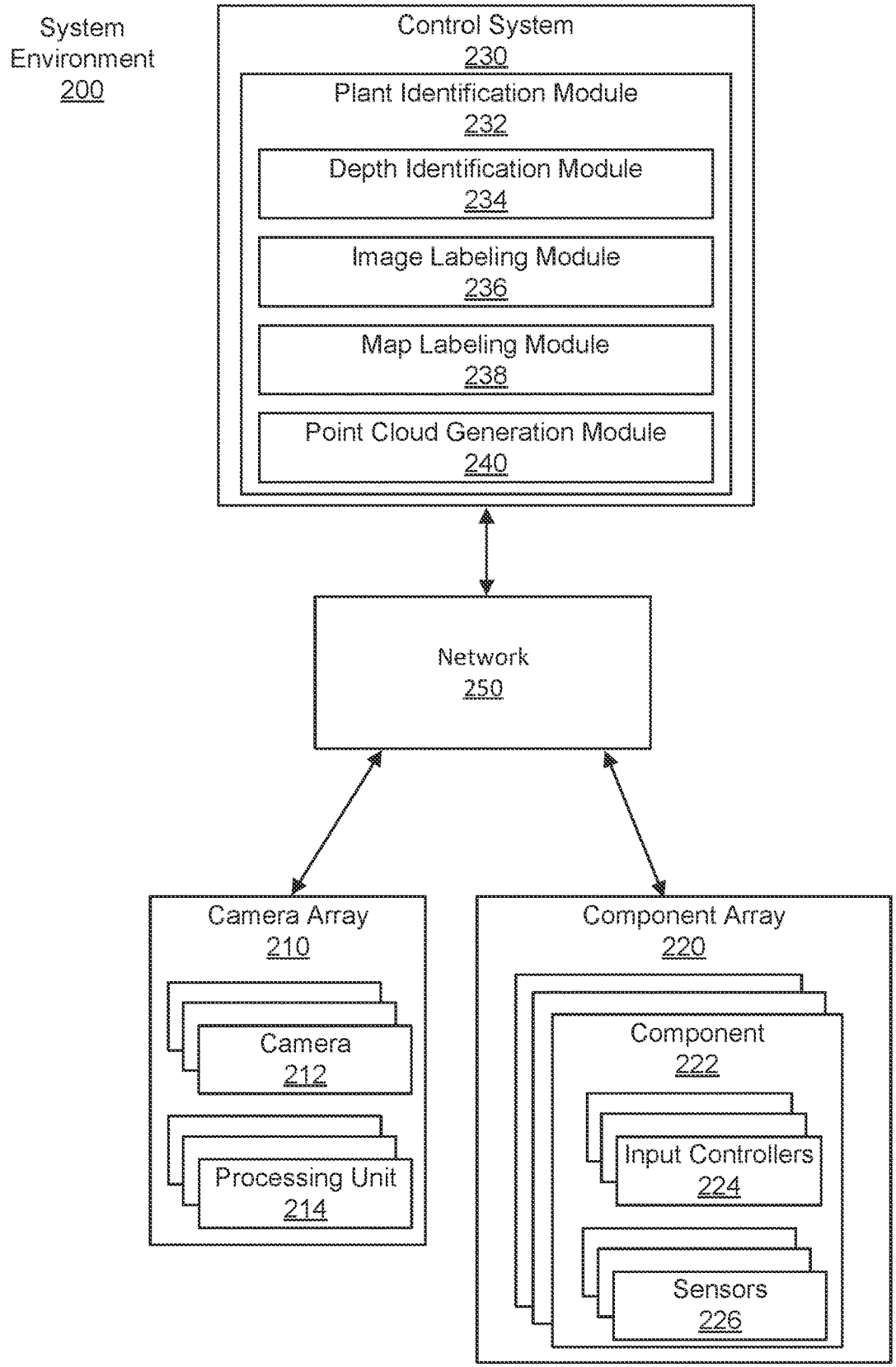
FIG. 2 is a block diagram of the system environment for the farming machine, in accordance with one or more example embodiments.

FIG. 2 is a block diagram of the system environment for the farming machine, in accordance with one or more example embodiments. In this example, the control system 210 is connected to a camera array 220 and component array 230 via a network 250 within the system environment 200.

The camera array 210 includes one or more cameras 212. The cameras 212 may be a detection mechanism 110 as described in FIG. 1. Each camera 212 in the camera array 210220 may be controlled by a corresponding processing unit 214 (e.g., a graphics processing unit). In some examples, more than one camera 212 may be controlled by a single processing unit 214. The array 210 captures image data of the scene around the farming machine 100. The captured image data may be sent to the control system 230 via the network 250 or may be stored or processed by other components of the farming machine 100.

The component array 220 includes one or more components 222. Components 222 are elements of the farming machine that can take farming actions (e.g., a treatment mechanism 120). As illustrated, each component has one or more input controllers 224 and one or more sensors, but a component may include only sensors or only input controllers. An input controller controls the function of the component. For example, an input controller may receive machine commands via the network and actuate the component in response. A sensor 226 generates measurements within the system environment. The measurements may be of the component, the farming machine, or the environment surrounding the farming machine. For example, a sensor 226 may measure a configuration or state of the component 222 (e.g., a setting, parameter, power load, etc.), or measure an area surrounding a farming machine (e.g., moisture, temperature, etc.).

The control system 230 receives information from the camera array 210 and component array 220 and generates farming actions. In particular, the control system 230 employs a plant identification module 232 to identify plants in the scene and generate corresponding treatment actions. The plant identification module 232 includes a depth identification module 234, an image labeling module 236, a map labeling module 238, and a point cloud generation module 240. As described herein, the depth identification module 234 identifies depth information from visual information obtained by the camera array, the image labelling model 236 labels visual information and depth information obtained by the camera array, the map labeling module 238 labels depth maps, and the point cloud generation module 240 generates a labelled point cloud based on the depth information and labelled images.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

III. Sensing Depth

III.A Existing Depth Sensing Systems

As described above, it may be useful to gather visual information and depth information to identify and treat plants in a scene. Generally, a farming machine may gather visual information using one or more image sensors (e.g., digital camera, a camera module, a thermal imaging device, etc.). Likewise, a farming machine may gather depth information using a depth sensing system employing a variety of devices and/or techniques.

Some example depth sensing systems may include devices such as proximity sensors, stereo cameras, time-of-flight cameras, structured light sensors (e.g., emitting patterned light and sensing changes to the pattern), radar, etc. Example techniques include range image techniques such as stereo triangulation, sheet of light triangulation, structured light analysis, time-of-flight analysis, interferometry, etc. To illustrate, a depth sensing system may include one or more image sensors and employ range imaging techniques to generate an image including visual information and depth information. Some techniques use light (e.g., sheet of light triangulation) while others may use multiple sensors (e.g., stereo triangulation).

Importantly, many of these systems and techniques are not well suited to farming applications. For example, range imaging techniques using a plurality of sensors may be difficult to implement on a moving farming machine. Additionally, range imaging techniques such as structured light and time-of-flight techniques may require precise control of light surrounding a scene which may not be possible in outdoor field conditions. Further, many of the depth sensing systems and techniques may not be gathering depth information at a range suited to accurately identifying plants as the farming machine travels through the field. However, while these depth imaging techniques are not as robust as monocular depth sensing technique described herein, their use in determining depth information for other functionality of the control system 130 is not negated (e.g., depth maps, labelled depth maps, point clouds, etc.).

III.B Example System Configuration

As described above, a depth sensing system that employs a single image sensor to obtain visual information and processes that visual information to determine depth information would be highly beneficial. Again, the depth sensing system does not apply techniques similar to range imaging. That is, the depth sensing system does not perform triangulation on multiple images, sheet of light triangulation on an image, analyze a structured light pattern in an image, determine time of flight for light obtained by the sensor, etc. Instead, in an embodiment, a farming machine includes a sensor (or sensors) for capturing an image of a plant, and a control system applies a depth identification module to an image captured by the sensor to extract depth information from the visual information in the image.

Figure 3A:
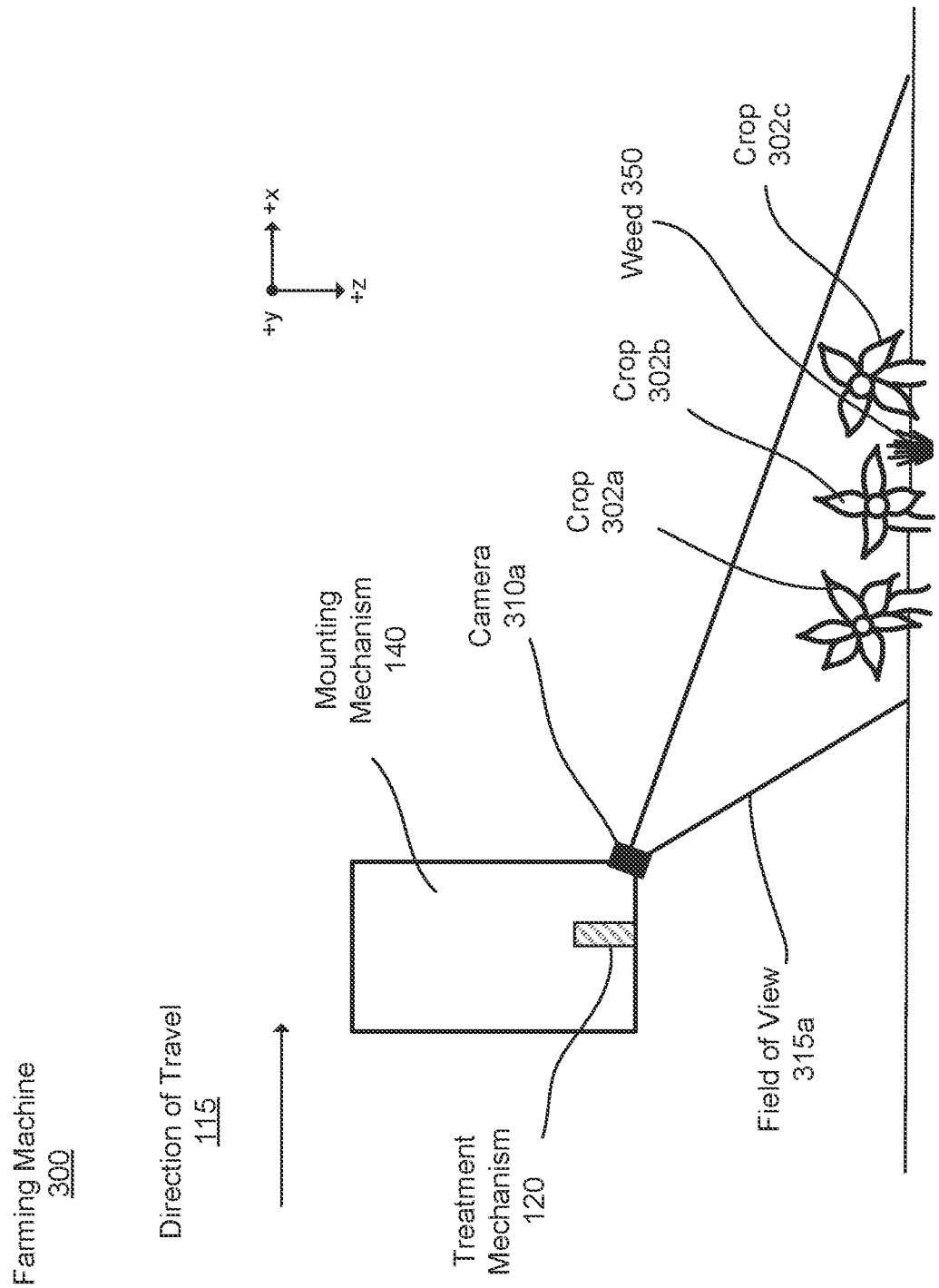
FIG. 3A illustrates a cross-sectional view of a farming machine including a sensor configured to capture an image of one or more plants, in accordance with a first example embodiment.
Figure 3B:
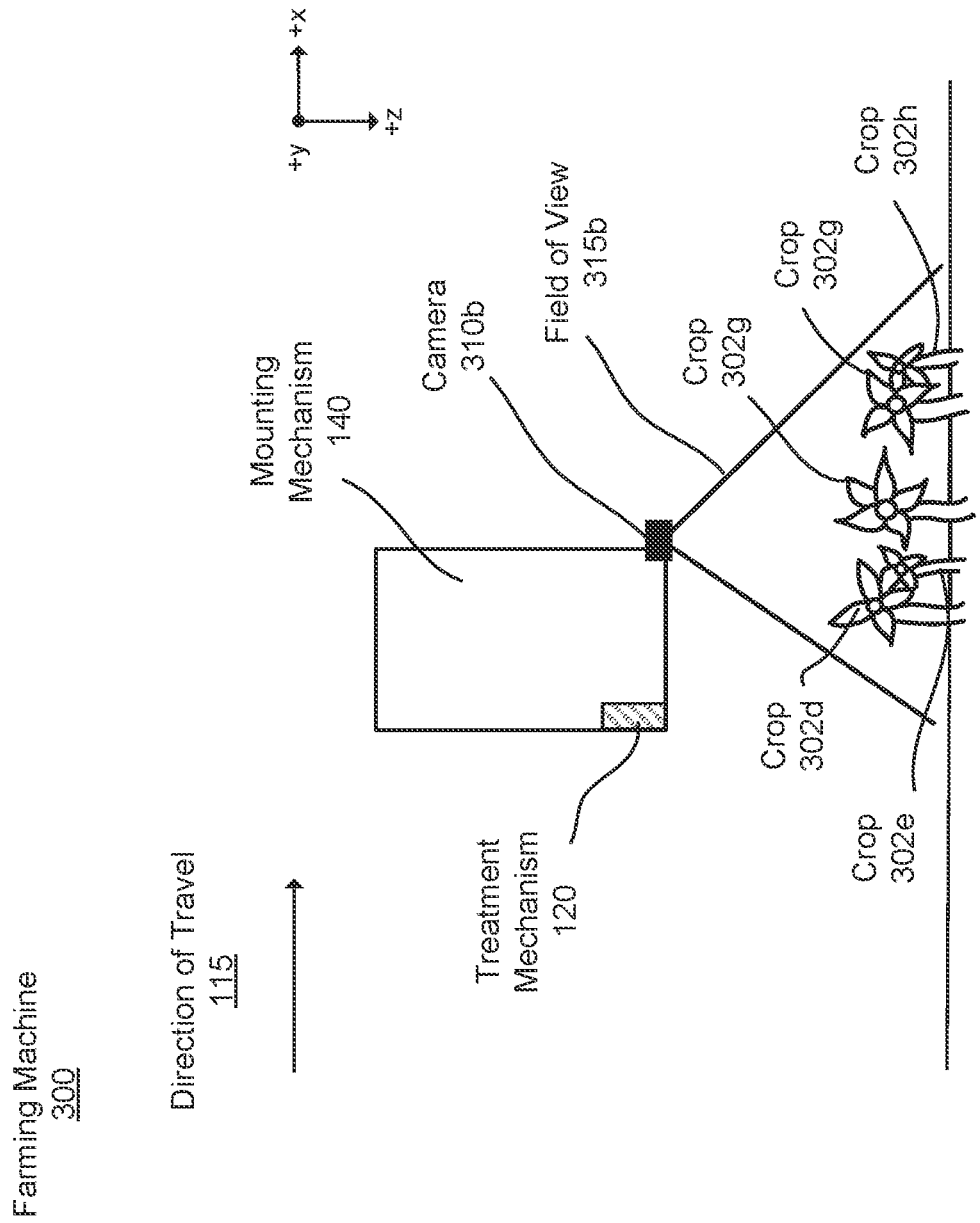
FIG. 3B illustrates a cross-sectional view of a farming machine including a sensor configured to capture an image of one or more plants, in accordance with a second example embodiment.

FIGS. 3A-3B illustrate a cross-sectional view of a farming machine including a sensor configured to capture an image of one or more plants, in accordance with some example embodiments. The farming machine 300 may be similar to any of the farming machines described in regard to FIG. 1A-1E. In the embodiment of FIGS. 3A-3B, the farming machine includes a camera array. The camera array includes one or more cameras on a front surface of the farming machine. As illustrated, only one camera 310 is visible in FIGS. 3A and 3B because the other cameras lie inside or outside the plane of the image. For reference, the camera in FIG. 3A is camera 310A, and the camera in FIG. 3B is camera 310B, but the cameras are referred to collectively as camera 310.

Here, the camera 310 is an image sensor (e.g., RGB camera, near infrared camera, ultraviolet camera, multispectral camera), but could be other types of image sensors suitable for capturing an image of plants in a field. The farming machine 300 can include additional cameras mounted along the mounting mechanism 140. The additional cameras may be the same type of image sensor as camera 310, or different types of sensors.

In FIG. 3A-3B, the camera 310 have a field of view 315. The field of view 315, herein, is the angular extent of an area captured by a camera 310. The field of view of the camera 310a in FIG. 3A is field of view 310A, and the camera in FIG. 3B is camera 310B, but the cameras are referred to collectively as camera 310.

The area captured by the camera 310 (i.e., the field of view 315) may be affected by properties (i.e., parameters) of the camera 310. For example, the field of view 315 may be based on, for example, the size of the lens and the focal length of the lens. Additionally, the field of view 315 may depend on an orientation of the sensor. For example, an image sensor with a tilted orientation ("tilted image sensor") may generate an image representing a trapezoidal area of the field, while an image sensor with a downwards orientation ("downwards image sensor") may generate an image representing a rectangular area of the field. Other orientations are also possible.

In FIG. 3A, the camera 310a is a tilted image sensor. The camera 310a is mounted to an inferior forward region of the mounting mechanism 140, and the camera 310a is tilted downwards towards the plants. Described herein, a downwards tilt angle is defined as an angle between the positive z-axis and the positive x-axis. The field of view 315a includes several plants: crops 302a, 302b, 302c, and weed 350. The distance between the camera 310a and each plant varies based on the location of the plant and the height of the plant. For example, crop 302c is farther than crop 302a from the camera 310a. The camera 310a can be tilted in other directions.

FIG. 3A also illustrates a treatment mechanism 120 of the farming machine. The treatment mechanism 120 is located behind the camera 310a such that the treatment mechanism 120 traverses over a plant after the camera 310a as the farming machine 300 moves in the direction of travel 115.

In other words, the treatment mechanism 120 is located behind the camera 310a along the z-axis. Thus, the farming machine 300 has a lag distance along the z-axis between the lens of the camera 310a and the treatment mechanism 120. The lag distance allows the control system 130 to capture and process an image of a plant before the treatment mechanism 120 passes over the plant.

In some configurations, the treatment mechanism 120 is located approximately in line with the image camera 310 along an axis parallel to the y-axis. In some configurations, the treatment mechanism 120 is configured to move along the mounting mechanism 140 in order to treat an identified plant. For example, the treatment mechanism may move up and down along a y-axis to treat a plant. Other similar examples are possible. For example, other relative orientations between an image camera 310 and treatment mechanism 120 are also possible. Additionally, the treatment mechanism 120 can be angled towards or away from the plants.

In the embodiment of FIG. 3B, the camera 310b is a downward image sensor. The camera 310b is coupled to a forward region of the mounting mechanism 140 and the lens of the camera 310b is approximately parallel to the ground. As such, the camera 310b can capture an image of plants substantially below the camera 310b. The field of view 315b includes crops 302d, 302e, 302f, 302g and 302h. Similar to FIG. 3A, the farming machine 300 includes a treatment mechanism 120 located behind the camera 310b such that the treatment mechanism 120 traverses over the plants 302 after the camera 310b.

In various configurations, a camera 310 may have any suitable orientation for capturing an image of a plant. Further, a camera 310 may be in positioned at any suitable location along the mounting mechanism 140 such that it can capture images of a plant as a farming machine travels through the field.

IV. Depth Identification Module for Single Image Sensors

As described above, a farming machine (e.g., farming machine 300) includes a sensor (e.g., camera 310) configured to capture an image of a portion of a field (e.g., field of view 315) as the farming machine moves through the field. The farming machine also includes a control system (e.g., control system 130) configured to process the image and apply a depth identification module (e.g., depth identification module 234) to extract depth information from visual information in the image.

The control system 130 may identify a plant in the image based on the depth information using a plant identification module (e.g., plant identification module 232). Further, the control system 130 may be configured to generate and take a treatment action for the identified plant based on the extracted depth information. For example, the control system 130 can determine whether a plant is a weed or a crop based on the height of the plant, and treat the plant accordingly. To illustrate, commercial crop plants are planted at approximately the same time and, therefore, are all approximately the same height such that their determined height can be used to determine whether the system identifies the plant as a crop or a weed. In another example, the control system 130 may use the depth information as an additional indicator to determine whether a plant is a weed or a crop. To illustrate, the control system 130 may combine the depth information with plant shape, texture, structure, etc. to determine if it is a weed or crop. Whatever the case, the depth identification module 234 can improve accuracy and precision of plant treatment.

Notably, for the examples described herein, the control system 130 determines depth information from accessed images that are captured by a single image sensor and contain visual information representing depth. However, the control system 130 can also determine depth information from other images, combination of images, etc. including visual information representing depth. For example, can determine depth from a combination of stereo images.

IV.A Generating a Depth Map Using a Depth Identification Module

Figure 4A:
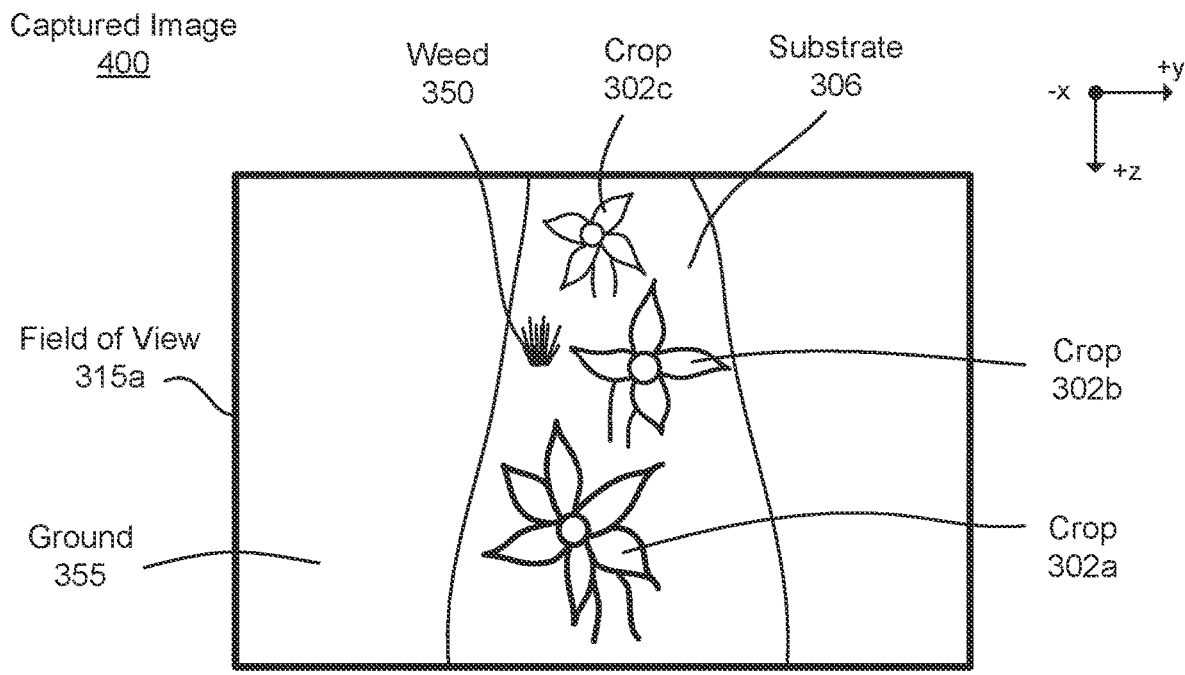
FIG. 4A illustrates a captured image, in accordance with a first example embodiment.

The cameras 310a and 310b are configured to capture an image including an array of pixels representing visual information. FIG. 4A illustrates a captured image, in accordance with a first example embodiment. In this example, the captured image 400 corresponds to the field of view 315a captured by the sensor 310a in FIG. 2A. More particularly, the captured image 400 illustrates crops 302a, 302b, and 302c, and weed 350 in the field of view 315a. The field of view also has pixels representing the ground 355 and the planting substrate 306. While the plants in the field have similar heights, the plants shown in the captured image 400 are different sizes due to their dissimilar distances from the sensor 310a.

Figure 4B:
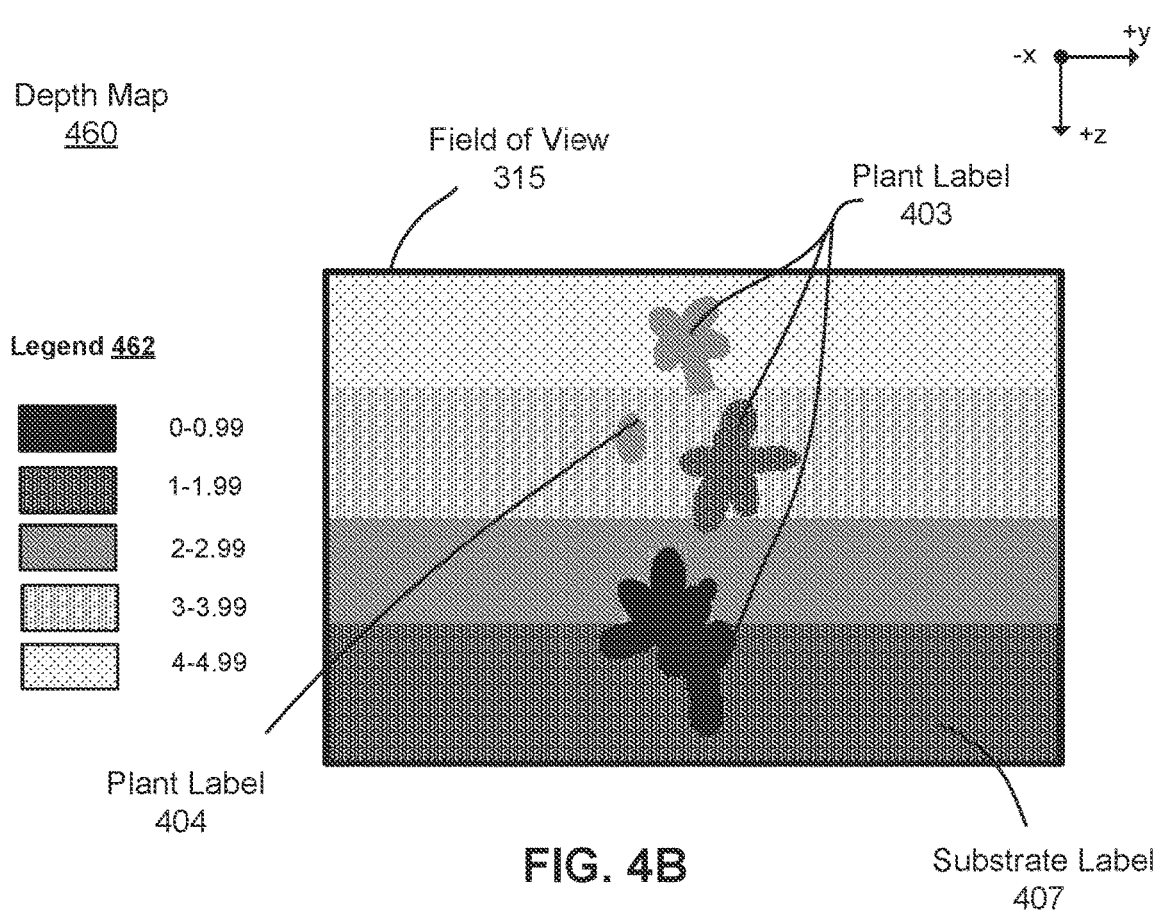
FIG. 4B illustrates a depth map generated based on a captured image, in accordance with a first example embodiment.

The control system 130 applies a depth identification module 234 to generate a depth map. FIG. 4B illustrates a depth map, in accordance with a first example embodiment. The control system 130 generates the depth map 460 based on the captured image 400. This process is described in greater detail below. The depth map 460 includes depth information extracted from the captured image 400. For example, here, the depth map 460 includes a plurality of pixels, where each pixel corresponds to a quantization and/or quantification of the depth information extracted from the captured image 400. The quantification is a measure of the distance from the camera, while the quantization is a binning of those depth values. Therefore, a pixel in the depth map 460 represents, for example, a distance between a center point of the lens of the sensor 310a and the object it represents in the captured image 400, and, in some cases, the group of similarly distanced pixels that the pixel belongs to within the depth map 460.

Depth maps can present extracted depth information in a variety of manners. For example, the control system 130 generates a depth map by labelling each pixel of the captured image 400 with a corresponding distance value (e.g., a depth of 1.2 m in one pixel and a depth of 0.5 m in another pixel). In some cases, the control system 130 groups pixels of similar distances when generating a depth map. For example, the control system 130 groups pixels into five groups based on their depth information. In FIG. 3B, the legend 462 illustrates five groups and their corresponding representative depth information ranges. In this example, the control system 130 groups pixels corresponding to a distance between 0.00 m and 0.99 m (e.g., pixels having a value of 0.10 m, 0.30 m, 0.70 m), pixels corresponding to a distance between 1.00 m and 1.99, etc. The darkest layer (i.e., 0.00 m-0.99 m) represents objects closest to the image sensor 310a, and the lightest layer (i.e., 4.00 m-4.99 m) represents objects farthest from the image sensor 310a. In other embodiments, the depth map 460 can include a fewer or greater number of groupings, and the control system 130 can group pixels in other manners. Additionally, while the values indicated by each layer represent distances (e.g., feet, inches, meters, centimeters), in other embodiments, the values may be some other representation of depth information (e.g., a unitless scale, a scaled set of distances, etc.).

Figure 5A:
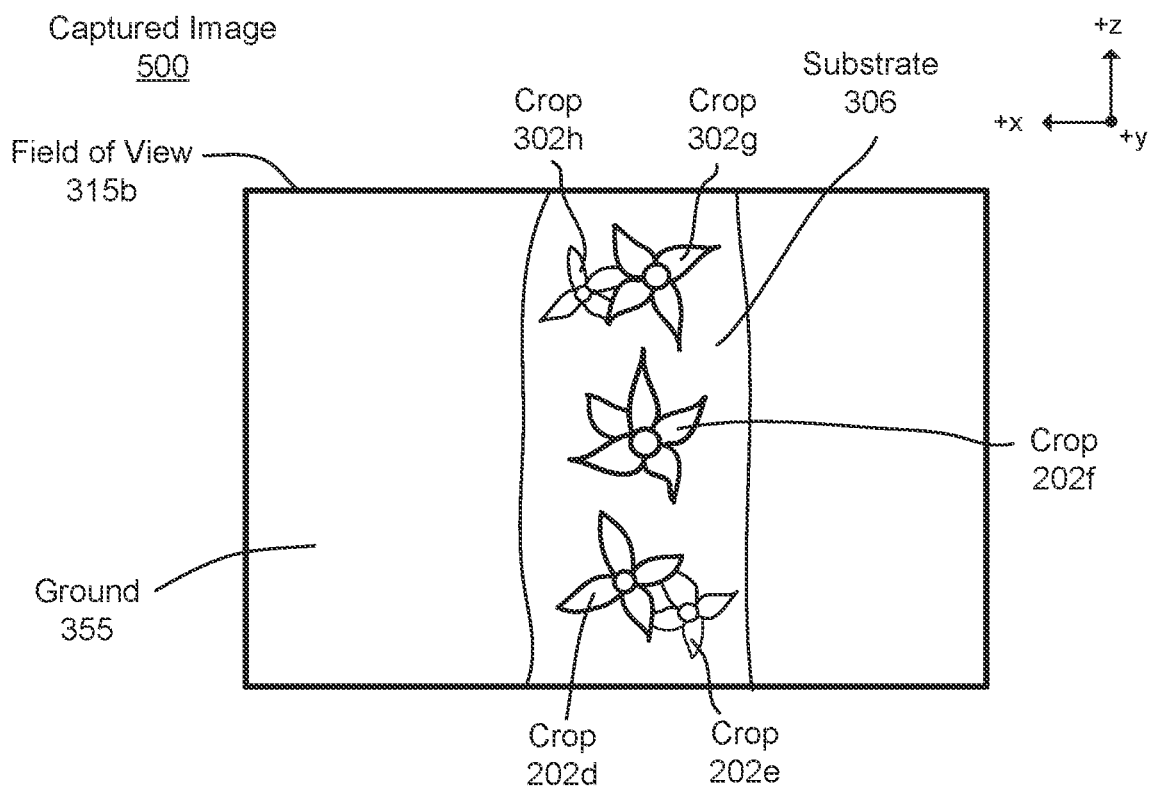
FIG. 5A illustrates a captured image, in accordance with a second example embodiment.

FIG. 5A illustrates an example of a captured image, in accordance with a second example embodiment. The captured image 400 corresponds to the field of view 315b captured by the camera 310b (i.e., a downward sensor). The captured image 400 includes crops 302d, 302e, 302f, 302g and 302h. The image also includes the planting substrate 306 and the ground 355. The control system 130 can apply a depth identification module to extract depth information associated with the captured image 400.

Figure 5B:
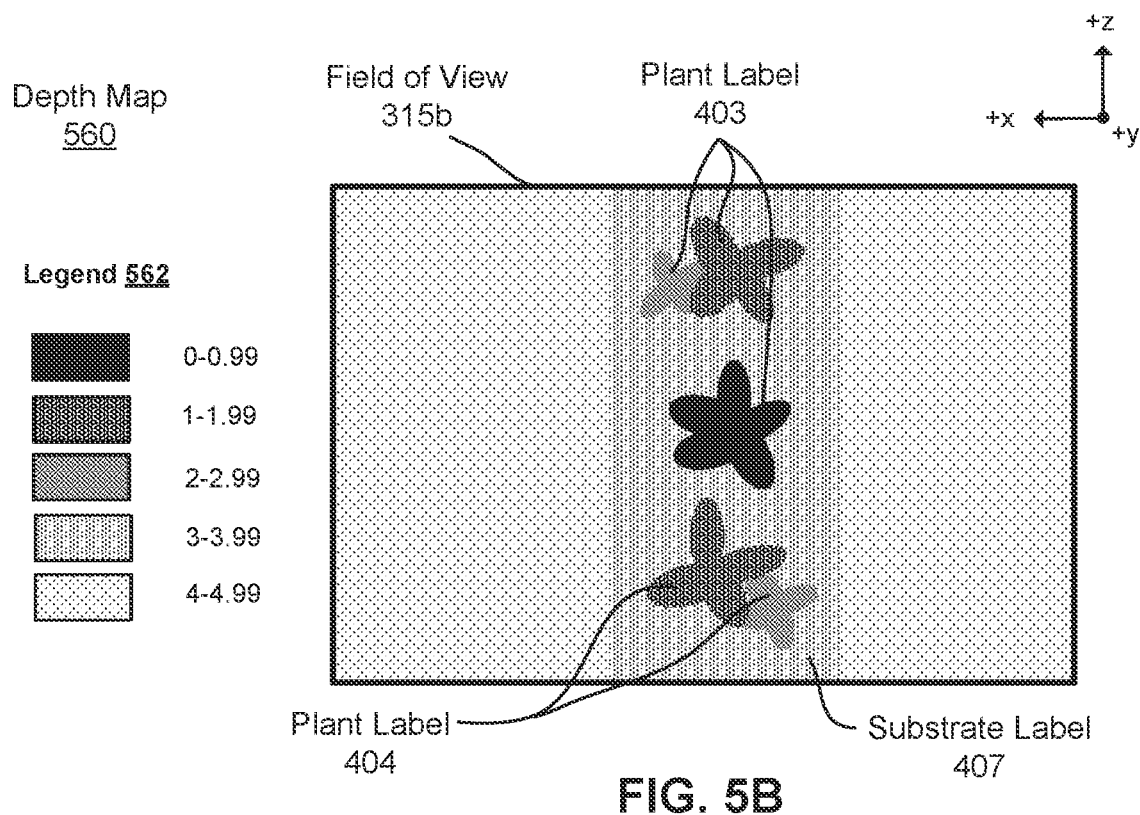
FIG. 5B illustrates a depth map, in accordance with a second example embodiment.

FIG. 5B illustrates another example of a depth map, in accordance with a second example embodiment. The control system 130 applies the depth identification module to generate the depth map 460 corresponding to the captured image 400. The depth map 460 corresponds to the field of view 315b. The legend 562 in FIG. 5B is the same legend as shown in FIG. 4B. Thus, the depth map 560 includes five groups corresponding to different distance values associated with the image pixels.

Notably, FIG. 5A includes pixels representing crops that overlap with one another in the field of view (e.g., plat 302h and plant 302g, and plant 302d and plant 302e). Each crop is indicated in the image by distinct pixels, and correspondingly, they are distinctly indicated by their depth in the depth map 560. This is important because it allows the plant identification module 232 to determine that plants having overlapping pixels are separate rather than the same.

In some cases, rather than generating a depth map, the depth identification module 234 can encode the extracted depth information into the captured image. For example, if the captured image is a typical three channel RGB image, the depth identification module may generate a four channel RGBD image (where D represents depth information). In this manner, a depth map may be seen as a fourth channel of a captured image after the depth identification module extracts depth information from the image.

IV.B Identifying Plants in Depth Maps

The control system 130 employs the plant identification module 232 to classify groups of pixels as plants based on depth information extracted by the depth identification module 234. For example, each pixel in a depth map (e.g., depth map 460) corresponds to a distance value, and the control system 130 may classify groups of pixels having similar distances as a plant. The control system 130 can also classify other objects in the image based on the depth information and label the objects accordingly. For example, the control system 130 can classify pixels as a substrate or ground based on their distances.

The control system 130 can classify pixels as a plant (or other objects) using a variety of methods. In a first example, the control system 130 may apply a clustering algorithm to a depth map to identify groups of pixels representing plants. For example, referring to FIG. 4B, the control system 130 may apply a clustering algorithm to the depth map 460 to identify group pixels with similar depth information that may represent a plant. The control system 130 determines the grouped pixels are a plant if they are above (or below) a threshold distance, and labels the pixels as a plant 403. In a second example, the control system 130 may apply a classification model to a depth map to identify a plant in the depth map. For example, the control system 130 may employ a Naïve Bayes, a k-Nearest Neighbors, a Random Forest, an encoder/decoder, etc. algorithm to a depth map to identify plants. In a third example, the control system 130 may apply one or more statistical analyses to a depth map to identify plants. For example, the control system 130 may apply a maximum likelihood estimation to the depth map and label pixels having a probability above a threshold probability as a plant. The control system 130 labels pixels identified as representing a plant with a plant label 403. Other methods of identifying plants based on depth information are also possible.

The control system 130 may also classify pixels with more robust labels using any of the techniques described herein. For example, the control system 130 may classify one group of pixels representing a plant as a crop, and another group of pixels representing a plant as a weed, and treat each group individually. The control system 130 may also label pixels as a substrate (e.g., ground, grass, dirt, etc.), an obstruction (e.g., rocks, field debris, etc.), etc. For example, referring to FIG. 4B, the control system 130 may generate a first plant label 403 for some of the plants, a second plant label 404 for other plants, and a substrate label 407 for the substrate. In another example, referring to FIG. 5B, the control system may generate plant labels based on quantized depth bins of the plants. That is, the control system generates a first plant label for some of the plants (e.g., depth of 0-0.00), a second plant label for other plants (e.g., depth between (1-1.99), and third plant label for other plants (e.g., 2-2.99).

In some examples, the control system 130 can access and utilize additional information to classify pixels based on the depth information. For example, the control system 130 may access an expected height of plants in the field and compare the depth information to the expected height. Pixels having depth information similar to the expected height may be labelled as plants. For example, crops may be expected to have a depth between 1-1.99, and any plant having a depth outside of that range is labelled as a weed. Other additional information may include, weather history, plant type, field planting time, a period of time the machine is operating in the field, etc.

The control system 130 can use the classified pixels to generate treatment actions for the identified plants and objects, as described below. In some cases, the control system 130 may generate treatment actions for objects in the field of view with the appropriate label. For example, the control system 130 may only determine treatment actions for pixels labelled as a crop, etc. This can improve efficiency of determining and implementing treatment actions as a farming machine travels through the field.

IV.C Implementation of a Depth Identification Module

There are several methods to determine depth information in a captured image. One method of determining depth information from a captured image is a depth identification module that operates on a fully convolutional encoder-decoder network. For example, the depth identification module (e.g., depth identification module 234) can be implemented as functions in a neural network trained to determine distance information from visual information encoded as pixels in an image. The depth identification module may function similarly to a pixelwise semantic segmentation label where the classes are depths rather than object labels.

Figure 6:
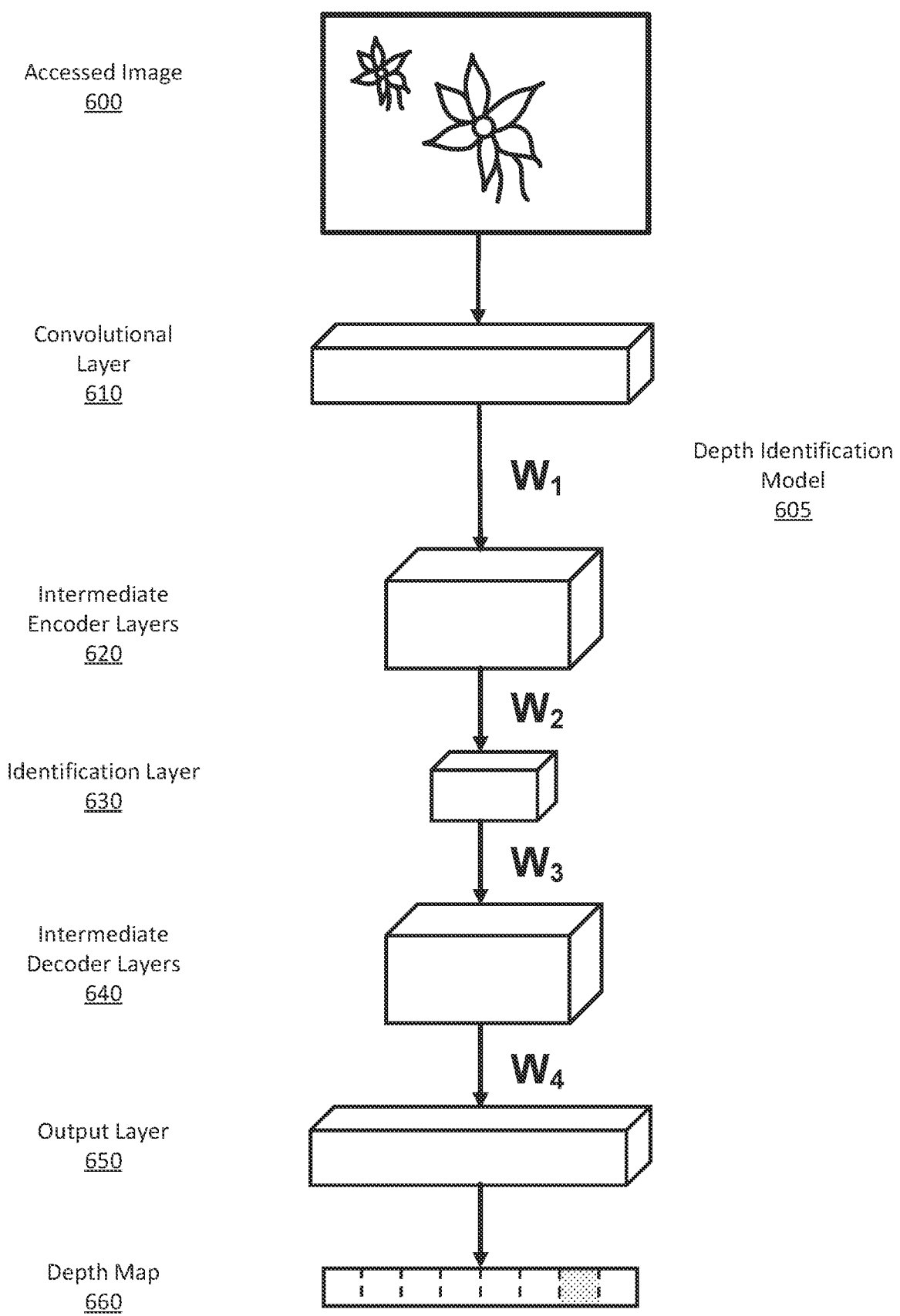
FIG. 6 illustrates a representation of a depth identification module, in accordance with one or more example embodiments.

The depth identification module 234 can be implemented as a depth identification model 605 including an encoder-decoder network. A control system (e.g., control system 130)

of the farming machine (e.g., farming machine 100) can execute the depth identification module to identify distances associated with pixels in an accessed image 600 and quickly generate an accurate depth map 660. To illustrate, FIG. 6 is a representation of a depth identification module, in accordance with one or more example embodiments. The previously identified depth information (e.g., depth labels for a captured image, a depth map, etc.) may have been identified by another depth identification module, a human identifier, or some combination thereof.

In the illustrated embodiment, referred to throughout the specification, the depth identification model 605 is a convolutional neural network model with layers of nodes, in which values at nodes of a current layer are a transformation of values at nodes of a previous layer. A transformation in the model 605 is determined through a set of weights and parameters connecting the current layer and the previous layer. For example, as shown in FIG. 6, the example model 605 includes five layers of nodes: layers 610, 620, 630, 640, and 650. The control system 130 applies the function $W_1$ to transform from layer 610 to layer 620, applies the function $W_2$ to transform from layer 620 to layer 630, applies the function $W_3$ to transform from layer 630 to layer 640, and applies the function $W_4$ to transform from layer 640 to layer 650. In some examples, the transformation can also be determined through a set of weights and parameters used to transform between previous layers in the model. For example, the transformation $W_4$ from layer 640 to layer 650 can be based on parameters used to accomplish the transformation $W_1$ from layer 610 to 620.

The control system 130 inputs an accessed image 600 (e.g., captured image 300, 400) to the model 605 and encodes the image onto the convolutional layer 610. After processing by the control system 130, the model 605 outputs a depth map 660 (e.g., 360, 460) decoded from the output layer 650. In the reduced representation layer 630, the control system 130 employs the model 605 to identify depth information (e.g., distances) associated with pixels in the accessed image 600. The depth information may be indicative of plants and other objects in the field. The control system 130 reduces the dimensionality of the convolutional layer 610 to that of the reduced representation layer 630 to identify depth information in the accessed image pixels, and then increases the dimensionality of the reduced representation layer 630 to generate a depth map 660 (e.g., 360, 460). In some examples, the depth identification model 605 can group pixels in an accessed image 600 based on depth information identified in the reduced representation layer 630 when generating the depth map 660.

As previously described, the control system 130 encodes an accessed image 600 to a convolutional layer 610. In one example, a captured image is directly encoded to the convolutional layer 610 because the dimensionality of the convolutional layer 610 is the same as a pixel dimensionality (e.g., number of pixels) of the accessed image 600. In other examples, the captured image can be adjusted such that the pixel dimensionality of the captured image is the same as the dimensionality of the convolutional layer 610. For example, the accessed image 600 may be cropped, reduced, scaled, etc.

The control system 130 applies the model 605 to relate an accessed image 600 in the convolutional layer 610 to depth information in the reduced representation layer 630. The control system 130 retrieves relevant information between these elements by applying a set of transformations (e.g., $W_1$, $W_2$, etc.) between the corresponding layers. Continuing with the example from FIG. 5, the convolutional layer 610 of the model 605 represents an accessed image 600, and identification layer 630 of the model 605 represents depth information encoded in the image. The control system 130 identifies depth information corresponding to pixels in an accessed image 600 by applying the transformations $W_1$ and $W_2$ to the pixel values of the accessed image 600 in the space of convolutional layer 610. The weights and parameters for the transformations may indicate relationships between the visual information contained in the accessed image and the inherent depth information encoded in the accessed image 600. For example, the weights and parameters can be a quantization of shapes, distances, obscuration, etc. associated with depth information in an accessed image 600. The control system 130 may learn the weights and parameters using historical user interaction data and labelled images.

In the reduced representation layer 630, the control system maps pixels in the image to associated depth information based on the latent information about the objects represented by the visual information in the captured image. The identified depth information can be used to generate a depth map 660. To generate a depth map 660, the control system 130 employs the model 605 and applies the transformations $W_3$ and $W_4$ to the depth information identified in reduced representation layer 630. The transformations result in a set of nodes in the output layer 650. The weights and parameters for the transformations may indicate relationships between distance values of the image pixels in the accessed image 600 and a depth map 660. In some cases, the control system 130 directly outputs a depth map 660 from the nodes of the output layer 650, while in other cases the control system 130 decodes the nodes of the output layer 650 into a depth map 660. That is, model 605 can include a conversion layer (not illustrated) that converts the output layer 650 to a depth map 660.

The weights and parameters for depth identification model 605 can be collected and trained, for example, using data collected from previously captured depth images and visual images and a labeling process. By employing a labeling process to train the model, the model 605 can identify plants in effectively real time as the farming machine travels through the field. reduces the amount of time required by the control system 130 employing the model 605 to identify depth information associated with pixels in an image. The labelling and training process is described in more detail below.

Additionally, the model 605 can include layers known as intermediate layers. Intermediate layers are those that do not correspond to convolutional layer 110 for the accessed image 600, the reduced representation layer 630 for the depth information, and an output layer 650 for the depth map 660. For example, as shown in FIG. 5, layers 620 are intermediate encoder layers between the convolutional layer 610 and the reduced representation layer 630. Layer 640 is an intermediate decoder layer between the reduced representation layer 630 and the output layer 650. Hidden layers are latent representations of different aspects of an accessed image that are not observed in the data, but may govern the relationships between the elements of an image when identifying distances associated with pixels in an image. For example, a node in the hidden layer may have strong connections (e.g., large weight values) to input values and values of nodes in an identification layer that share the commonality of distance values. Specifically, in the example model of FIG. 5, nodes of the hidden layers 620 and 640 can link inherent visual information in the accessed image 600 that share common characteristics to help determine depth information for one or more pixels.

Additionally, each intermediate layer is a combination of functions such as, for example, residual blocks, convolutional layers, pooling operations, skip connections, concatenations, etc. Any number of intermediate encoder layers 620 can function to reduce the convolutional layer to the identification layer and any number of intermediate decoder layers 640 can function to increase the reduced representation layer 630 to the output layer 650. Alternatively stated, the encoder intermediate layers reduce the pixel dimensionality to the depth identification dimensionality, and the decoder intermediate layers increase the identification dimensionality to the depth map dimensionality. In some examples, the decoder may not increase the dimensionality to the same level of the accessed image. That is, the resulting depth map may be "coarse" relative to the accessed image, having a resolution of an eighth, a fourth, or half of the accessed image.

IV.D Training a Depth Identification Module

The control system 130 can train a depth identification module (e.g., depth identification module 234) using a labelling process. Here, the labelling process automatically labels an image of a field obtained with an image sensor ("visual image") with depth information captured from a depth sensor ("depth image"). The image sensor and the depth sensor are approximately the same distance from the imaged objects. The visual information in the visual image and the depth information in the depth image are correlated through known calibration techniques that are standard in practice.

More explicitly, the control system 130 simultaneously captures a visual image with a first field of view and a depth image with a second field of view as a farming machine moves through a field. Generally, the first field of view and the second field of view are substantially the same such that the areas of the field and objects in each image correspond to one another. However, in some examples, the control system 130 may crop the images such that the fields of view are substantially the same. In one example, cropping to similar fields of view may occur via feature extraction and matching to align the images with the depth sensor information. In another example, the fields of view may be warped using intrinsic and/or extrinsic parameters of the depth and image sensors.

The control system 130 generates a labelled image from the visual image and the depth image. That is, the control system 130 labels pixels in the visual image with the depth information from the depth image. For example, pixels in a visual image are labelled with a distance measured in a depth image. The control system 130 trains a depth identification module using one or more of the labelled images. Training the depth identification module generates functions that are able to identify latent information in the visual image that corresponds to depth information.

As an illustrative example, referring to FIGS. 4A and 4B, a farming machine includes an image sensor to capture the captured image 400 and a depth sensor to capture the depth map 460 (i.e., a depth image). The image sensor and the depth sensor are positioned such that their field of view, and the distance from the sensor to the objects, are substantially the same. The control system 130 actuates the depth sensor and the image sensor simultaneously to capture visual images and depth images at the same time as the farming machine moves through the field. The control system 130 maps the depth map 460 captured by the depth sensor to the captured image 400 by labeling each pixel in the captured image 400 with depth information of the depth map 460. Thus, the captured image now includes both visual information and depth information. The control system 130 trains the depth identification module using the labelled image such that a depth identification module can label a captured image with depth information. This approach allows the farming machine to determine depth information without a depth sensor. The control system 130 employs a plurality of images (e.g., depth images, captured images, labelled images) when training a depth identification module.

The control system 130 can train the depth identification module periodically during operation of the farming machine, at a determined time, or before the depth identification module is implemented on a farming machine. Additionally, the depth identification module can be trained by another system such that the depth identification module can be implemented on a control system of a farming machine as a standalone model. Notably, in some examples, the aspect of the control system 130 that trains the depth identification module is not collocated on the farming machine. That is, the depth identification module may be trained on a machine separate from the farming machine 100 and transferred to the farming machine for identifying plants.

V. Labelling Depth Information

The farming machine 100 can also employ the control system 130 to generate labelled depth maps. A labelled depth map is a depth map whose depth information is labelled as crop, weed, substrate, etc. using previously labelled images. Notably, as described below, a labelled depth map is different than a depth map whose depth information has been classified as representing a plant (e.g., depth map 460) as described above.

V.A Generating a Labelled Image

Figure 7A:
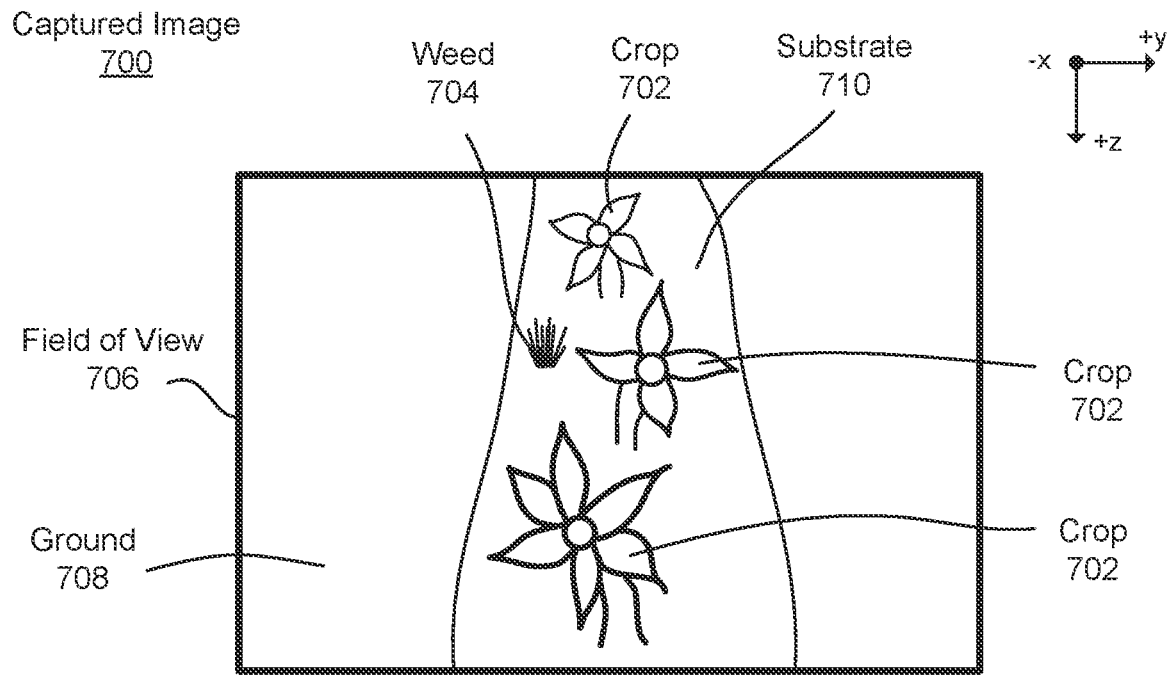
FIG. 7A illustrates a captured image, in accordance with one or more example embodiments.

As described above, the farming machine (e.g., farming machine 100) employs a camera array (e.g., camera array 210) to capture an array of pixels representing visual information (e.g., a captured image) of the scene surrounding the farming machine. FIG. 7A is a captured image, in accordance with one or more example embodiments. This captured image 700 is similar to the captured image of FIG. 4A. The captured image 700 includes various plants within a field of view 706. Three of the plants are crops 702, and one of the plants is a weed 704. The captured image 700 also includes visual information representing the planting substrate 710 in a plant row and the ground 708 surrounding the plants.

Figure 7B:
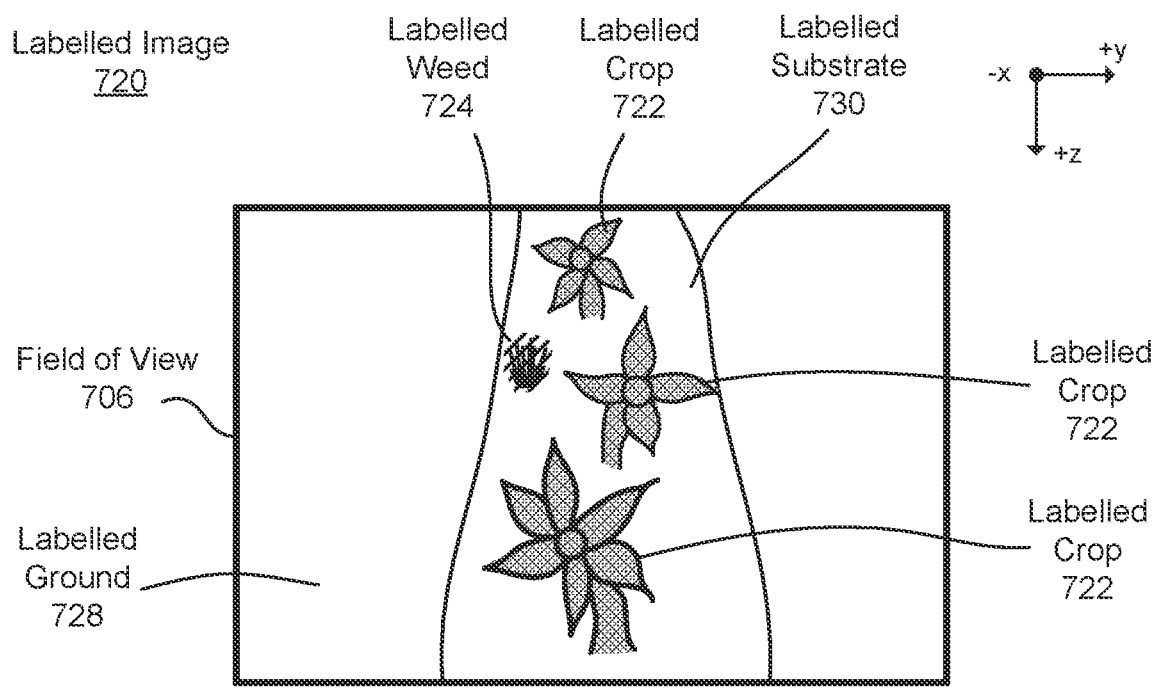
FIG. 7B illustrates a labelled image, in accordance with one or more example embodiments.

The farming machine 100 employs the control system 130 to generate a labelled image using an image labelling model (e.g., image labelling model 236). A labelled image is an image whose visual information is labelled as representations of their real-world counterparts. To illustrate, FIG. 7B is a labelled image, in accordance with one or more example embodiments. The labelled image 720 corresponds to the captured image 700 of FIG. 7A. In the labelled image 720, visual information (e.g., one or more pixels in the captured image) is labelled such that it corresponds to the real-world object(s) it represents. For example, the labelled image 720 includes groups of pixels labelled as a weed 724, a crop 722, the substrate 730, and the ground 728. The visual information labelled as a weed 724 has a first fill pattern, and the visual information labelled as a crop 722 has a second fill pattern. For clarity, the visual information labelled as substrate 730 and ground remain unfilled 728. Additionally, the labelled visual information is overlaid on the captured image, though it need not be.

To generate the labelled image, the control system may apply a semantic segmentation model to the captured image. The semantic segmentation model may be similar to the model described in U.S. patent application Ser. No. 16/126,842 titled "Semantic Segmentation to Identify and Treat Plants in a Field and Verify the Plant Treatments," filed on Sep. 10, 2018.

In some embodiments, the control system 130 implements the image labelling model 236 using the same encoder as the depth identification module (e.g., depth identification module 505) to generate a labelled image. The image labelling model 236 may employ different functions to determine both depth information and labels in the accessed image. In this manner, the same accessed image can be used to generate both a labelled image and a depth map such that the two have the same field of view. Because the models share a similar encoder pipeline, processing the images to generate point clouds, depth maps, and/or labelled images may be reduced. The model that generates a labelled image can also be wholly distinct from the depth identification module as described in the aforementioned patent application.

V.B Combining Depth Maps and Labelled Images

The farming machine 100 employs the control system 130 to generate a labelled depth map using the map labeling module 238. To do so, the control system 130 accesses a depth map corresponding to a labelled image and generates a labelled depth map using the depth and label information found therein.

Figure 7C:
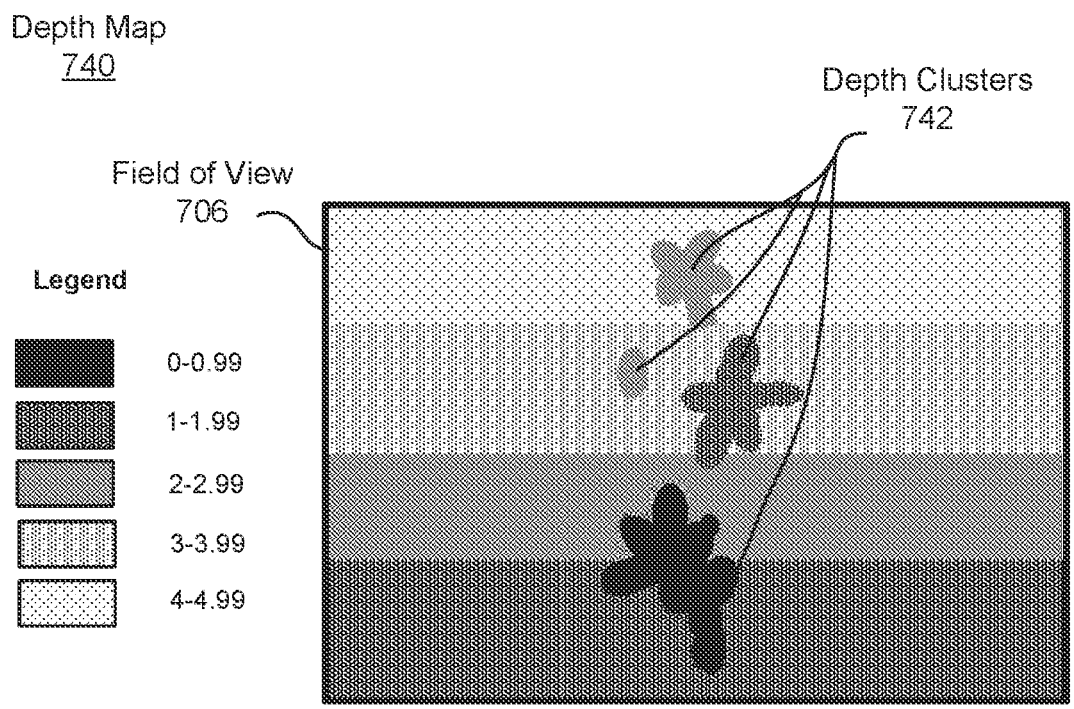
FIG. 7C illustrates a depth map, in accordance with one or more example embodiments.

For example, FIG. 7C is a depth map, in accordance with one or more example embodiments. The illustrated depth map 740 corresponds to the field of view 706 of the captured image 700 in FIG. 7A. The illustrated depth map 740 comprises depth information corresponding to the visual information in the captured image 700. This is shown as depth clusters 742 in the depth map 740 in the same approximate positions as crops and weeds in the captured image.

Figure 7D:
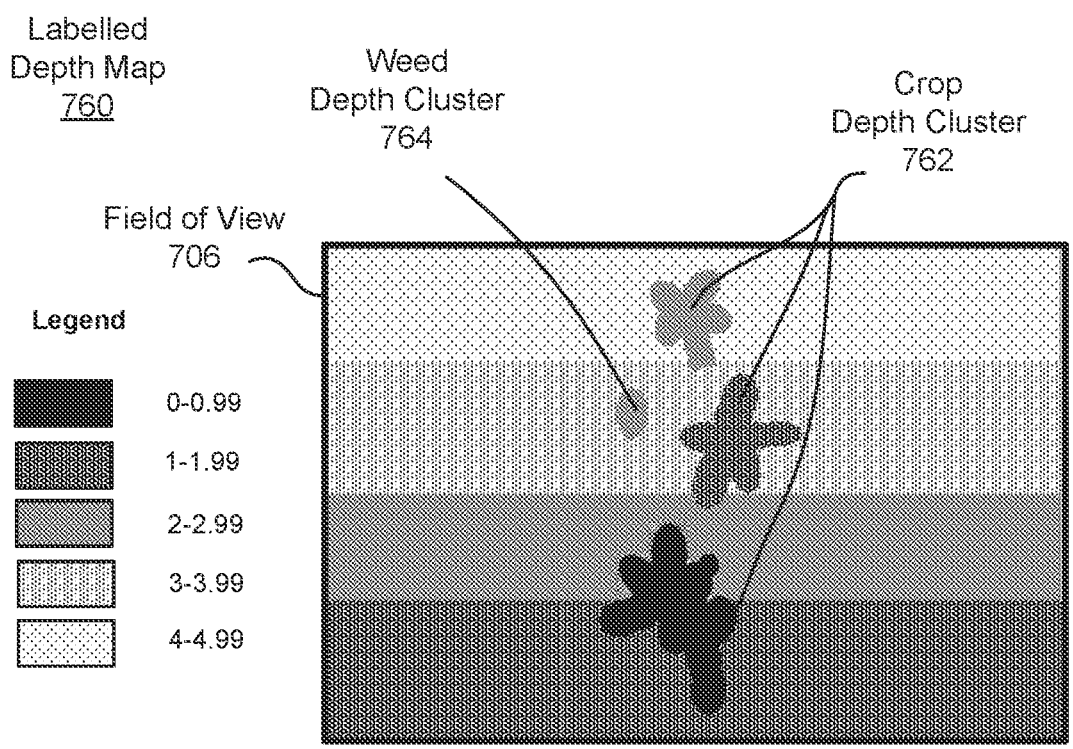
FIG. 7D illustrates a labelled depth map, in accordance with one or more example embodiments.

The control system 130 combines information in the depth map 740 with information in the labelled image 720 to generate a labelled depth map. To do so, the control system 130 applies the labels in the labelled image 720 to the corresponding depth clusters 742 in the depth map 760. In one example, FIG. 7D illustrates a labelled depth map, in accordance with one or more example embodiments. In the labelled depth map 760, depth information forming a depth cluster in the depth map 740 is at approximately the same position as visual information labelled as a weed in the labelled image 720. Because the two are at approximately the same position, the control system 130 labels the depth cluster as a weed depth cluster 764. The farming machine can perform the same function for any other labelled objects and depth clusters, for instance, crop depth clusters 762, the ground, or the substrate.

In this example, the field of view 706 of the labelled image 720 and the depth map 740 are approximately the same, but similar fields of view are not necessary. For instance, objects in a labelled image 720 may be tagged with coordinates, and, similarly, depth clusters in a depth image 740 may be tagged with coordinates. If the coordinates of the labelled objects and the depth clusters are approximately the same, the control system 130 can label the depth clusters to generate a labelled depth map 760.

Not requiring similar fields of view has other benefits. For instance, the farming machine may generate labelled depth maps from one or more labelled images and one or more depth maps so long as there is some metadata indicating correct positions for the objects and clusters. In this manner, the control system 130 can combine the field of view using the metadata. Additionally, not requiring a similar field of view allows a depth map 740 and a labelled image 720 to come from one or more image and/or depth sensors situated at different locations on the farming machine.

Furthermore, there may not necessarily be a one to one correspondence between depth information in a depth map 740 and visual information in a labelled image 720 when generating a labelled depth map 760. For instance, visual information in the labelled image 720 may have a higher fidelity than depth information in the depth map 740 (or vice versa). In this case, the control system 130 may up-sample or down-sample the labelled image 720 and/or depth map 740 when generating the labelled depth map 760.

In addition, the control system 130 may employ various functions to improve a labelled depth map. In a first example, the control system 130 may dilate portions of the labelled image. That is, the control system may expand the label for an object to pixels surrounding the labelled object even if the image labelling model labelled the surrounding pixels with a different label. For instance, consider a group of pixels labelled as weed surrounded by a group of pixels labelled as ground. The control system 130 may dilate the group of pixels labelled as weed to include some of the surrounded pixels originally labelled as ground. This allows for a margin of error when generating treatment actions for a weed. The control system 130 may also apply different dilations for different types of labels. For instance, the farming machine 100 may dilate ground pixels to a greater degree than crop pixels or weed pixels.

The control system 130 may employ other functions to either the depth map or the labelled image to generate labelled depth maps. For example, the control system may perform interpolation, smoothing, rounding, estimating, etc. These functions allow the farming machine to improve the treatment accuracy, treatment speed, computation speed, etc. when performing farming actions in the field. For example, the control system 130 may interpolate depth in a depth map and/or labelled depth map. That is, the control system 130 can assign depth values to pixels, regions, or areas in a depth map and/or labelled depth map based on the depth values of adjacent or nearby pixel regions, or areas. To illustrate, consider a depth map that is missing depth values for a region of pixels due to an occlusion located in the accessed image(s) used to generate the depth map. In this case, the control system 130 can interpolate depth values for the missing depth values based on the depth values of the surrounding region.

Finally, for convenience, the examples provided herein describe the control system 130 applying labels from a labelled image to a depth map to identify and treat plants. However, the control system can also apply depth information to a labelled image to identify and treat plants. In other words, the control system utilizes the combination of labels and depth information to identify and treat plants. For example, depth information may be used to correct mislabeled plants, or labels may be used to correct incorrect depth information.

VI. Point Cloud Generation Module for Depth Information

As described above, a farming machine (e.g., farming machine 100) captures an image of a scene in a field using a camera array as the farming machine moves through the field. The control system (e.g., control system 130) of the farming machine processes the image to determine depth information from the visual information in the image. The control system 130 may also label the depth information (e.g., a labelled depth map) such that it corresponds to real world objects represented in the visual information.

The control system 130 can then generate a labelled point cloud using labelled depth information and determine plant treatment actions based on the labelled point cloud. A labelled point cloud is a three-dimensional representation of objects in the scene in the field captured by the camera array. Because the objects are represented in three-dimensions, the farming machine 100 may more accurately determine the location of plants and/or perform appropriate farming actions.

VI.A Generating a Point Cloud Using a Point Cloud Generation Module

The control system 130 of the farming machine 100 employs a point cloud generation module (e.g., point cloud generation module 240) to generate a labelled point cloud from a labelled depth map. The labelled depth map may be generated from a depth map created from an accessed image and a labelled image, where the labelled image is created from the accessed image.

Figure 8A:
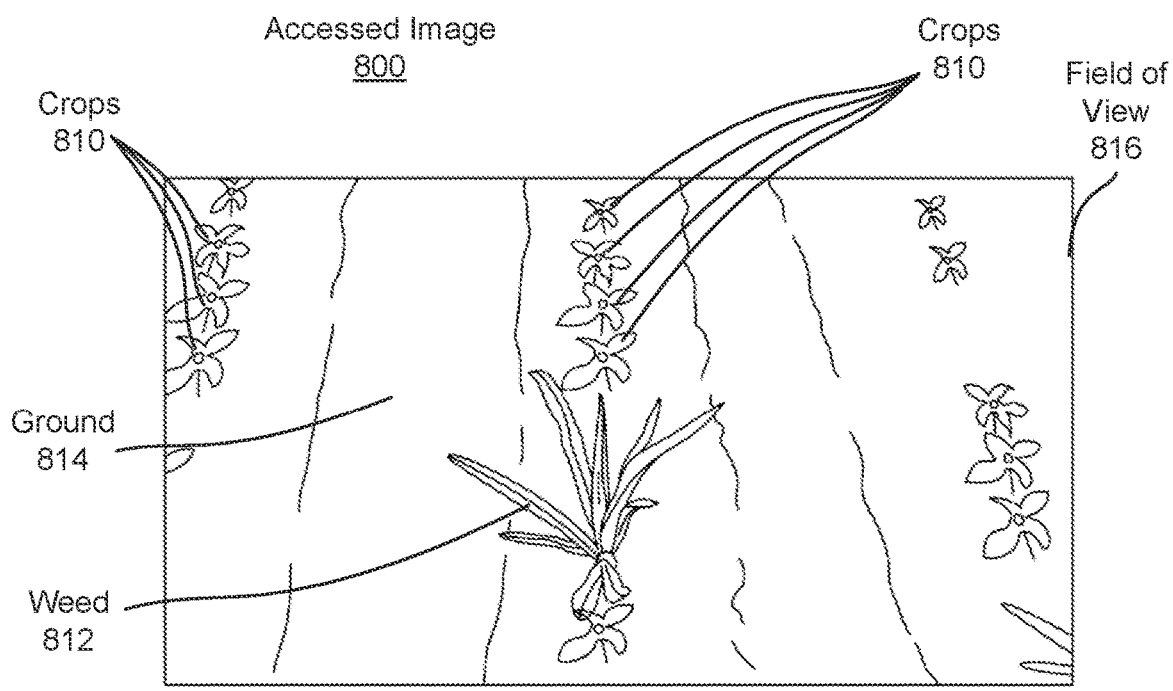
FIG. 8A illustrates an accessed image, in accordance with one or more example embodiments.
Figure 8B:
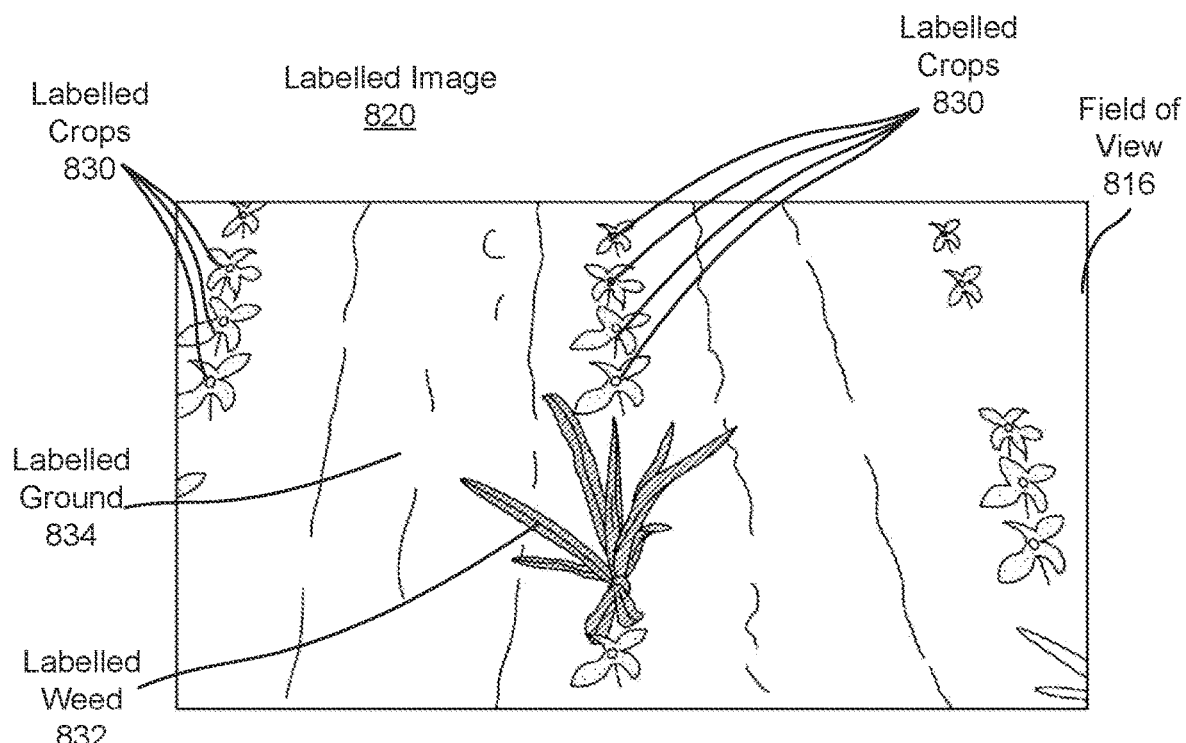
FIG. 8B illustrates a labelled image, in accordance with one or more example embodiments.
Figure 8C:
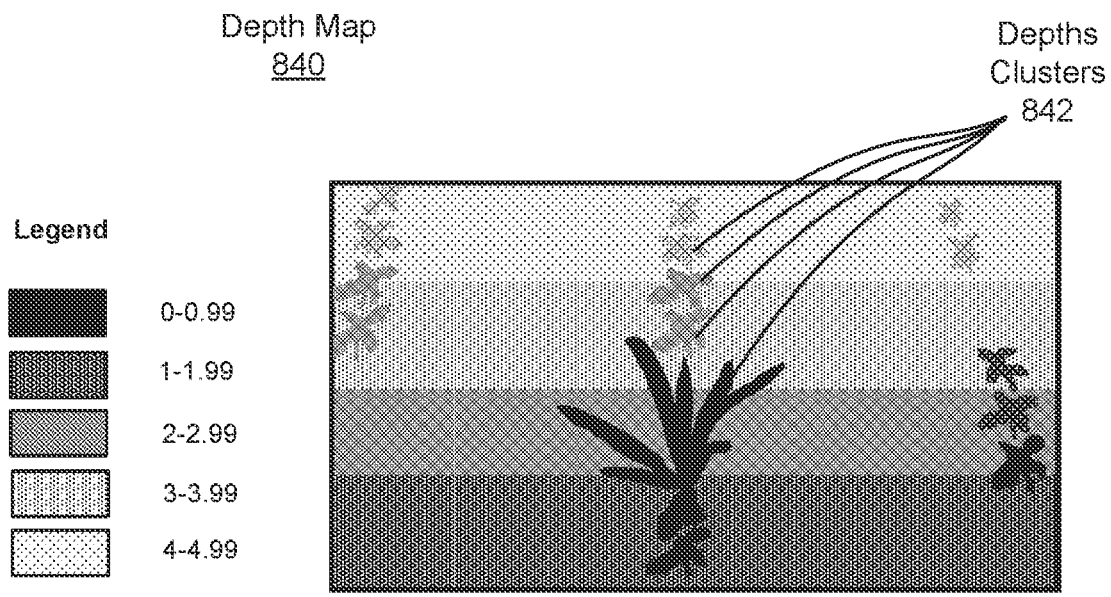
FIG. 8C illustrates a depth map, in accordance with one or more example embodiments.
Figure 8D:
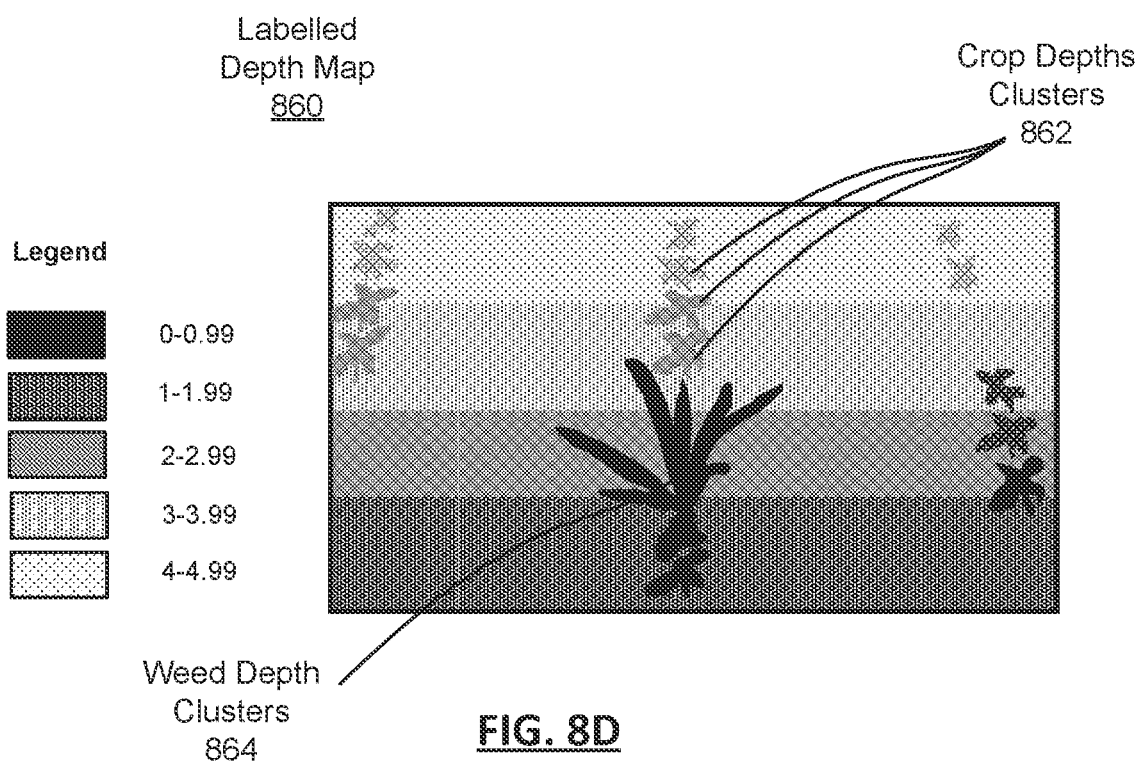
FIG. 8D illustrates a labelled depth map, in accordance with one or more example embodiments.

To illustrate, it is useful to provide an example where the control system 130 generates a labelled depth map. FIG. 8A illustrates an accessed image, in accordance with one or more example embodiments. The accessed image 800 includes visual information representing crops 810, weeds 812, and the ground 814 previously captured by a camera of the farming machine. The visual information is within a field of view 816. FIG. 8B illustrates a labelled image, in accordance with one or more example embodiments. The control system 130 generates the labelled image 820 from the accessed image 800. The labelled image 820 includes areas of visual information labelled as crop 830, weed 832, or ground 834. The labelled image shares the same field of view 816 as the accessed image 800. FIG. 8C illustrates a depth map, in accordance with one or more example embodiments. The control system 130 also generates the depth map 840 from the accessed image 800. The depth map 840 includes depth information (e.g., depth clusters 842) corresponding to various objects represented in the accessed image 800. FIG. 8D illustrates a labelled depth map, in accordance with one or more example embodiments. The control system generates the labelled depth map 860 by combining the depth map 840 and the labelled image 820. The labelled depth map 860 includes depth information labelled to correspond to objects represented by visual information in the accessed image as described herein. For example, the labelled depth map includes a weed depth 864 cluster and several crop depth clusters 862.

The control system 130 applies a point cloud generation module 240 to a labelled depth map 760 to generate a labelled point cloud. In applying the point cloud generation module 240, the control system 130 accesses labelled depth information in the labelled depth map 760 and applies a coordinate system. The applied coordinate system may be based on any of the positions of the farming machine 100 in the field, the location of the camera on the farming machine 100, and the field of view of the camera. By applying the coordinate system, every pixel in a labelled depth map 460 is assigned a coordinate that corresponds to a real-world location in a field where the farming machine 100 is operating.

The control system 130 combines the coordinates of pixels in the labelled depth map 460 with their corresponding depth information to generate a point cloud. That is, given extrinsic and intrinsic calibration parameters of the camera(s) that acquired the image (e.g., accessed image 800), it is possible to convert the 2D representation of the depth map (e.g., depth map 840) to a 3D representation of a point cloud. In the point cloud, each point represents a 3D location in space. More specifically, to generate the point cloud the control system 130 projects a ray from a model camera location into a representation of the real-world space in the accessed image. The control system 130 calculates depth values based on the length of the ray projected from the model camera to the pixel representing a real-world location. This procedure is repeated for each pixel on the focal plane in the image. In some cases, pixels may be aggregated to produce a lower resolution point cloud).

Figure 9:
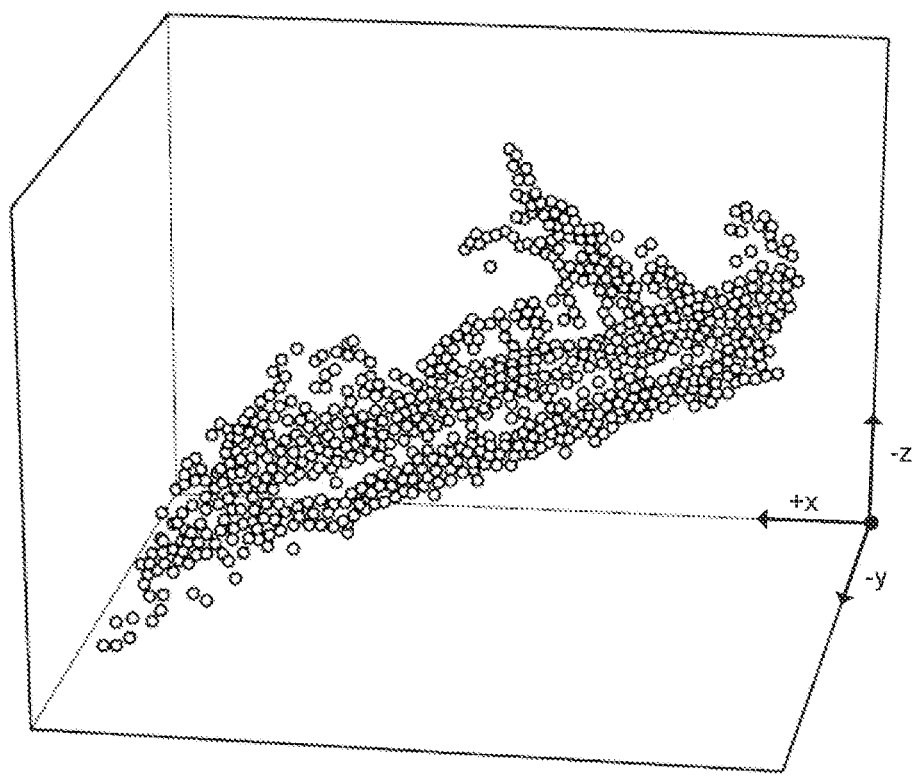
FIG. 9 illustrates a point cloud, in accordance with one or more example embodiments.

To illustrate, FIG. 9 illustrates a point cloud, in accordance with one or more example embodiments. The point cloud 900 is generated from the labelled depth map in FIG. 8D. Further, the point cloud 900 is based on a coordinate system reflecting the farming machine position, camera location, and field of view of the camera used to capture the accessed image 800 used to generate the labelled depth map 860. The coordinate system could be based on other information used to generate a coordinate system.

Here, the points in the point cloud 900 are tilted because the camera capturing the accessed image 800 is tilted at a camera angle. That is, the plane of points representing the ground (e.g., a ground plane) in the accessed image 800 are not equidistant from the camera because its lens is not normal to the ground. Therefore, visual information representing the ground in the accessed image corresponds to depth information that varies (e.g., increases) from the bottom of the field of view (where the ground is closer) to the top of the field of view (where the ground is farther away).

In FIG. 9, the points in the point cloud 900 are not labelled. In this case, the plant identification module 232 can identify plants using an unlabeled point cloud. To do so, the plant identification module 232 may apply similar functions to point clouds as to depth points in a depth map. That is, the control system 130 can look at differences between the height (e.g., depth) of objects in the point cloud (e.g., depth map) to determine whether point clusters are plants. For example, the control system may determine a point cloud is a plant because its points are a threshold distance away from the ground plane (from either the bottom of the cluster, or the top of the cluster). Similarly, the control system 130 can apply any of the functions applicable to a labelled point cloud described herein to an unlabeled point cloud when identifying plants. That is, the control system 130 can identify features of point clusters, identify a ground plane or ground slope, rotate and/or normalize points in the point cloud, modify points and labels of points in the point cloud, select treatments for point clusters, etc.

Figure 10A:
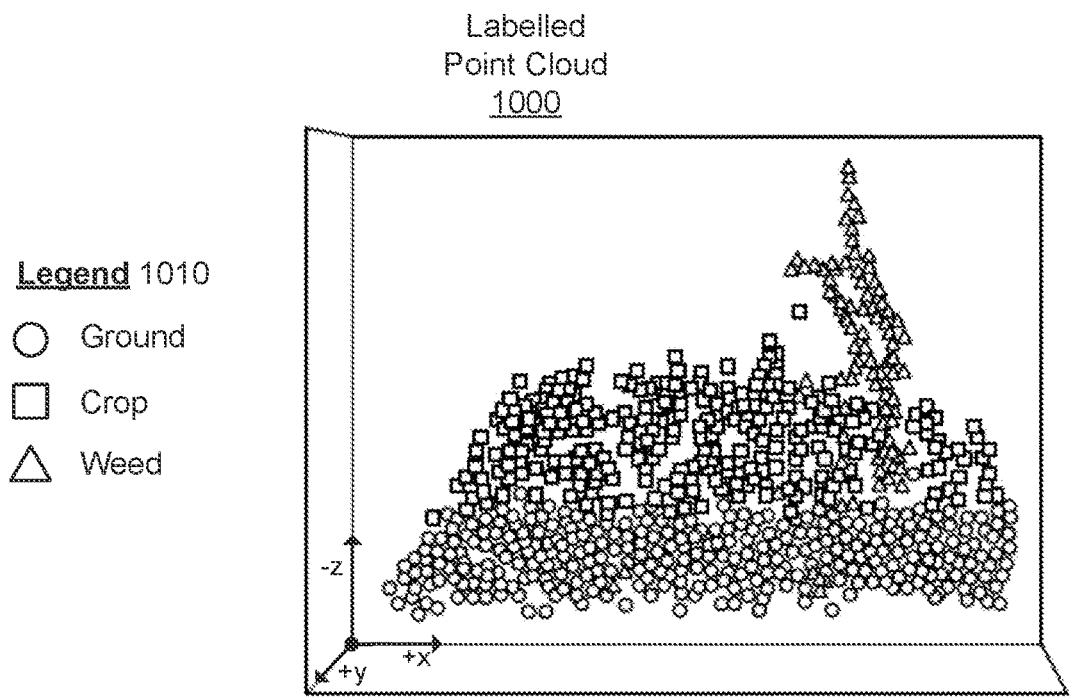
FIGS. 10A and 10B illustrate a labelled point cloud, in accordance with one or more example embodiments.
Figure 10B:
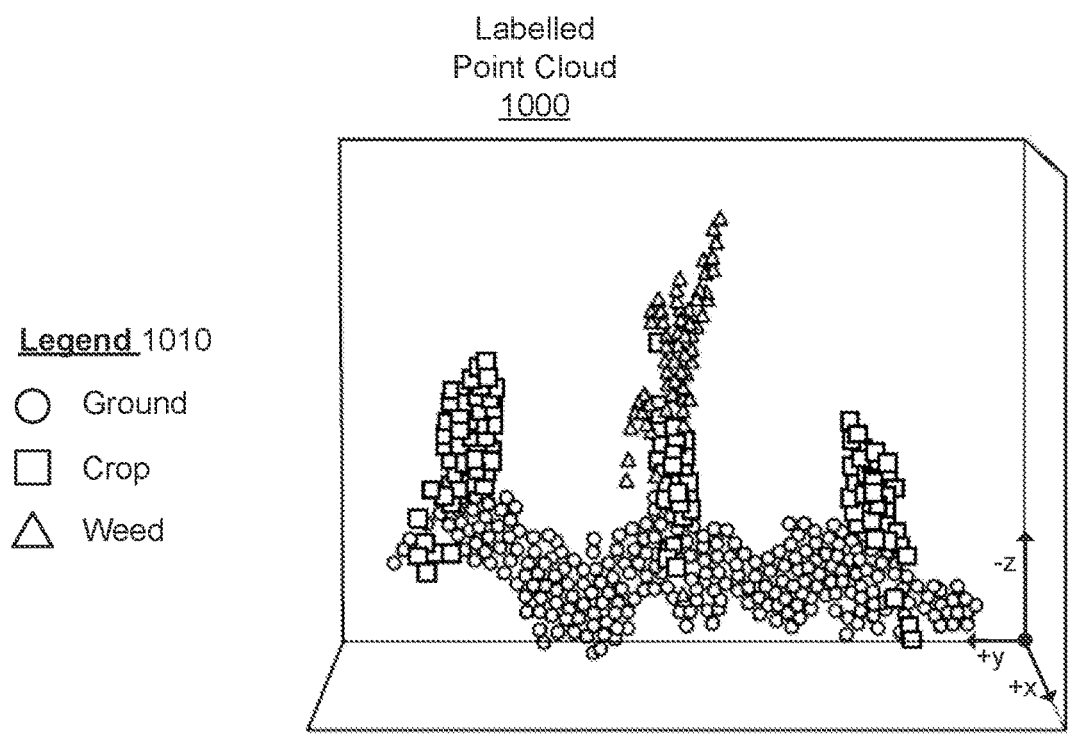

However, the control system 130 can also generate a labelled point cloud by labelling each point in the point cloud 900 with corresponding labels from the labelled depth map 860. FIGS. 10A and 10B are a labelled point cloud, according to an example embodiment. The labelled point cloud 1000 is generated from the labelled depth map 860 in FIG. 8D and is shown from two different viewpoints. In the labelled point cloud 1000, the points have different shapes indicating their different labels according to the legend 1010. The points are labelled as ground points (circles), crop points (squares), or weed points (triangles), and correspond to labels in the labelled depth map 860.

Notably, the ground plane of the labelled point cloud 1000 is no longer at an angle (as it was in FIG. 9). This is because the control system 130 can compensate for a tilted ground plane in a labelled point cloud. To do so, the control system 130 determines a camera angle and/or extracts a ground plane equation from a labelled point cloud 1000. The control system 130 then manipulates the point cloud based on the camera angle. The control system 130 can also manipulate the ground plane equation such that when it is applied to the point cloud 900 the labelled point cloud 1000 is no longer at an angle. In other words, the control system can "normalize" the point cloud.

The camera angle is the angle of the sensor capturing the accessed image used to generate the labelled depth map. The control system 130 can determine the camera angle using a variety of methods. First, the control system 130 may use visual and/or depth information in the accessed image, labelled image, depth map, or labelled depth map to determine the camera angle using vector geometry. Second, the control system 130 may employ a random sample consensus (RANSAC) algorithm to extract the camera angle from ground points in the labelled point cloud. Third, the control system 130 may access the camera angle from the network and extract a ground plane equation based on the accessed angle. Other methods are also possible.

The ground plane equation is an equation approximating a plane represented by ground points in the point cloud. The control system 130 can determine a ground plane equation using several methods. First, the control system 130 can determine a ground plane equation using a RANSAC algorithm, but other algorithms are also possible. Second, the control system 130 may use visual and/or depth information in an accessed image, labelled image, depth map, or labelled depth map to determine the camera angle using geometric calculations.

The control system 130 normalizes the point cloud using the determined ground plane equation and/or camera angle. For example, the control system 130 may rotate the determined ground plane equation by the camera angle and apply the rotated ground plane equation to the ground points such that they are approximately flat. The other points in the point cloud are similarly rotated. With the ground points being approximately flat, the control system 130 can more accurately determine the height of weed and/or crops represented as weed and/or crop points in the normalized point cloud. Other approaches of normalizing the point cloud are also possible.

In some configurations, a labelled point cloud may be created from two or more point clouds. For example, the control system 130 may independently generate point clouds for the ground, weed, and crop labels in the labelled depth map. The control system 130 may then aggregate the ground point cloud, weed point cloud, and crop point cloud to form a labelled point cloud. In this case, the control system 130 may determine the ground plane equation and camera angle from only a subset of the generated point clouds. For example, the control system 130 may determine the ground plane and camera angle from the ground point cloud. Further, the control system 130 may correct one or more point clouds based on information determined from one or more other point clouds. For example, the control system 130 may rotate the weed point cloud and the crop point cloud based on the ground plane equation and camera angle extracted from the ground point cloud. Further, the control system 130 may apply functions to the different point clouds with different frequencies (i.e., spatial frequency). For example, the control system 130 may extract a ground plane and camera angle from the ground point cloud at a first frequency and apply corresponding rotations to the crop and weed point clouds at a second different frequency. The second frequency may be higher to allow for higher fidelity in determining plant locations than when determining ground positions.

Furthermore, in some configurations, the control system can generate a labelled point cloud without accessing a labelled image. For example, the control system can label depth clusters as crops, weeds, plants, etc. as described herein. Thus, a labelled depth map need not incorporate a labelled image but could also use a labelling algorithm to label depth clusters in a depth map. The labelled depth clusters can then be used to generate a labelled point cloud.

Additionally, in some configurations, the labelled point cloud may be generated from one or more labelled depth maps, and/or generated from one or more accessed images. Furthermore, the accessed images may be generated from more than one sensor at different points on the farming machine. Whatever the case, the control system is configured to generate a labelled point cloud representing the field the farming machine is moving through.

VI.B Modifying Point Clouds

In some cases, points in a labelled point cloud may have inconsistencies; that is, points having an incorrect label, or correctly labelled points with incorrect coordinates. For example, a point that represents the ground may be incorrectly labelled as a crop or may have a coordinate far outside of the ground plane. In these situations, the control system 130 can modify the coordinates and/or label of the incorrect point such that it accurately reflects the scene in the field. Several examples of modifying a point cloud to correct for inconsistencies are provided for illustration.

Sparse Canopy Example

Figure 11A:
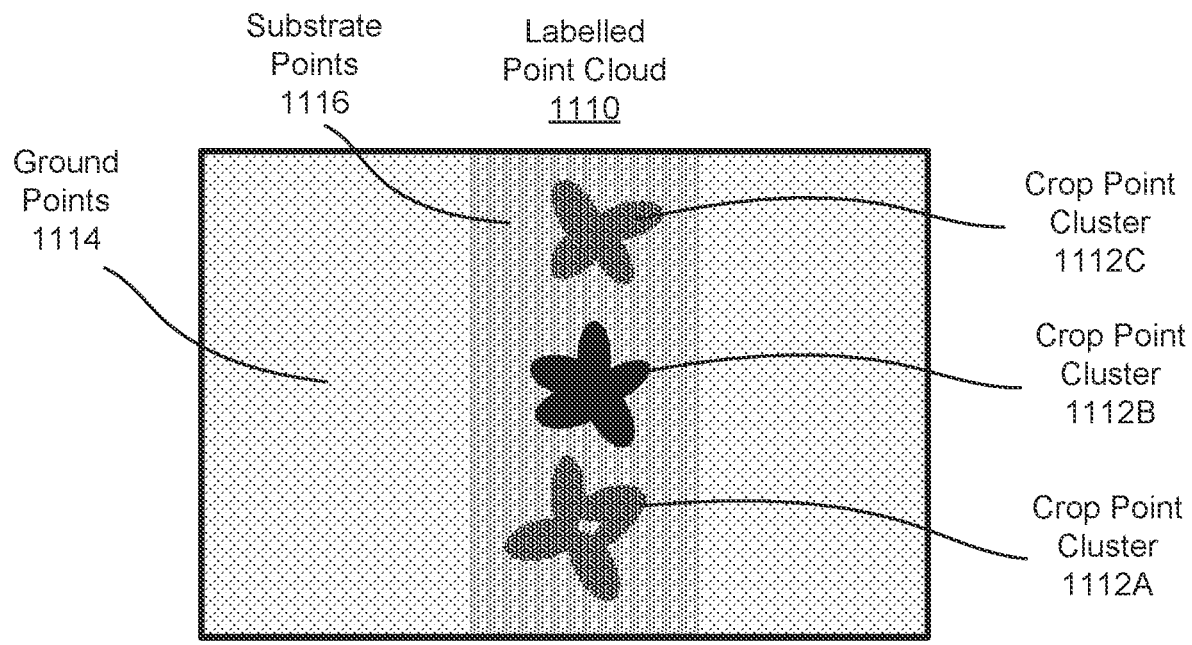
FIG. 11A illustrates a top-down view of a labelled point cloud, in accordance with one or more example embodiments.

In one example, an accessed image includes several crops with a sparse canopy of leaves. The control system generates a labelled point cloud of the crops according to the methods described herein. To illustrate, FIG. 11A illustrates a top-down view of a labelled point cloud, in accordance with one or more example embodiments. Because the view is top down, the labelled point cloud 1110 appears similar to a contour map. The labelled point cloud 1110 includes crop point clusters 1112 representing crops in the field, the ground points 1114, and substrate points 1116. Because the crops have sparse canopies, a crop point cluster (e.g., crop point cluster 1112A) includes substrate points 1116 rather than the crop points 1112. This occurs because when the plant was imaged, the ground could be seen through the canopy. As such, the control system 130 may populate the labelled point cloud with incorrect points.

Figure 11B:
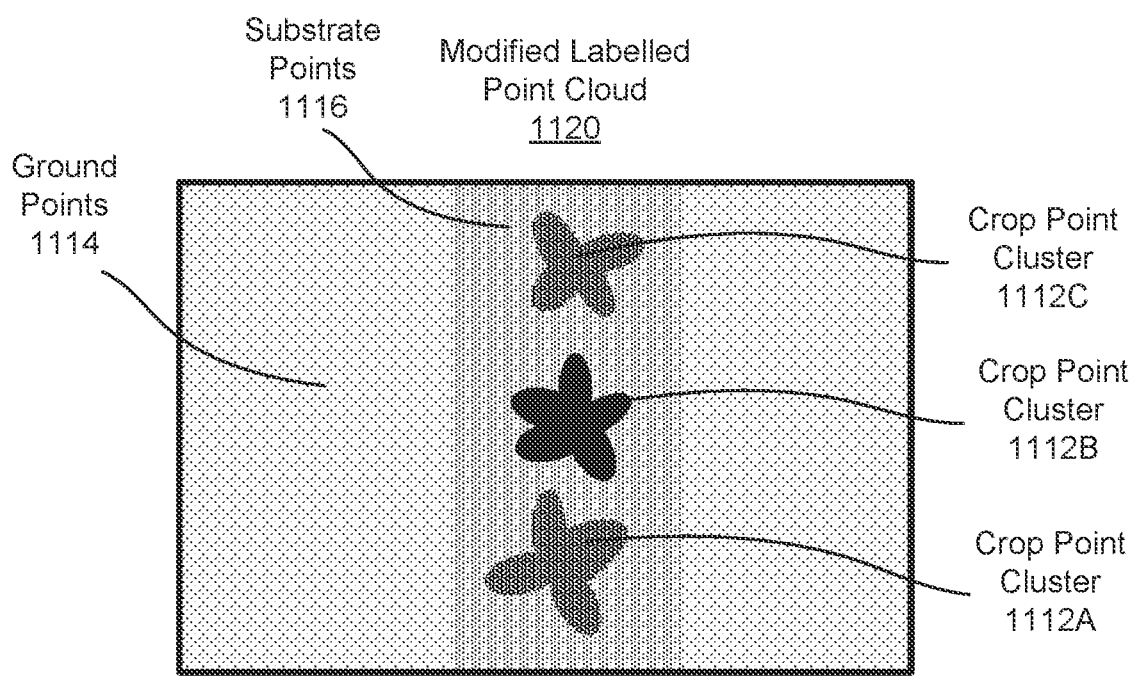
FIG. 11B illustrates a top-down view of a modified labelled point cloud, in accordance with one or more example embodiments.

The control system 130 identifies the incorrect points in the labelled point cloud 1110 and modifies them such that they accurately reflect the plants in the field. For instance, the control system 130 may identify a first cluster of points that surrounds a second cluster of points having a different label. For instance, continuing the example, a cluster of crop points may surround a cluster of substrate points (e.g., crop point cluster 1112A). If one or more characteristics of the second cluster of points indicates that points in the second cluster are incorrect, the control system modifies the label of the second cluster of points. For instance, continuing the example, the control system 130 may change the label of the substrate points 1116 surrounded by the crop point cluster 1112A if the cluster of substrate points is smaller than a threshold size. FIG. 11B illustrates a top-down view of the modified labelled point cloud with the corrected points. In FIG. 11B, the modified labelled point cloud includes points that were previously labelled as substrate in the middle of the crop point cluster 1112A are now labelled as substrate points 1116.

Small Plant Detritus Example

Figure 11C:
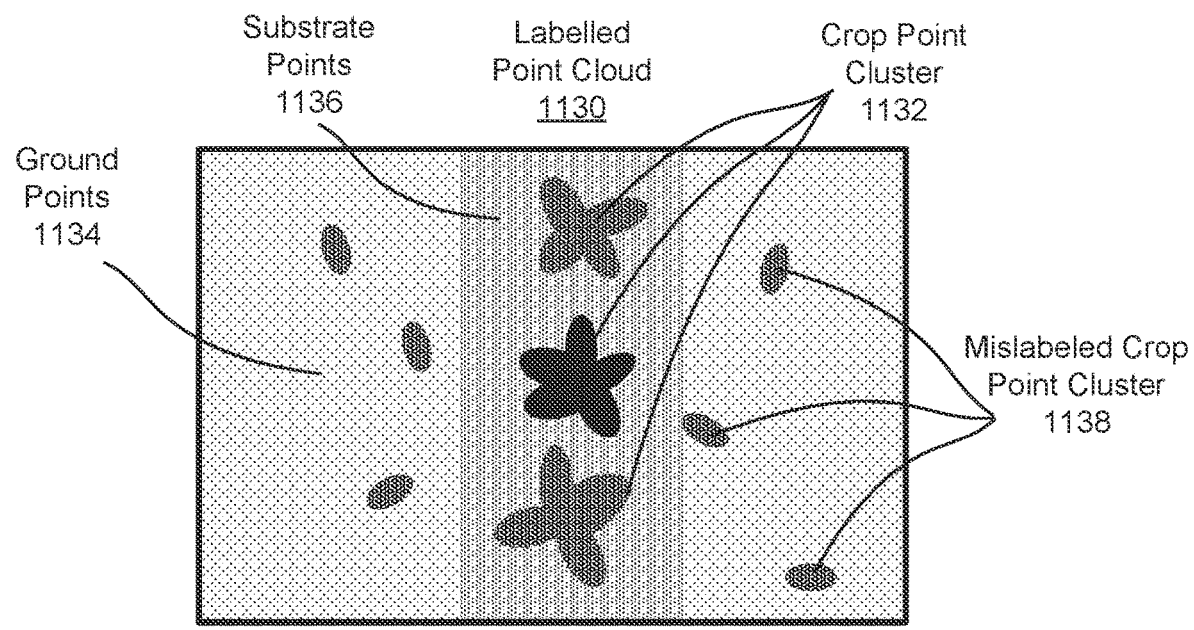
FIG. 11C illustrates a top-down view of a labelled point cloud, in accordance with one or more example embodiments.

In one example, an accessed image includes crops that shed small leaves (or other detritus) during growth. The control system 130 generates a labelled point cloud indicating that the leaves are crops, even though they do not actually represent a crop. FIG. 11C illustrates a top-down view of a labelled point cloud, according to an example embodiment. The labelled point cloud 1130 includes crop point clusters 1132, ground points 1134, and substrate points 1136. The labelled point cloud 1130 also includes crop point clusters that are likely a leaf (e.g., mislabeled crop point clusters 1138) due to their size and position in the labelled point cloud 1130. These mislabeled crop point clusters 1138 occur because a crop in the field shed leaves on the ground that was mislabeled as a crop.

Figure 11D:
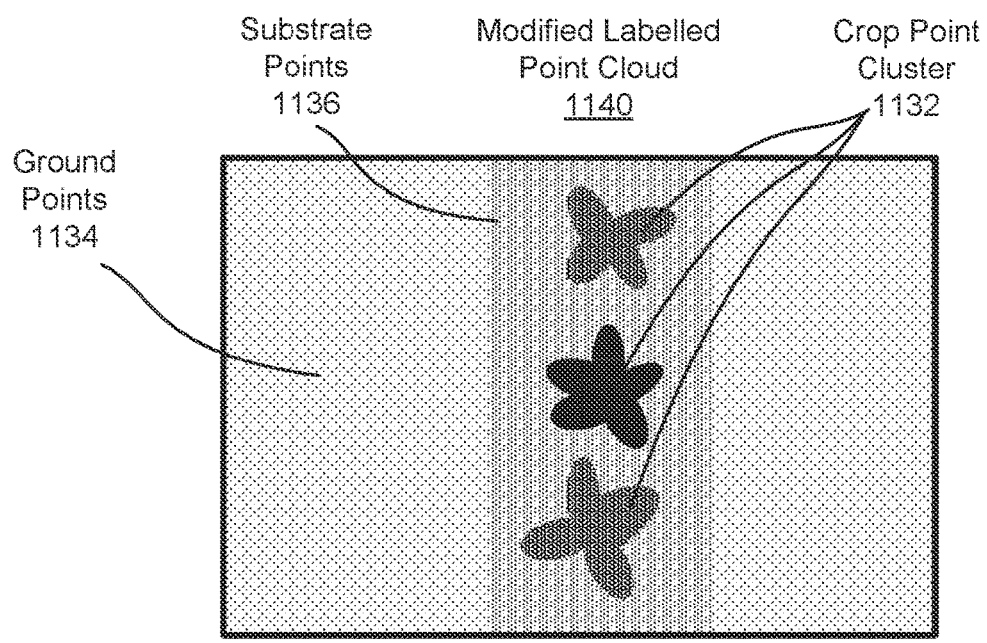
FIG. 11D illustrates a top-down view of a modified labelled point cloud, in accordance with one or more example embodiments.

The control system 130 identifies the incorrect points in the labelled point cloud 1130 and modifies them such that they accurately indicate the ground rather than a crop. For instance, the control system 1130 may identify that a cluster of points in the labelled point cloud 1130 is smaller than a threshold cluster size. For instance, continuing the example, a mislabeled crop point cluster 1138 near the ground plane. If one or more characteristics of the cluster indicates that points in the cluster are incorrect, the control system 130 removes the cluster of points from the labelled point cloud. For instance, continuing the example, the control system 130 may remove the mislabeled crop point cluster 1138 representing the small leaf because it is smaller than a threshold size. In a similar example, the control system may remove the mislabeled crop point cluster 1138 because it is at approximately the same height as the ground plane, while other labelled crop point clusters are removed from the ground plane. FIG. 11D illustrates a top-down view of the modified labelled point cloud with the corrected points, in accordance with one or more example embodiments. In FIG. 11D, the modified labeled point cloud 1140 shows the underlying ground points 1134 after the mislabeled crop point clusters 1138 are removed from the labelled point cloud 1130.

Large Ground Coverage Example

Figure 11E:
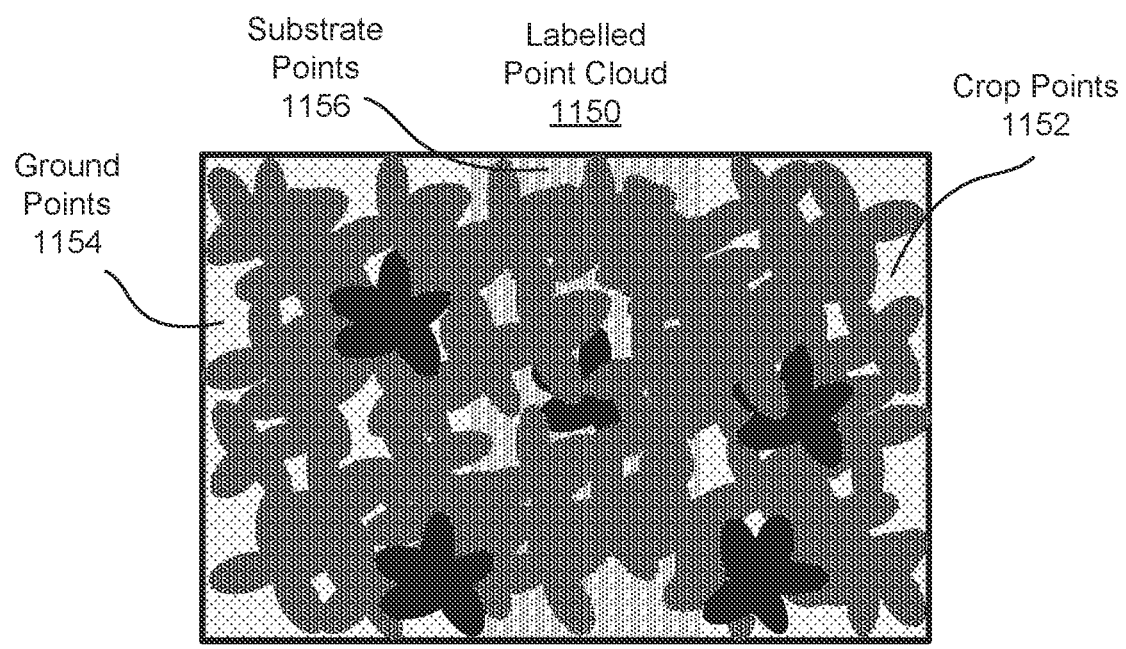
FIG. 11E illustrates a top-down view of the labelled point cloud, in accordance with one or more example embodiments.

In one example, an accessed image includes a large number of crops such that the ground is largely covered in the image. The control system 130 generates a labelled point cloud indicating the crops and ground. FIG. 11E illustrates a top-down view of the labelled point cloud, in accordance with one or more example embodiments. The labelled point cloud 1150 includes many crop point clusters 1152, and fewer ground 1154 and substrate points 1156. In this example, there are so few ground points 1154 that it is difficult for the control system 130 to determine a ground plane and camera angle from a single ground point cluster using the aforementioned methods. Instead, the control system 130 determines a ground plane from the disparate clusters of ground points 1154 using various approximation methods. The control system 130 can then modify the crop and weed clusters using the derived ground plane (e.g., rotate the ground plane and crop points).

Cluster Hierarchy Example

In one example, an accessed image includes a large number of highly similar crops (e.g., a row of lettuce crops). The control system 130 generates a labeled point cloud indicating the various crops in the image. The labelled point cloud includes many clusters of points representing crops in the field. In this example, the control system 130 may assign representative information to all points in a cluster of points in which the point is found. For instance, a labelled point cloud may include a point cluster representing an individual crop. The control system 130 assigns representative information to points in the point cluster labelling the approximate position, height, size, name (e.g., plant), number (e.g., 123), etc. of the point cluster representing the individual point. The approximations may be derived using various mathematical operations performed on points in the point cluster.

By assigning representative information to points in a point cluster, the control system may establish a data hierarchy describing point clusters at a higher level than their constituent points. For example, the point cloud may include a data structure representing the nth point cluster located at approximately (x, y) in the field and having a height of (z) and a size (d). Other information can be included in the data structure describing the point cluster. In this manner, the control system can apply various models and functions at a cluster level, rather than at a point level, within the labelled point cloud.

External Conditions Example

In one example, an accessed image includes visual data representing external conditions that may lead to inconsistencies in the point cloud (e.g., shadows, dust, fog, etc.). The control system 130 generates a labelled point cloud indicating that visual information representing external conditions (e.g., shadows) are plant clusters. In this example, the control system 130 may modify the point mislabeled point clusters as ground clusters because the depth information for the mislabeled plant clusters is similar to the ground plane. Similar techniques may be used for other mislabeled point clusters based on visual information.

Other Examples

Other characteristics can be used to identify points for removal and/or modification from the labelled point cloud. Some example characteristics include the relative number of points in the first cluster and the second cluster, position of a cluster of points in the labelled point cloud and/or position of nearby clusters, the label of the cluster and/or the label of nearby clusters, the position of a cluster relative to similarly or dissimilarly labelled clusters, etc.

Further, the control system 130 may analyze points in point clusters in one or more dimensions when modifying coordinates and/or labels of points in a point cloud. That is, for example, distances between point clouds may be viewed in any dimension, sizes may be a projection on any plane, proximity may be gauged using different thresholds in different dimensions, etc. Whatever the case, the control system is configured to modify point clouds to more accurately reflect crops, weeds, and the ground in the field.

VI.C Extracting Scene Characteristics from Point Clouds

Points in a labelled point cloud may reflect underlying structures and features ("characteristics") in the scene surrounding the farming machine. The control system 130 can extract information describing the various characteristics by analyzing the points in the labelled point cloud. Several examples of determining characteristics of a scene from a labelled point cloud are provided for illustration.

For instance, consider an example where the control system 130 accesses an image captured by a farming machine travelling in a field. The scene in the image includes several crops in a row in the field. The control system 130 generates a labelled point cloud of the crops and ground according to the methods described herein. Because the labelled point cloud includes points representing the ground, the control system can determine a ground plane for the field using those points.

Additionally, the control 130 system may derive several characteristics about the field. For example, the control system 130 can determine a data structure representing the row in the field (e.g., a plane, a vector, a path of coordinates, etc.). To do so, the control system 130 determines that an array of crop point clouds in the labelled point cloud are approximately linear. Because the crop point clouds are approximately linear, the control system 130 determines that line of crop point clouds represent a row in the field and generates a data structure representing the row. The control system 130 can determine other characteristics about the field based on points in the point cloud. Some examples include identifying multiple rows, the separation or distance between multiple rows, statistics representing multiple row spacing, angle of rows, multi-planting, stand counts. When identifying multiple rows and spacing in between rows, the control system 130 may utilize that information to determine irregular plantings. That is, to determine when crops are not planted in a linear manner. Similarly, the control system may utilize row location to determine when plants are located in between rows and likely are a weed. Additionally, the control system 130 may use field characteristics to determine stand counts by clustering point clusters representing a plant when counting plants in the field. Further, because each of the plants may be identified as crops or weeds, the control system 130 may identify a stand count for crops and/or a stand count for weeds.

Similarly, the control system 130 may derive several characteristics about the farming machine. For example, the control system 130 can determine a data structure representing an orientation of the farming machine in the field (e.g., a vector, a path of coordinates, etc.). To do so, the control system 130 can determine one or more field characteristics (e.g., a field row, ground plane, a field boundary, etc.) and determine the orientation of the farming machine using the determined field characteristics. For example, the control system 130 may determine the orientation of the farming machine by comparing the direction of a field row to a known orientation of the camera. The control system 130 can determine other characteristics about the farming machine based on points in the point cloud. Some examples include, the angle of the ground plane compared to a known orientation of the camera, the height of a farming machine part relative the ground (e.g., a boom, or sprayer), the angle of a farming implement (e.g., a sprayer) relative to the ground, and the height of the camera in space.

VI.D Identifying Features of Plants

As described herein, a labelled point cloud includes clusters of points labelled as plants. Plant clusters in a labelled point cloud may reflect characteristics of the plant they represent. The control system 130 can extract information describing the characteristics of the plant by analyzing the points in the plant cluster. Several examples of determining characteristics of a plant based on its representative plant cluster are provided for illustration.

Height Example

The control system 130 can determine a height of a plant represented by a plant point cluster. To illustrate, the control system 130 may determine an average z coordinate of points in the plant point cluster. The control system 130 may determine the height of the plant is a magnitude of a vector orthogonally connecting the average z coordinate to the ground plane. Other methods of determining the height are also possible. In an example, the control system 130 may employ a maximum or minimum z coordinate of points in the point cloud, or extrapolate a plane of points parallel to the ground plane representing the plant, etc. In another example, the control system may determine the height of a three-dimensional bounding that contains a sufficient number plant point clusters that to represent a plant (e.g., a threshold number, a statistical threshold, an absolute threshold, etc.).

Size Example

The control system 130 can determine a size of a plant represented by a plant point cluster using a variety of methods. For example, the size of the plant may be a diameter of a sphere encompassed by the plant cluster, a magnitude of a vector between two points in the plant cluster, a measure of a size of a surface meridian of the plant cluster, etc. In some examples, the size may be determined from a projection of the plant cluster on the ground plane. Other methods of determining the size of the plant cluster are also possible. For example, the control system may determine a leaf area index or an approximate leaf area index when determining the size of the plant.

Separation Example

The control system 130 can determine a separation of a plant represented by a plant cluster from other features or objects in the scene. To illustrate, the control system 130 may determine a separation of the plant cluster from a row plane. That is, the control system 130 determines a row plane and then determines the orthogonal distance from the row plane to the plant cluster. The separation may be quantified in several ways: the distance between the closest plant point to the row plane, the farthest point of the plant points to the row plane, the median distance between the plant points and the row plane, the average distance between the plant points and the row plane, etc. In another example, the control system 130 may determine a separation of the plant cluster from the farming machine and/or camera. That is, the control system 130 may access and determine the position of the camera and/or farming machine relative to the labelled point cluster and determine a separation of the point cluster from the camera and/or farming machine. Other examples are also possible. For example, the control system may determine a row plane separation between two row planes.

Similarly, the control system 130 can determine a proximity factor for a plant represented by a plant cluster. At the least, the proximity factor quantifies the distance between the plant cluster and other features or objects in the labelled point cloud. For example, the proximity factor may describe a distance between a crop and a weed, two weeds, two crops, a weed or crop and a row plane, etc. However, the proximity factor may also provide a higher-level analysis of proximity. For example, the proximity factor may indicate that a crop is "too close" to another crop, a crop is "too far" from the row plane, or a weed is "too close" to another crop and take corresponding actions. Further, the proximity factor may also be scaled based on the conditions in the field or of the farming machine. For example, the proximity factor for a herbicide spray may be different than the proximity factor for a fertilizer spray, the proximity factor for cabbage plants may be different than the proximity factor for corn plants, or the proximity factor for a broadleaf weed (e.g., pigweed) may be different than the proximity factor for a grass weed (e.g., nutsedge), etc.

Physiological Status Example

The control system 130 can determine a physiological status (e.g., a value quantifying the status) for a plant represented by a plant cluster as a feature value. Here, the physiological status may be any of a growth stage, a flowering stage, a measure of plant health, a quantification of plant phytochemistry, a quantification of chlorophyll levels, a quantification of plant nutrition, or any physiological status that can indicate plant treatment. The control system 130 may apply any number of functions in determining the physiological status of a plant represented by the plant cluster. For example, the plant cluster may have shape and/or size indicating a specific growth stage or plant health, or may have a color in the accessed image indicating a chlorophyll level and/or plant nutrition, etc. Whatever the case, the control system 130 can analyze the points in the point cloud to determine characteristics of the points in the plant cluster to determine treatment.

Canopy Example

The control system 130 may determine a canopy state for a plant represented by a plant cluster as a feature value. The canopy state is a quantification of canopy closure, or the degree to which foliage of plants has shaded the ground. To determine the canopy state, the control system 130 may determine the sparsity of the plant cluster and/or determine the visibility of the ground under the plant cluster. Other methods of determining the canopy state are also possible.

Risk Example

The control system 130 can determine a risk value for a plant represented by a plant cluster as a feature value. The risk value is a quantification of the risk in mistreating the plant represented by the plant cluster. For example, there may be higher risk in mistreating a crop than a weed. Some factors that can be used to determine the risk value include a commodity price of the crop being grown in the field, a yield estimate of the crop being grown in the field, a species of the crop being grown in the field, a pressure value of a weed growing in the field, or a species of weed being grown in the field, etc. Other factors may be used to determine a risk value.

Occlusion Example

The control system can determine an occlusion likelihood for a plant represented by a plant cluster as a feature value. The occlusion value can be a quantification of the likelihood that a plant represented by plant point cluster is occluded by other points or clusters, or the likelihood that a point cluster is occluding a plant point cluster. That is, measuring whether one or more plants are occluded from view in the image. In this case, the control system 130 may treat plants according to the occlusion value. For example, treating a plant that is likely occluded in the image to ensure treatment, or not treating a plant if it is unlikely that it is occluded.

Other Examples

In determining feature values for plants represented by plant clusters, the control system 130 may take into account differences of the feature value relative to other plants, features, feature values, and objects. For example, the control system 130 may determine the size of a plant relative to a statistical representation of other similar plants in the field (e.g., same species, plant date, etc.), to historic representations of similar plants (e.g., planted last season, planted in another field, etc.), or to different types and or species of plants (e.g., relative sizes between crops and weeds). Whatever the case, the control system 130 can determine a feature value that quantifies a plant cluster relative to other information.

Similarly, feature values may quantify a combination of features rather than a single feature. For example, a feature value may quantify both a size and a proximity factor. Further, a feature value may be used to inform extraction of other feature values. For example, a size and a species may be used to inform the extraction of a combination of features Finally, the feature values exemplified herein are not intended to be exhaustive. There are other features of plants, farming machines, and fields that can be extracted from a labelled point cloud to inform treatment decisions.

VII. Treating Plants Using Depth Information and Feature Values

As described above, a farming machine (e.g., farming machine 200) can employ a control system (e.g., control system 130) executing a depth identification module (e.g., depth identification module 234), an image labeling module (e.g., image labeling module 236), a map labeling module (e.g., map labeling module 238), and/or a point cloud generation module (e.g., point cloud generation module 240) to extract depth information encoded in the visual information of an accessed image (e.g., captured image 300). The control system 130 may also employ the models to generate a labelled point cloud from the depth information and visual information and/or extract feature values from the labelled point cloud. The control system 130 can identify and treat plants based on the labelled point cloud and feature values.

Whatever the method, the control system 130 can determine a treatment action for identified plants. Treatment actions can include, for example, actuating a treatment mechanism, not actuating a treatment mechanism, ceasing operation of a treatment mechanism, modifying a treatment parameter, modifying an operational parameter, modifying a sensor parameter, etc. Actuating a treatment mechanism (e.g., treatment mechanism 120) may include, for example, actuating a spray mechanism, a mechanical treatment mechanism, an electric treatment mechanism, etc. to treat the plant. Operating parameters may include, for example, speed of the farming machine 200, direction of the farming machine 200, etc. Treatment parameters may include, for example, height of the treatment mechanism 120 (e.g., distance between the treatment mechanism 120 and the ground), type of treatment (e.g., spray, mechanical manipulation, etc.), time of treatment (e.g., at selected times, periodic intervals, length of treatment, a time delay between an image capture and a treatment, etc.), location of treatment (e.g., near the stem, treatment area 122), and/or other parameters related to treatment of the one or more plants. Sensor parameters may include image capture intervals, sensors for capturing an image (e.g., alternating sensors along the mounting mechanism 140, groups of sensors, etc.), image capture settings (e.g., exposure, flash, zoom), and other parameters related to the sensors.

Additionally, the control system 130 can implement more than one treatment action when treating plants. For example, the control system 130 may adjust a treatment parameter and actuate a treatment mechanism 120 to treat an identified plant. Further, the control system 130 can determine treatment actions for groups of plants rather than individual plants, as needed. This section describes several different methods of implementing treatment actions using depth information extracted from an accessed image. However, any combination of treatment actions may also be implemented when identifying and treating plants based on depth information.

VI.A First Example—Actuating a Treatment Mechanism

Generating a Treatment Using a Depth Identification Module

Figure 12:
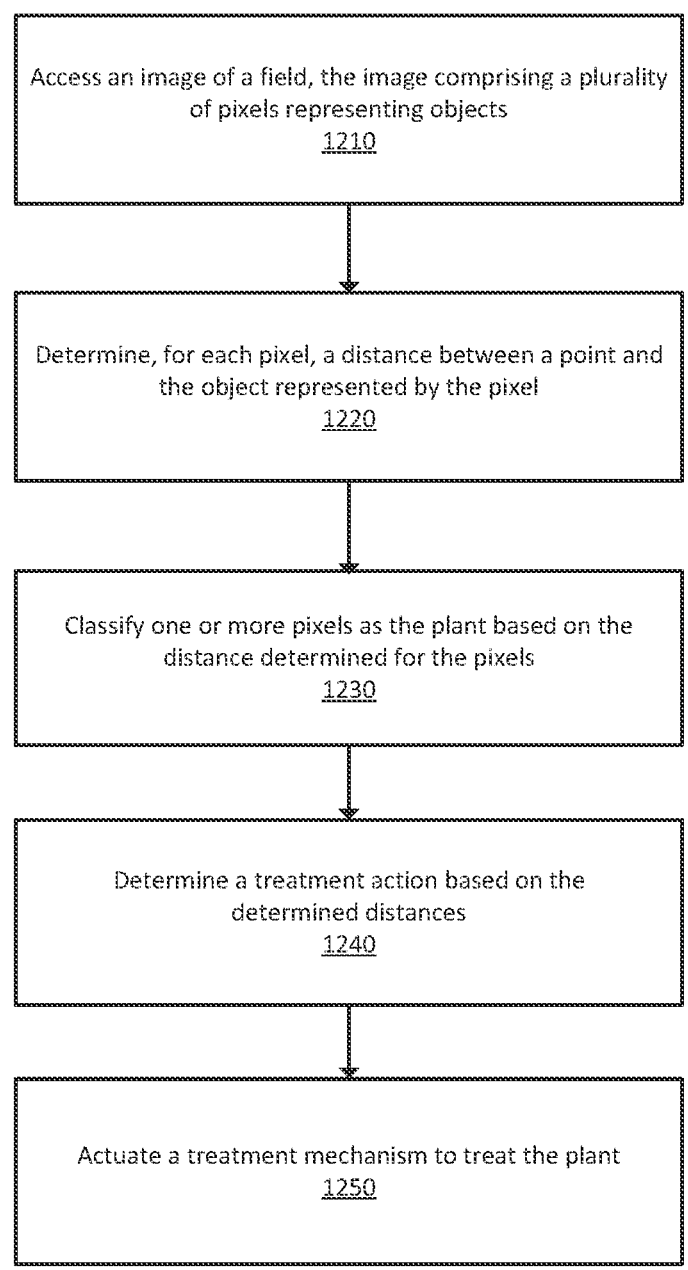
FIGS. 12-14 illustrate methods of identifying and treating plants using a plant identification module, in accordance with one or more embodiments.

FIG. 12 illustrates a method of treating a plant using a plant identification module, in accordance with an example embodiment. The method 1200 may be performed from the perspective of the control system 130. The method 1200 can include greater or fewer steps than described herein. Additionally, the steps can be performed in different order, or by different components than described herein.

A farming machine (e.g., farming machine 100) includes one or more sensors for capturing an image as the farming machine travels through a field. A control system (e.g., control system 130) accesses 1210 an image of the field captured by the sensors. The image includes pixels representing a plurality of objects of the field including at least one plant. To illustrate, referring to FIG. 4A, the control system 130 can access captured image 400 including crops 302a, 302b, and 302c, and weed 350.

Returning to FIG. 12, the control system 130 applies a depth identification module (e.g., depth identification model 605) to an accessed image to extract depth information in the image. For example, for each pixel in the accessed image, the control system 130 employs a depth identification module to determine 1220 a distance between a point and an object represented by the pixel (e.g., plant, ground, substrate, grass, dirt, etc.). Here, the point may be a point in the field of view of the sensor, a center point of the lens of the sensor, or some other point that may be used to judge distance. The control system 130 labels each pixel with its distance to generate a depth map. The control system 130 can additionally group pixels in the image with similar distance values. To illustrate, referring to FIG. 4B, the control system 130 generates a depth map 460 and groups the pixels according to the legend 462.

Returning to FIG. 12, the control system 130 classifies 1230 one or more pixels as a plant (or crop) based on the depth information for the pixels. The control system 130 can additionally classify other objects in the image (e.g., dirt, grass, etc.) based on their depth information. To illustrate, referring again to FIG. 4B, the control system 130 classifies four groups of pixels with a plant label 303 in the depth map 360.

Returning to FIG. 12, the control system 130 determines 1240 a treatment action based on the depth information and pixels identified as a plant. The control system 130 then actuates 1250 a treatment mechanism 120 to treat one or more of the identified plants with the determined treatment action, as needed. To illustrate, referring to FIG. 4B, the control system 130 classifies crops 302a, 302b, 302c and the weed 350 based on the depth information in depth map 360. The control system 130 then determines which plant(s) to treat and with which treatment action(s), if any. In a first example, the control system 130 compares the depth information of the crops 302a, 302b, 302c and the weed 350. The control system 130 determines that the weed 350 is significantly shorter than the plants 302a-c. The control system 130 selects the weed 350 for treatment with an herbicide sprayed from a spray nozzle because the weed 350 is significantly shorter than the plants 302a-c. Similarly, the control system 130 may select weeds above a threshold height for treatment, or with a more aggressive treatment. In a second example, the control system 130 compares each crop 302a, 302b and 302c and the weed 350 to a treatment threshold to determine whether each identified plant should be treated. The control system 130 selects plants 302b and 302c for treatment with a fertilizer sprayed from a spray nozzle to help accelerate their growth because the heights of the plants are below a treatment threshold. In another example, the control system 130 determines an average height of the crops 302a, 302b, 302c and weed 350, and selects one or more plants for treatment that are statistically dissimilar from the average. In this case, the control system 130 treats the weed 350 with a mechanical treatment mechanism because its height is more than a standard deviation different than the average height of the plants. In some embodiments, the control system 130 can additionally or alternatively implement other treatment actions, as described herein.

The method 1200 allows a farming machine (e.g., farming machine 100) to apply a targeted treatment to one or more plants. That is, the control system 130 can select plants for treatment based on their height. For example, selecting smaller plants for a killing, or fertilizing, treatment based on their height, or selecting a plant for treatment because their height is above or below a threshold. The depth identification module can improve accuracy of treatment, reduce waste, and improve yield of crops from a field.

Generating a Treatment by Normalizing a Ground Plane

Figure 13:
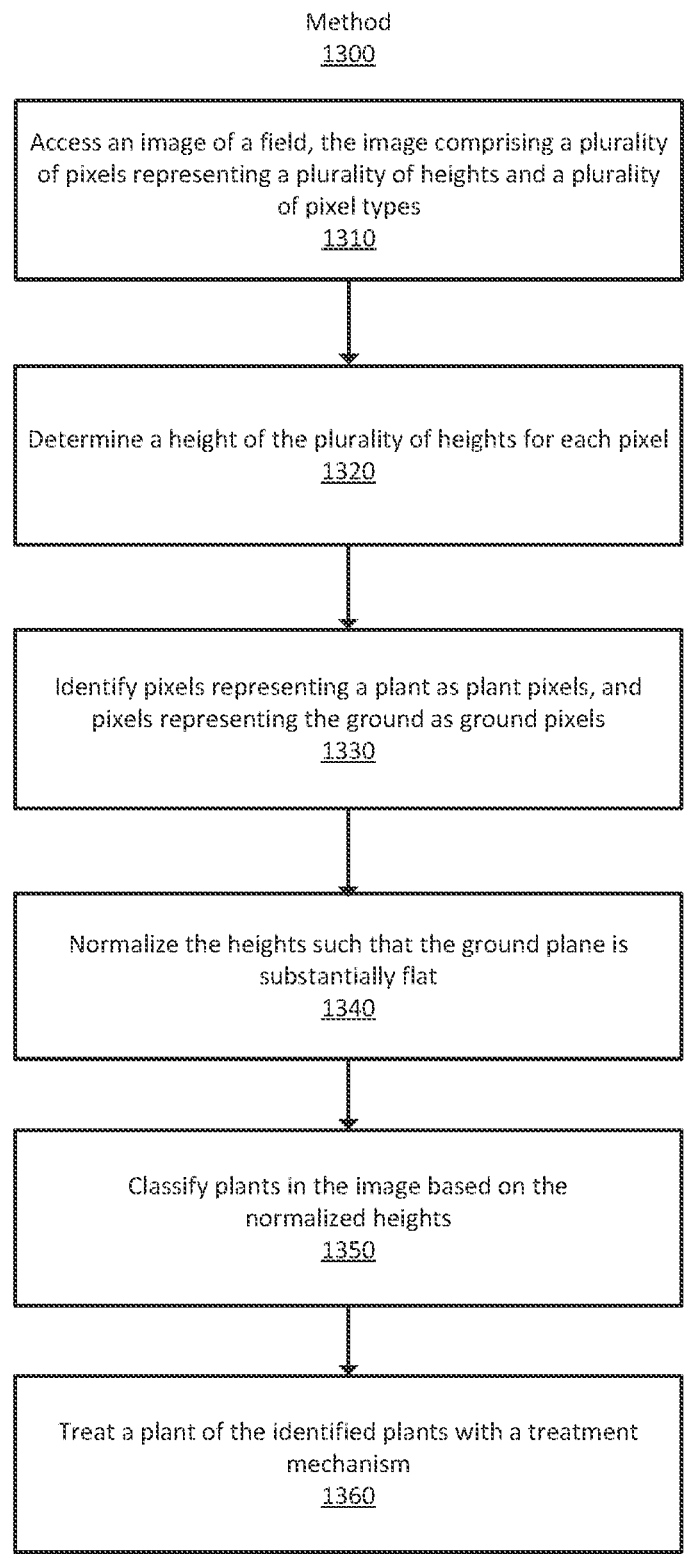

FIG. 13 illustrates a method of identifying and treating a plant using a plant identification module, in accordance with one or more embodiments. The method 1300 may be performed from the perspective of the control system 130. The method 1300 can include greater or fewer steps than described herein. Additionally, the steps can be performed in different order, or by different components than described herein.

A farming machine (e.g., farming machine 100) includes one or more sensors for capturing an image as the farming machine travels through a field. A control system (e.g., control system 130) accesses 1310 an image of the field captured by the sensors. The image includes pixels representing a plurality of objects in the field including at least one plant and the ground. Each of the pixels corresponds to a point in space in the scene surrounding the farming machine. To illustrate, referring to FIG. 8A, the control system 130 access accessed image 800 which includes pixels representing crops 810, weeds 812, and the ground, 817.

Returning to FIG. 13, the control system 130 determines 1320 a height of each pixel in the image, for example by employing depth identification module 234. For example, for each pixel in the accessed image, the control system 130 employs a depth identification module to determine a distance between a point and an object represented by the pixel (e.g., plant, ground, substrate, grass, dirt, etc.). The control system 130 labels each pixel with its distance to generate a depth map. In some cases, the control system 130 can additionally group pixels in the image with similar distance values. To illustrate, referring to FIG. 8B, the control system 130 generates a depth map 860.

Here, because each pixel also corresponds to a point in space, the depth information allows the pixels to be associated with a three-dimensional coordinate in the scene around the farming machine. Therefore, in some configurations, the control system 130 may apply a point cloud generation module to the pixels to generate a point cloud representing the scene around the farming machine. Each point in the point cloud can represent one or more pixels and their corresponding depth and visual information, and, as such, can be used to identify and classify plant points (i.e., plant pixels), ground points (i.e., ground pixels), etc. The control system 130 can use the classified points to determine various treatment actions.

Returning to FIG. 13, the control system 130 identifies 1330 pixels representing a plant as plant pixels, and pixels representing the ground as ground pixels. To do so, in one example, the control system 130 applies an image labeling module 236 to the accessed image to classify pixels as plants, crop, ground, etc. However, in other examples, the control system 130 may utilize only the depth information to identify plant and ground pixels. To illustrate, the control system may identify pixels whose depth information indicates that they are approximately planar as ground pixels, while pixels having a z distance above the plane are plant pixels. Other methods as described herein are also possible. For example, the control system may identify the ground plane in a point cloud representing the scene.

In some cases, the ground pixels will lie within a ground plane, and the ground plane is at an angle because the camera that captured the accessed image is tilted relative to the ground in the scene. As such, the control system 130 normalizes 1340 the ground plane such that the ground plane is substantially flat. For example, the control system 130 can identify a slope of the ground plane and rotate the coordinates of the pixels representing the ground such that the slope is zero. In an example, the control system 130 can identify a correction factor based on the slope such that when the correction factor is applied to the points the ground plane has a slope of approximately zero. Similarly, the control system 130 can modify the coordinates of the plants based on the determined ground plane. For example, by rotating the coordinates of the plant points according to the determined slope. Several other methods of identifying and normalizing a ground plane and other points are also described herein. For example, the control system 130 may apply a ground plane extraction model to points in a point cloud representing the ground plane.

The control system 130 classifies 1350 one or more pixels as a plant based on the normalized height for the pixels. The control system 130 can additionally classify other objects in the image (e.g., dirt, grass, etc.) based on their depth information. A variety of methodologies for classifying a group of pixels based on their height relative to the ground plane (i.e., depth information and depth differences) are described herein and any may be applied. For example, the control system 130 may classify points in a point cloud representing the ground and/or plant pixels based on their position in the scene surrounding the farming machine.

The control system 130 treats 1360 the classified plant based on its identified height. To do so, the control system 130 may generate a set of treatment instructions for the classified plant and actuate a treatment mechanism of the farming machine to perform a treatment action on the plant. Any of the various treatment actions described herein are possible.

Generating a Treatment Using a Point Cloud Generation Module

Figure 14:
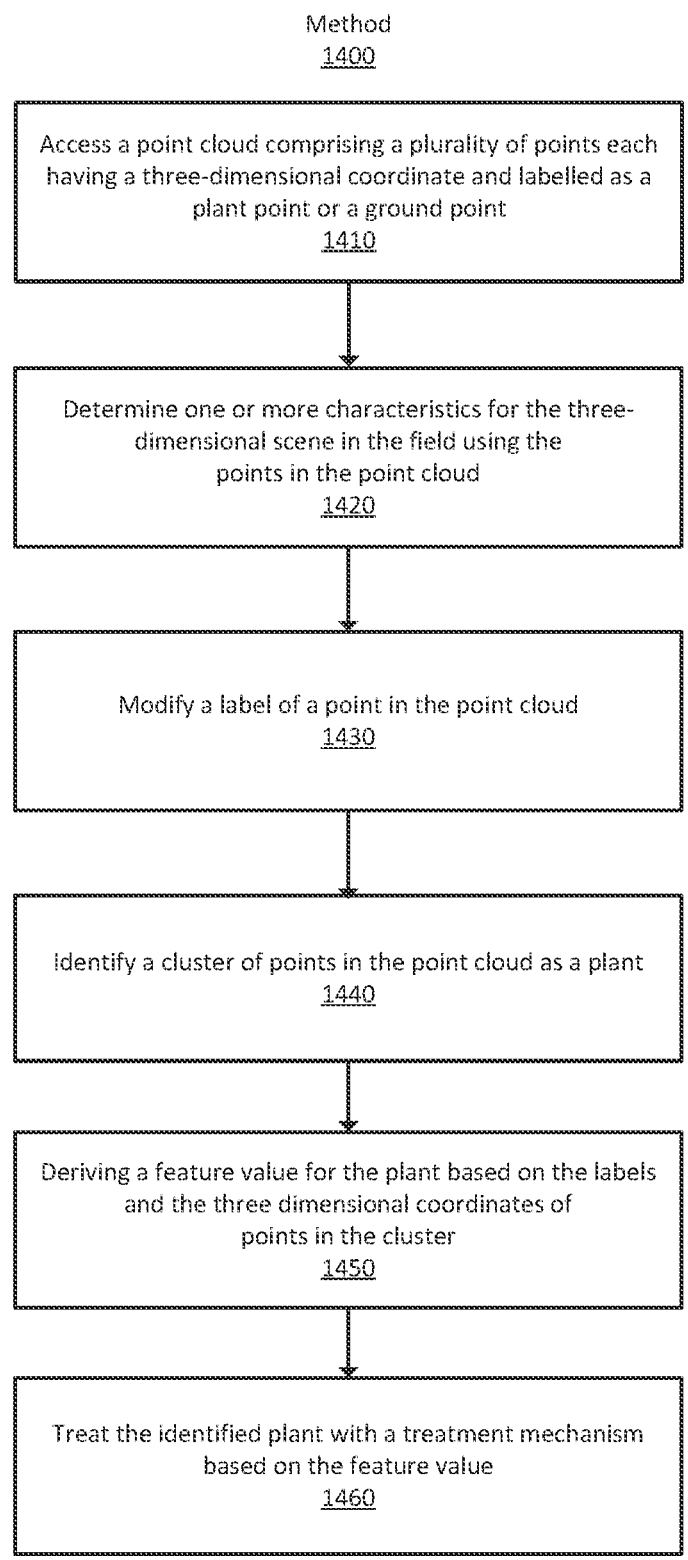

FIG. 14 illustrates a method of identifying and treating a plant using a plant identification module, in accordance with one or more embodiments. The method 1400 may be performed from the perspective of the control system 130. The method 1400 can include greater or fewer steps than described herein. Additionally, the steps can be performed in different order, or by different components than described herein.

A farming machine (e.g., farming machine 100) includes one or more sensors for capturing an image as the farming machine travels through a field. A control system (e.g., control system 130) accesses 1410 a labelled point cloud of a scene surrounds the farming machine in the field. The labelled point cloud includes a number of points representing the scene around the farming machine. Each of the points in the point cloud is a three-dimensional coordinate and has a corresponding label indicating the points represent a plant, the ground, or other objects in the scene. In some examples, the labelled point cloud includes clusters of points labelled as a plant or the ground.

To generate the labelled point cloud, the control system 130 can generate a depth map using a depth identification module (e.g., depth identification module 234) and a labelled image labelling model (e.g., image labeling module 236). The control system 130 then labels the depth map using the labels in the labelled image using a map labeling module (e.g., map labeling module 238). The control system 130 generates a labelled point cloud from the labelled depth map using the point cloud generation module (e.g., point cloud generation module 240). This process is described in regard to FIGS. 8A-8D.

The control system 130 determines 1420 one or more characteristics of the three-dimensional scene in the field using the points in the point cloud. Characteristics may include, for example, a ground plane, a direction of the farming machine, a position of a plant row, proximity between plant rows, etc. Other examples are described herein.

The control system 130 modifies 1430 a label (or coordinate) of a point the point cloud based on any of the label, coordinates, and characteristics of points in the point cloud. That is, the control system may correct inconsistencies in labels or coordinates of the points in the point cloud. For example, the control system may modify a label of a point to more accurately represent the scene in the field or may modify a coordinate of a point such that it is more accurately placed in the point cloud. Other examples are possible and are described herein.

The control system 130 identifies 1440 a cluster of points in the point cloud. For example, the control system 130 may identify a cluster of points in the point cloud as a plant because the cluster of points has a plant label. Other examples of determining a cluster of points is a plant are also possible as described herein.

The control system 130 determines 1450 a feature value for the plant represented by the point cluster. The control system 130 can determine the feature value using the label and three-dimensional coordinates of the points in the point cluster. The feature value describes one or more characteristics of the plant that can inform various treatment actions. For example, the control system 130 can determine the height, size, position, proximity, canopy cover, physiology, etc. of the plant based on points in the point cluster representing the plant. Other examples of determining a feature value are described herein.

The control system 130 treats 1460 the plant based on the determined feature value. To do so, the control system 130 may generate a set of treatment instructions to perform a treatment action for the classified plant based on the feature value. The control system 130 may then actuate a treatment mechanism of the farming machine to perform the treatment action. Any of the various treatment actions described herein are possible.

VI.B Second Example—Treatment Actions Based on Treatment Maps

In some embodiments, determining a treatment action includes generating a treatment map. An example of generating a treatment map to treat an identified plant is disclosed in U.S. patent application Ser. No. 16/126,842 titled "Semantic Segmentation to Identify and Treat Plants in a Field and Verify the Plant Treatments," filed on Sep. 10, 2018, which is incorporated by reference herein in its entirety, but other methods of generating a treatment map are also possible. Describing briefly, a control system (e.g., control system 130) of a farming machine (e.g., farming machine 100) interprets and translates a data structure of a treatment map into the machine signals necessary to accomplish a treatment action at an appropriate time.

The control system 130 can generate a treatment map based on any of the method used to identify plants with a plant identification module described herein. That is, the control system can generate a treatment map for plants identified based on depth information (e.g., in a depth map), in a point cloud, in a labelled point cloud, or based on feature values for an identified plant. Whatever the case, the control system generates and implements treatment actions to treat various objects in the scene surrounding the farming machine.

Figure 15A:
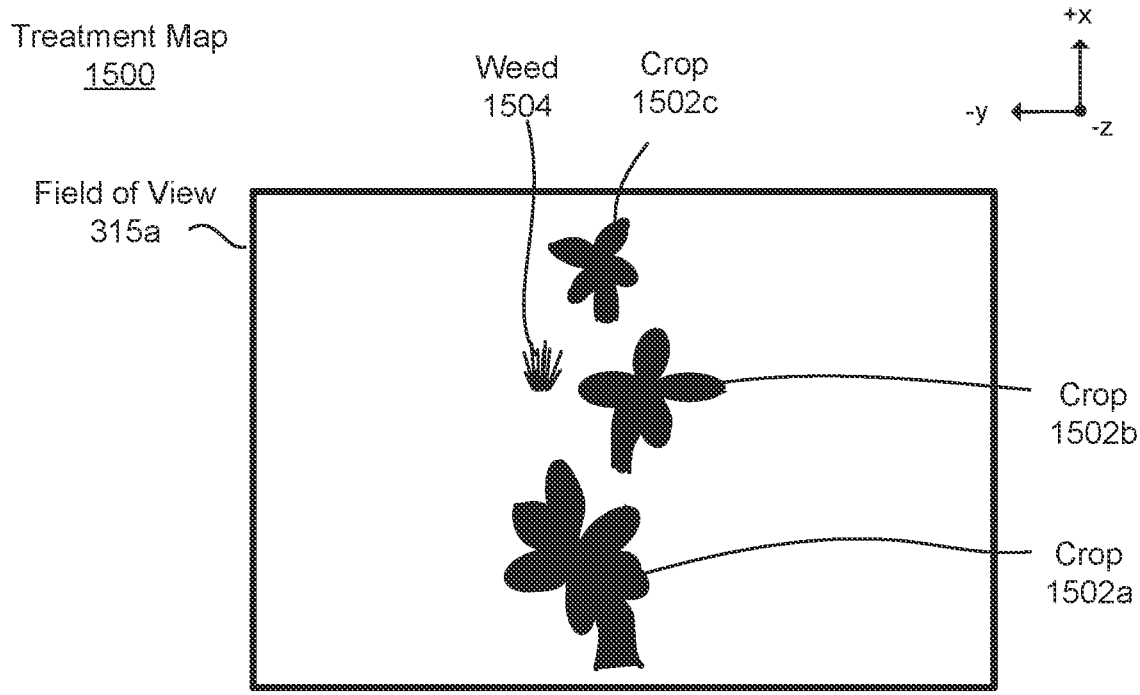
FIG. 15A illustrates a treatment map, in accordance with a first example embodiment.

To illustrate, FIG. 15A illustrates a treatment map, according to an example embodiment. The control system 130 generates the treatment map 1500 when employing the method 1200. More specifically, the treatment map 1500 is a representation of plants identified according to a depth map. Accordingly, each pixel of the treatment map 1500 corresponds to a pixel of the captured image reflected with their depth information in a depth map. Thus, the control system 130 can implement treatment actions to treat plants (or other objects) corresponding to the real-world plants (or other objects) indicated by their depth information in the treatment map 1500.

Here, the control system 130 has previously identified three crops and a weed in the treatment map 1500 based on the depth information in a depth map. For example, the control system 130 identifies crop 1502a, plant 1502b, and crop 1502c, and weed 1504. Depending on the circumstance, the control system 130 may determine to treat a plant (e.g., weed 1504) with any number of treatment actions based on the depth information. The control system 130 may indicate in the data structure of the treatment map 1570a that the plant (e.g., weed 1504) is to be treated by a treatment action. The control system 130 then, for example, actuates the treatment mechanism (e.g., treatment mechanism 120) to treat the plant at the appropriate time based on the data structure of the treatment map 1570a. In this manner, the farming machine treats identified plants as the farming machine travels past the plant in the field. In some circumstances, the control system 130 may treat a treatment area (e.g., an area of the field) around an identified plant rather than just the plant.

Figure 15B:
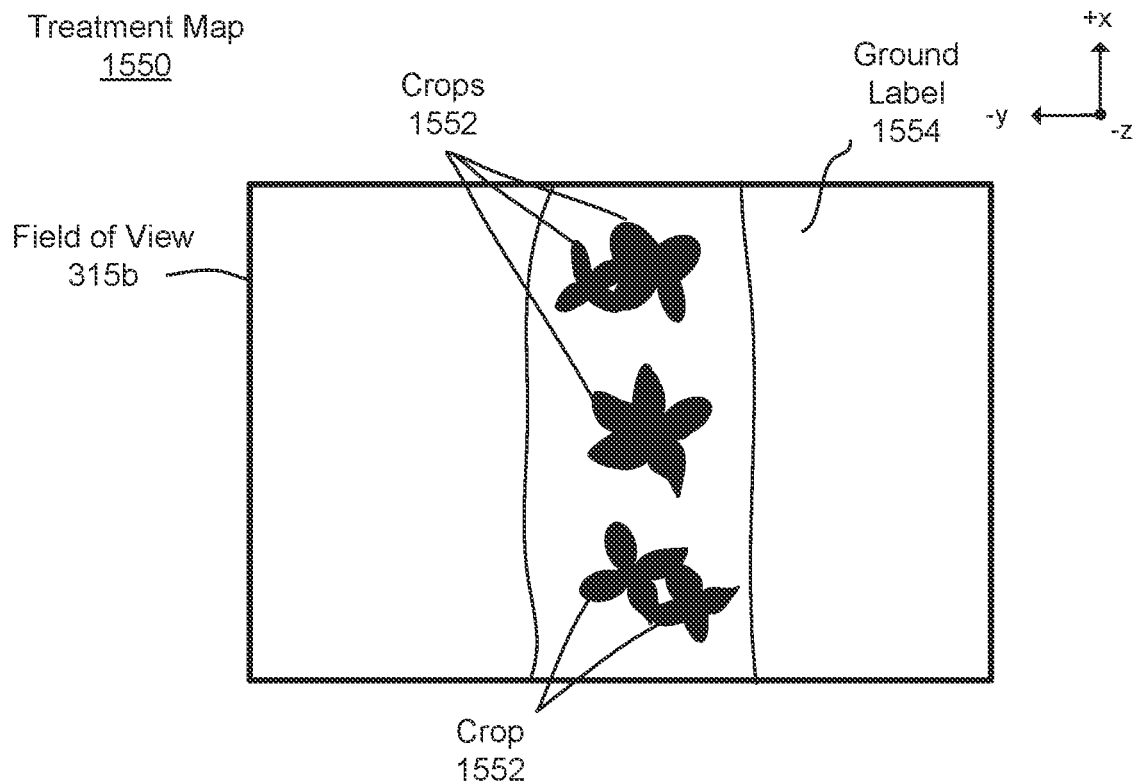
FIG. 15B illustrates a treatment map, in accordance with a second example embodiment.

As another example, FIG. 15B is a treatment map 1550b generated by method 1300 when determining a treatment action. More specifically, the treatment map is a representation of plants identified according to height information found in a normalized point cloud. The control system 130 may determine treatment actions for any of the identified crops 1502 as needed. The control system 130 may also determine treatment actions for the ground 1554. The data structure of the treatment map 1550 may indicate the treatment actions for the identified objects.

VI.C Third Example—Modifying Treatment Parameters

The control system 130 may modify one or more treatment parameters as part of a treatment action. To illustrate, referring to the treatment map 1550 of FIG. 15B, the control system 130 identifies crops 1552 and the ground 1554 using method 1400. That is, the treatment map is generated from a labelled point cloud. The control system 130 generates a treatment action to treat a plant in the labelled point cloud.

The control system 130 modifies a treatment parameter for one of the identified plants based on the depth information. To illustrate, the control system 130 determines a treatment height for one of the plants (e.g., at the root, at the top of each plant, etc.). The control system 130 adjusts the height of a treatment mechanism 120 to treat the identified plant at the determined treatment height. In another example, the control system 130 determines a type of treatment (e.g., herbicide, fertilizer, etc.) for an identified plant based on the depth and/or height information. The control system 130 applies the appropriate type of treatment to the identified plant. Treatment parameters may be encoded into a treatment map such that the farming machine can accurately treat the plants with the appropriate treatment parameters as the farming machine travels past the plants in the field.

VI.D Fourth Example—Modifying Operating Parameters

The control system 130 may modify one or more operating parameters of the farming machine 200 as part of a treatment action. To illustrate, referring to the treatment map 1500 of FIG. 15A, the control system identifies crops 1502a,

1502b, and 1502c, and weed 1504 using method 1400. That is the control system 130 identifies plants using features values extracted from a labelled point cloud.

The control system 130 modifies an operating parameter based on the feature values. To illustrate, the control system 130 determines a treatment direction for the farming machine that allows the farming machine to correctly actuate a treat mechanism 120 to treat the weed 250 as it travels past the weed 250 in the field. Accordingly, the control system 130 actuates the systems of the farming machine such that it travels at the treatment velocity. In other examples, the farming machine may modify a sprayer timing or sprayer height to correctly actuate a treatment mechanism to treat the plant. Similarly, the control system 130 may determine a distance between each plant (e.g., a proximity) based on the feature values. The control system 130 can then determine an inter-treatment velocity that allows the farming machine to efficiently treat plants based on the proximity between plants (e.g., spray less if the plants are proximate). The control system 130 may then actuate systems of the farming machine 200 to apply the treatments as needed.

VI.E Fifth Example—Modifying Sensor Parameters

The control system 130 may modify one or more sensor parameters of the farming machine 100 as part of a treatment action. To illustrate, referring to the treatment map 1500 of FIG. 15A, the control system 130 identifies crop 1502a, 1502b, and 1502c, and weed 1504 using method 1300. That is, the control system identifies the crops based on a depth map. Here, the control system 130 is able to determine that there is a weed 1504 but is unable to determine whether the weed 1504 should be treated because it is too far away from the image sensor. In this case, the control system 130 modifies a sensor parameter based on the depth information. For example, the control system 130 determines a new sensor parameter (e.g., zoom, capture intervals, tilt angle) that allows the farming machine 100 to acquire higher quality depth information that allows the control system to more accurately determine a plant treatment 130. Similarly, the control system may adjust a cropping location of the image and/or a shutter speed of the camera. Accordingly, the control system 130 modifies the sensors to achieve the new sensor parameter (e.g., changing the zoom) to acquire higher quality depth information.

VI.F Sixth Example—Modifying a Treatment Schedule

The control system 130 may modify a treatment schedule for an identified plant as part of a treatment action. Here, the treatment schedule may include any farming action that was intended to be performed on an identified object (e.g., a spray treatment, a planting time, etc.). To illustrate, referring to the treatment map 1500 of FIG. 15A, the control system 130 identifies crop 1502a, 1502b, and 1502c, and weed 1504 using method 1400. That is, the control system 130 identifies the crops and weeds using feature values of identified plants. Here, the control system 130 determines that the one of the crops is smaller than it should be at this point in the growth schedule based on its feature values. As such, the control system modifies the treatment schedule for the crop to increase the amount of fertilizer applied to the plant.

Other examples of modifying a treatment schedule are also possible. For example, the farming machine may modify a scheduled chemical makeup of a treatment (e.g., a more or less aggressive treatment chemical) based on the feature value of the identified plant. The scheduled chemical treatment can include two or more chemicals applied serially, or in parallel. Further the schedule of two or more chemicals can include modifying the times they are applied, their mixture, etc.

In another example, modifying the treatment schedule can include modifying a scheduled flow rate (e.g., application rate in units per area) of a chemical in the scheduled treatment to a new flow rate. For example, increasing the flow rate (e.g., amount per time) of the chemical to apply more chemical, or to change the application speed (e.g., speed of application), in the same amount of time as the originally scheduled treatment action. In some cases, the additional flow rate can incorporate flow from an adjacent or proximal treatment mechanism. The flow rate may be quantified as a volume per unit area and modifying the flow rate can include increasing or decreasing the volume per unit area using one or more treatment mechanisms. The flow rate may be quantified similarly using the concentration of active ingredient per unit area.

In another example, modifying the treatment schedule for an identified plant can include modifying the timing of passes of the farming machine. For example, the control system 130 may determine that an additional pass is necessary to perform the treatment action for the identified plant and schedule and take that additional pass. Thus, the control system can act to take additional treatment actions in the field in the future based on current feature values.

VI.G Other Examples

The examples of determining treatment actions described above are used for illustrative purposes. In other embodiments, the control system 130 may take other treatment actions based on the depth information determined by a depth identification module. Further, the control system 130 also combines any number of treatment actions to treat plants based on depth information.

VI. Control System

Figure 16:
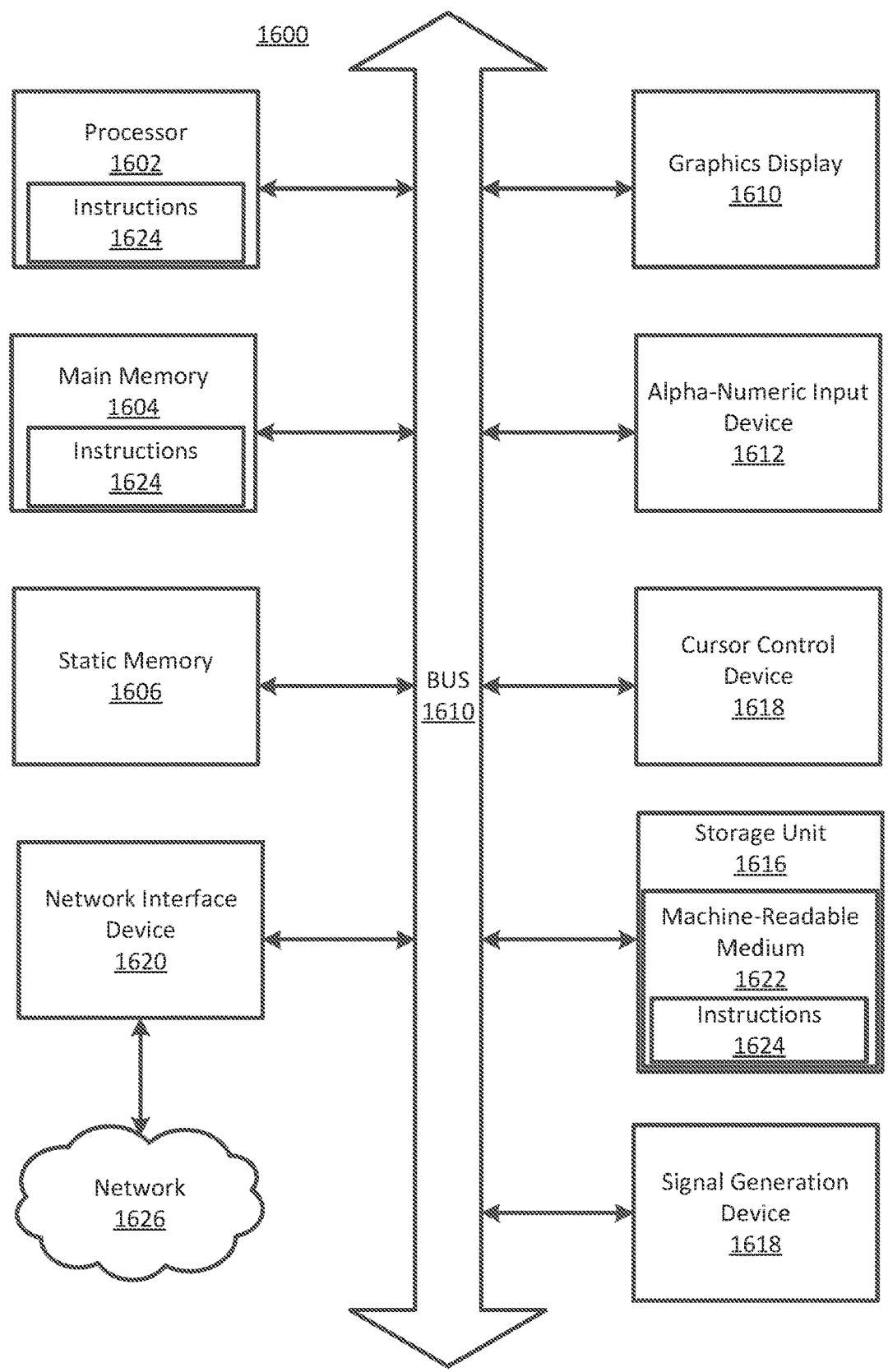
FIG. 16 is a block diagram illustrating components of an example machine for reading and executing instructions from a machine-readable medium, in accordance with one or more example embodiments.

FIG. 16 is a block diagram illustrating components of an example machine for reading and executing instructions from a machine-readable medium, in accordance with one or more example embodiments. Specifically, FIG. 16 shows a diagrammatic representation of control system 130 in the example form of a computer system 1600. The computer system 1600 can be used to execute instructions 1624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1624 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes one or more processing units (generally processor 1602). The processor 1602 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 1600 also includes a main memory 1604. The computer system may include a storage unit 1616. The processor 1602, memory 1604, and the storage unit 1616 communicate via a bus 1608.

In addition, the computer system 1600 can include a static memory 1606, a graphics display 1610 (e.g., to drive a plasma display panel (PDP), a liquid crystal display (LCD), or a projector). The computer system 1600 may also include an alphanumeric input device 1612 (e.g., a keyboard), a cursor control device 88 (e.g., a mouse, a trackball, a joystick, a motion sensor, or other pointing instrument), a signal generation device 1618 (e.g., a speaker), and a network interface device 1620, which also are configured to communicate via the bus 1608.

The storage unit 1616 includes a machine-readable medium 1622 on which is stored instructions 1624 (e.g., software) embodying any one or more of the methodologies or functions described herein. For example, the instructions 1624 may include the functionalities of modules of the system 130 described in FIG. 2. The instructions 1624 may also reside, completely or at least partially, within the main memory 1604 or within the processor 1602 (e.g., within a processor's cache memory) during execution thereof by the computer system 1600, the main memory 1604 and the processor 1602 also constituting machine-readable media. The instructions 1624 may be transmitted or received over a network 1626 via the network interface device 1620.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for avoiding an obstruction by a machine that moves through an operational environment, the method comprising:
    accessing a single image of the operational environment from an image sensor as the machine moves through the operational environment, the single image comprising one or more pixels representing the obstruction;
    applying a depth identification model to the single image, the depth identification model including a convolutional neural network configured to identify distances between sensors and representative pixels in single images by:
        encoding the single image onto a first layer of the convolutional neural network as an encoded image;
        transforming the encoded image to a reduced image on a second layer of the convolutional neural network;
        classifying latent features in the reduced image as a distance between the image sensor and an object represented by the pixel;
        decoding the reduced image to a decoded image corresponding to the single image, each pixel in the decoded image representing the distance between the object represented by the pixel and the image sensor in the single image; and
        classifying, based on the distance represented by each pixel, a first set of pixels in the decoded image as the obstruction; and
    modifying an operating parameter of the machine, the modified operating parameter changing a speed of the machine to avoid the classified obstruction, and the modified operating parameter selected based on the distance for pixels in the first set of pixels representing the obstruction.

2. The method of claim 1, wherein changing the speed of the machine to avoid the classified obstruction changes the speed to zero.

3. The method of claim 1, further comprising modifying a sensor parameter of the image sensor based on the distance represented by each of the pixels in the decoded image.

4. The method of claim 1, wherein modifying the operating parameter to change the speed of the machine to avoid the classified obstruction is an automated process of the machine.

5. The method of claim 1, wherein the single image further comprises one or more pixels representing a plant and applying the depth identification model further comprises:
    classifying latent features in the reduced image as a distance between the image sensor and the plant represented by the pixel;
    decoding the reduced image to the decoded image corresponding to the single image, one or more pixels in the decoded image representing the distance between the plant represented by the pixel and the image sensor in the single image; and
    classifying, based on the distance represented by each pixel, a second set of pixels in the decoded image as the plant;
    wherein the modified operating parameter is additionally selected based on the distance for pixels in the second set of pixels representing the plant.

6. The method of claim 5, wherein the distance of the obstruction is closer to the machine than the distance of the plant.

7. The method of claim 5, wherein the distance of the obstruction is farther from the machine than the distance of the plant.

8. The method of claim 1, further comprising generating a depth map comprising the distances represented by pixels in the decoded image and wherein the depth map comprises the distances of the obstruction.

9. The method of claim 1, further comprising:
    generating a point cloud representing the obstruction based on the distances for pixels in the first set of pixels of the decoded image representing the obstruction.

10. A machine configured to perform machine actions and avoid an obstruction as the machine moves through an operational environment, the machine comprising:
    an image sensor configured to capture images of the operational environment as the machine moves through the operational environment;
    one or more processors; and
    a non-transitory computer readable storage medium comprising computer program instructions that, when executed by the one or more processors, cause the machine to:
        access a single image of the operational environment from the image sensor, the single image comprising one or more pixels representing the obstruction;
        apply a depth identification model to the image, the depth identification model including a convolutional neural network configured to identify distances between sensors and representative pixels in single images by:
            encoding the single image onto a first layer of the convolutional neural network as an encoded image;
            transforming the encoded image to a reduced image on a second layer of the convolutional neural network;
            classifying latent features in the reduced image as a distance between the image sensor and an object represented by the pixel;
            decoding the reduced image to a decoded image corresponding to the single image, each pixel in the decoded image representing the distance between the object represented by the pixel and the image sensor in the single image; and classifying, based on the distance represented by each pixel, a first set of pixels in the decoded image as the obstruction; and modifying an operating parameter of the machine, the modified operating parameter changing a speed of the machine to avoid the classified obstruction, and the modified operating parameter selected based on the distance for pixels in the first set of pixels representing the obstruction.

11. The machine of claim 10, wherein changing the speed of the machine to avoid the classified obstruction changes the speed to zero.

12. The machine of claim 10, wherein the computer program instructions, when executed, cause the one or more processors to modify a sensor parameter of the image sensor based on the distance represented by each of the pixels in the decoded image.

13. The machine of claim 10, wherein executing the computer program instructions to modify the operating parameter to change the speed of the machine to avoid the classified obstruction is an automated process of the machine.

14. The machine of claim 10, wherein the single image further comprises one or more pixels representing a plant and applying the depth identification model to the single image further comprises:

classifying latent features in the reduced image as a distance between the image sensor and the plant represented by the pixel;

decoding the reduced image to the decoded image corresponding to the single image, one or more pixels in the decoded image representing the distance between the plant represented by the pixel and the image sensor in the single image; and classifying, based on the distance represented by each pixel, a second set of pixels in the decoded image as the plant;

wherein the modified operating parameter is additionally selected based on the distance for pixels in the second set of pixels representing the plant.

15. The machine of claim 14, wherein the distance of the obstruction is closer to the machine than the distance of the plant.

16. The machine of claim 14, wherein the distance of the obstruction is farther from the machine than the distance of the plant.

17. The machine of claim 10, wherein the computer program instructions, when executed, further cause the one or more processors to generate a depth map comprising the distances represented by pixels in the decoded image and wherein the depth map comprises the distances of the obstruction.

18. The machine of claim 10, wherein the computer program instructions, when executed, further cause the one or more processors to generate a point cloud representing the obstruction based on the distances for pixels in the first set of pixels of the decoded image representing the obstruction.

19. A non-transitory computer readable storage medium comprising computer program instructions for performing actions to avoid an obstruction as a machine moves through an operational environment, the computer program instructions, when executed by one or more processors, causing the one or more processors to:

accessing a single image of the operational environment from an image sensor as the machine moves through the operational environment, the single image comprising one or more pixels representing the obstruction;

applying a depth identification model to the image, the depth identification model including a convolutional neural network configured to identify distances between sensors and representative pixels in single images by:

encoding the single image onto a first layer of the convolutional neural network as an encoded image;

transforming the encoded image to a reduced image on a second layer of the convolutional neural network;

classifying latent features in the reduced image as a distance between the image sensor and an object represented by the pixel;

decoding the reduced image to a decoded image corresponding to the single image, each pixel in the decoded image representing the distance between the object represented by the pixel and the image sensor in the single image; and classifying, based on the distance represented by each pixel, a first set of pixels in the decoded image as the obstruction; and modifying an operating parameter of the machine, the modified operating parameter changing a speed of the machine to avoid the classified obstruction, and the modified operating parameter selected based on the distance for pixels in the first set of pixels representing the obstruction.

* * * * *